United States Patent
Onuki

(10) Patent No.: US 6,377,305 B2
(45) Date of Patent: *Apr. 23, 2002

(54) IMAGE SENSING APPARATUS

(75) Inventor: Ichiro Onuki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,056

(22) Filed: Oct. 13, 1998

(30) Foreign Application Priority Data

Oct. 13, 1997 (JP) ............................................. 9-278593
Oct. 13, 1997 (JP) ............................................. 9-278594

(51) Int. Cl.$^7$ .............................................. H04N 5/232
(52) U.S. Cl. ....................................... 348/345; 348/350
(58) Field of Search ................................ 348/207, 335, 348/340, 343, 344, 345, 346, 349, 350; 396/113, 114, 112, 125, 128, 147; H04N 5/232

(56) References Cited

U.S. PATENT DOCUMENTS 4,529,287 A * 7/1985 Karasaki et al. ............ 396/114
5,587,763 A * 12/1996 Uchiyama ................... 396/114
5,654,790 A * 8/1997 Uchiyama ................... 396/123
5,678,097 A * 10/1997 Suda .......................... 396/113

FOREIGN PATENT DOCUMENTS

| JP | 2-210974 | 8/1990 |
| JP | 2-210976 | 8/1990 |
| JP | 7-131721 | 5/1995 |

* cited by examiner

Primary Examiner—Tuan Ho
(74) Attorney, Agent, or Firm—Fitzpatrick, Cella, Harper & Scinto

(57) ABSTRACT

A camera includes a focus-detection module 130 inserted into or withdrawn from an optical path between an image-sensing optical system (152–155) and a CCD image-sensing device (111). An image pick-up signal from the CCD image sensing device (111) is used as ordinary image data for recording when the module (130) is withdrawn from the optical path and as image data for rangefinding when the module (130) is inserted into the optical path. The focus-detection module (130) is internally provided with first through fourth mirrors (131, 132, 133, 134), a field lens (135) provided between the second and third mirrors and secondary image forming lenses (137) provided between the third and fourth mirrors, whereby two secondary images are formed on the CCD image sensing device (111). The two secondary images are used for rangefinding or focusing.

29 Claims, 39 Drawing Sheets

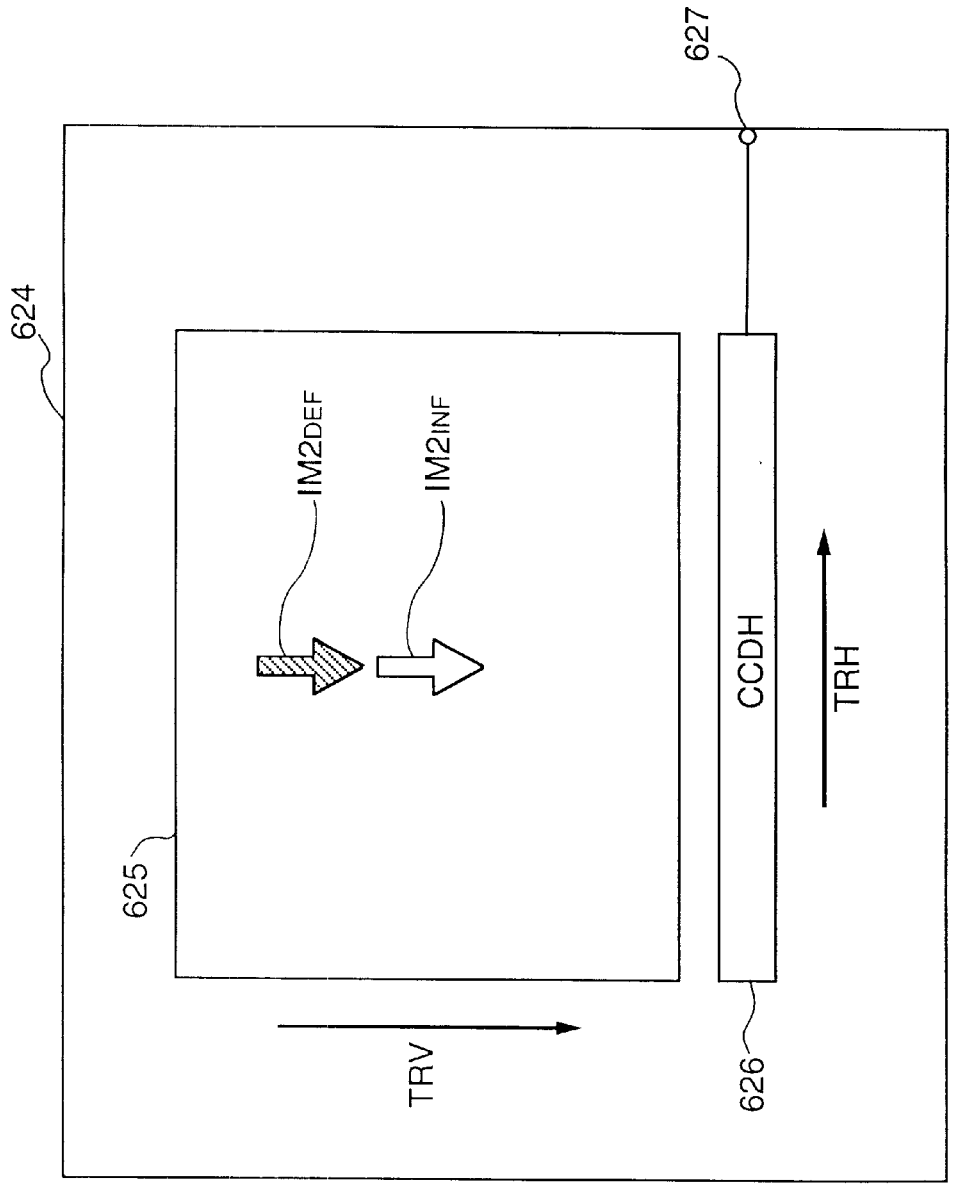

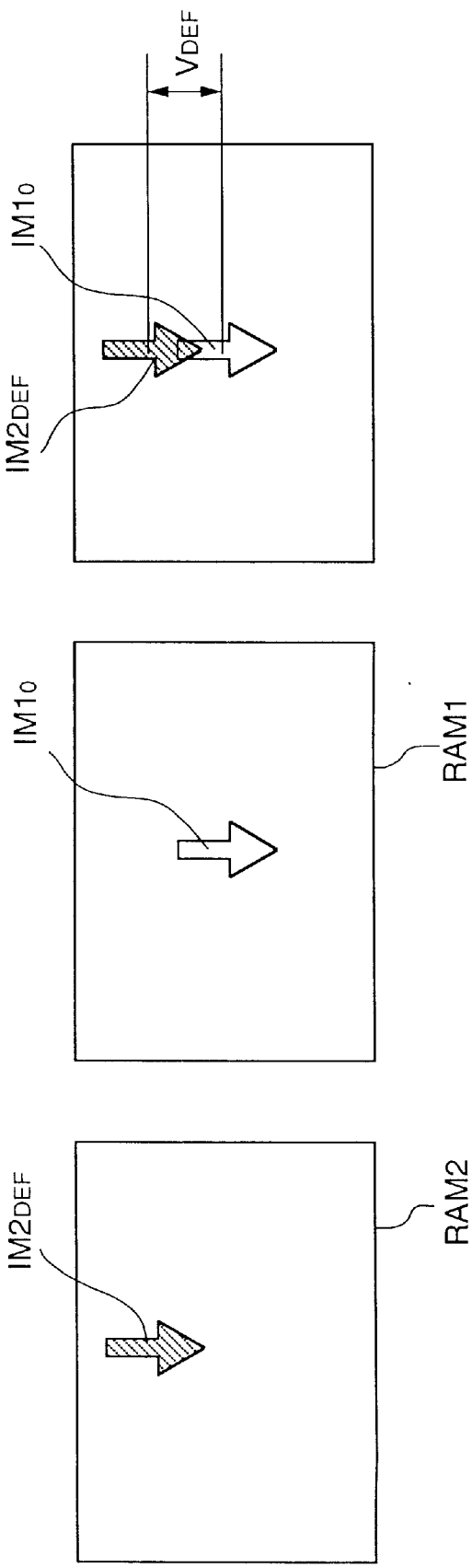

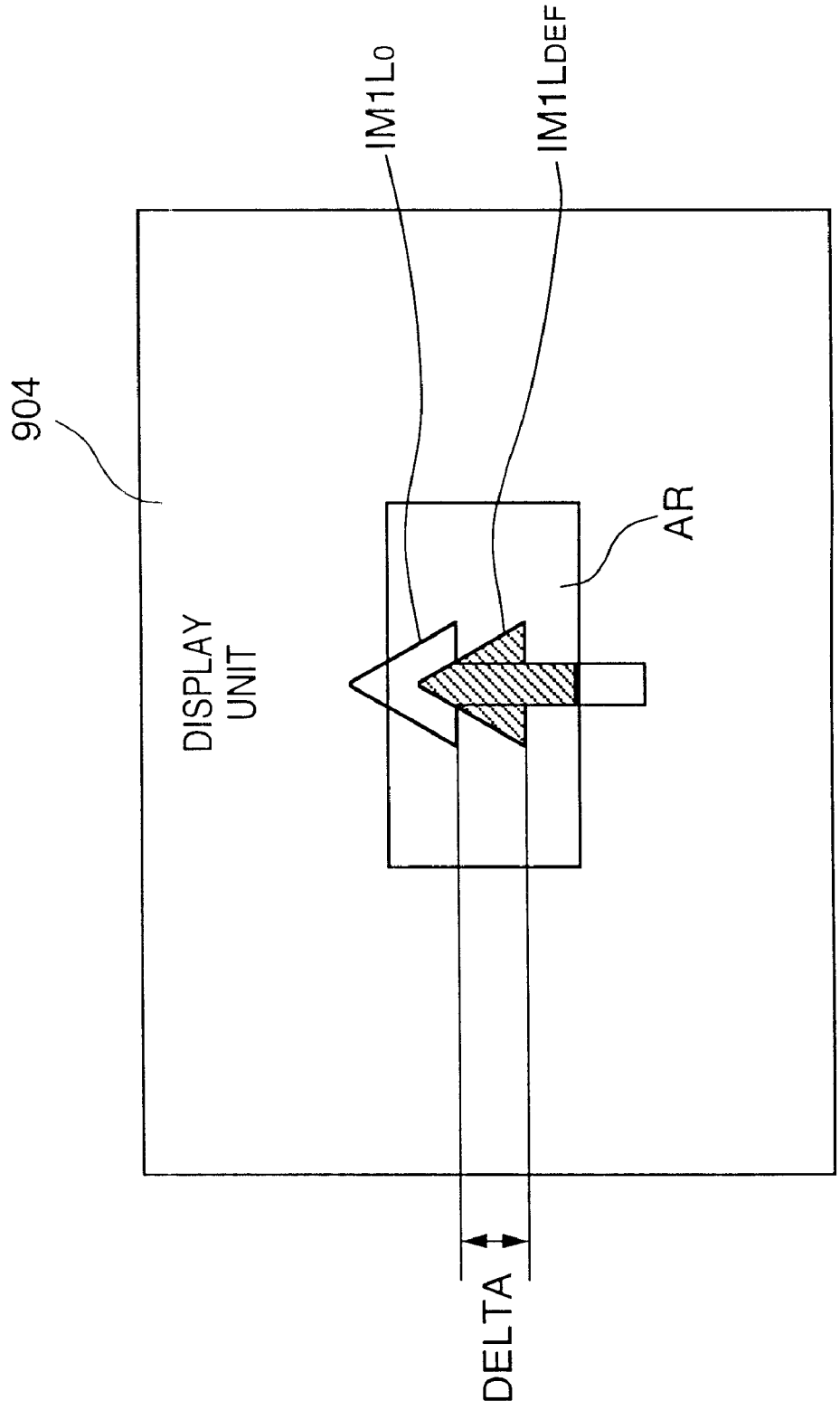

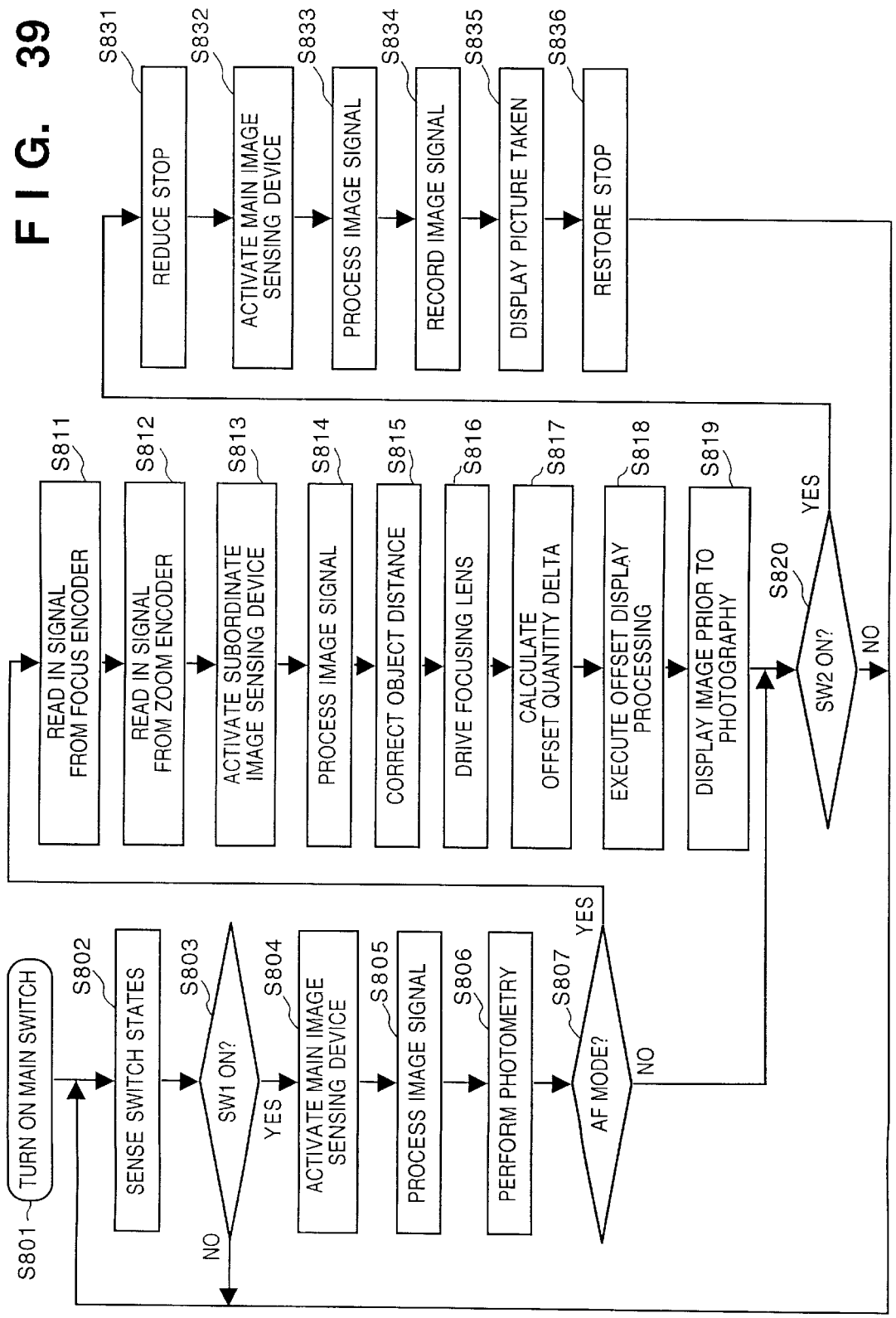

IMAGE SENSING APPARATUS

BACKGROUND OF THE INVENTION

This invention relates to an image sensing apparatus having an automatic focusing function for focusing the image of a subject.

So-called digital still cameras photoelectrically convert the image of an object, which has been formed by an image sensing optical system, as a still image using an image sensing device, and record the converted image in a memory or the like. Focus detection devices for automatic focusing used in such digital still cameras usually rely upon one of the following four methods:

(1) TTL (Through The Lens) secondary image forming phase-difference detection: Optical images that have been formed by passage through different pupil areas of an image sensing optical system are formed again as a pair of secondary images on a focus detection lens via a secondary image forming optical system and the state of focus of the image sensing optical system is detected from the spacing between the two secondary images.

(2) Passive triangulation: Two images of an object are formed on a focus detection sensor by two optical systems spaced apart by a predetermined baselength, and absolute distance to the object is sensed from the spacing between the two images formed.

(3) Active triangulation: A rangefinding pattern formed on an object by a light projection system is received by light-receiving systems spaced apart by a predetermined baselength, and the absolute distance to the object is sensed based upon outputs from the light-receiving systems.

(4) Hill-climbing sharpness detection: Part of an image sensing optical system, or the image sensing device, is oscillated minutely along the direction of the optic axis and the state of focus of the image sensing optical system is detected from the degree of fluctuation of high-frequency components (which are in synchronization with the oscillation) of the object image formed on the image sensing device.

The following finders are used as monitors for verifying the photographic area of the above-mentioned digital still cameras:

(a) an optical TTL finder, which allows the photographer to view the image of the object formed by the image sensing optical system;

(b) an optical rangefinder, which allows the photographer to view an image formed by a finder optical system that is different from the image sensing optical system; and (c) a photoelectric finder whereby an output obtained by photoelectrically converting the image of an object is displayed on a monitor, such as an a liquid crystal display.

The prior art described has a number of shortcomings, which will now be set forth.

The secondary image forming phase-difference detection method and the passive triangulation method require the use of a photoelectric converting sensor for focus detection in addition to the image sensing device for acquisition of the photographic image. This raises the cost of the focus detection mechanism and increases the size of the image sensing device.

With the passive triangulation method and the active triangulation method, the focal length and baselength of the rangefinding optical system cannot be made very large. As a result, it is required that the dimensional precision of the component parts be very high in order to assure measurement accuracy.

The active triangulation method, besides having the drawback set forth above, requires a special-purpose light receiving device for receiving projected light. This raises the cost of the focus detection mechanism.

With the hill-climbing sharpness detection method, the in-focus position cannot be detected instantaneously when the object is greatly out of focus. Though this is not a major obstacle in a movie camera, it does make a digital still camera difficult to use and can result in lost photo opportunities.

The conventional finders have the following drawbacks:

The optical TTL finder requires a, such as quick-return mirror or half-mirror, for separating and switching between a photographic light flux and a finder light flux. This results in an apparatus of large size.

The optical rangefinder uses a double-image coincidence mechanism in order to display the state of focusing. The result is a complex, costly structure.

The photoelectric finder displays images at a low resolution and makes it difficult to confirm the state of focusing accurately.

SUMMARY OF THE INVENTION

Accordingly, an object of the present invention is to provide an image sensing apparatus that is capable of performing autofocusing highly accurately through a simple structure.

According to the present invention, the foregoing object is attained by providing an image sensing apparatus comprising photoelectric conversion means for photoelectrically converting an image of an object obtained through image forming optics; optical path changeover means provided on an optical path between the image forming optics and the photoelectric conversion means and movable between first and second positions for changing over the optical path in such a manner that a first image of the object is formed on the photoelectric conversion means when the optical path changeover means is at the first position and a second image of the object is formed on the photoelectric conversion means when the optical path changeover means is at the second position; focus detection means for detecting the state of focus of the image forming optics using the first image when the optical path changeover means is at the first position; and image sensing means for picking up the second image using the photoelectric conversion means when the optical path changeover means is at the second position.

In accordance with this image sensing apparatus, focus detection and image pick-up can be performed by a single photoelectric conversion means. As a result, it is unnecessary to separately provide costly photoelectric conversion means for focus detection, thus making it possible to provide a small-size, inexpensive image sensing apparatus. In addition, a low-resolution image for focusing and a high-quality image for photography can be obtained using the same image forming optical system. Specifically, the apparatus utilizes an image forming optical system for image pick-up and the photoelectric conversion means thereof effectively to make possible rangefinding by TTL secondary image phase-difference detection or passive triangulation. As a result, it is unnecessary to separately provide costly photoelectric conversion means for focus detection, thus making it possible to provide a small-size, inexpensive image sensing apparatus capable of highly accurate rangefinding through a simple structure.

According to a preferred aspect of the present invention, the optical path changeover means of the image sensing apparatus has focus detection optics for forming two secondary images as the second image of the object from a pair of light fluxes obtained by passing the image of the object through different pupil areas; the apparatus further comprising means for detecting a phase difference between the two secondary images, which have been formed on the photoelectric conversion means, when the optical path changeover means is at the first position.

As a result, the state of focus of the image forming optical system is detected by TTL secondary image forming phase-difference detection. This makes it possible to perform accurate detection of focusing in a short period of time even in a case where the object is greatly out of focus.

According to a preferred aspect of the present invention, the optical path changeover means of the image sensing apparatus includes: a first mirror for deflecting an image forming light flux in a direction different from an image forming optic axis connecting the image forming optics and the photoelectric conversion means; and a second mirror for returning the deflected light flux to the image forming optic axis.

As a result, a focus detection optical system having a prescribed optical path can be accommodated in a small space, thus making it possible to reduce the size of the image sensing apparatus.

According to a preferred aspect of the present invention, the optical path changeover means of the image sensing apparatus includes a beam splitter for splitting an image forming light flux into light fluxes in first and second directions at a predetermined ratio of light quantities; the apparatus having finder means for viewing the image of the object along the second direction.

The photographic area of the field and the state of focus of the object can be confirmed visually in an accurate fashion by a TTL optical finder. This makes it possible to prevent failures when taking pictures.

According to a preferred aspect of the present invention, the optical path changeover means of the image sensing apparatus has lens means for making the image forming power of the image forming optics different at the first and second positions.

As a result, a focus detection optical system having a prescribed optical path can be accommodated in a small space, thus making it possible to reduce the size of the image sensing apparatus and to obtain a wide range of focus detection.

According to a preferred aspect of the present invention, the image sensing apparatus further comprises release operating means, wherein the focus detection means is activated in response to a first operation of the release operating means, and the optical path changeover means is switched from the first position to the second position in response to a second operation of the release operating means.

As a result, the transition from a focus detection operation to an image pick-up operation can be achieved quickly, thereby making it possible to perform focusing and image pick-up operations in a short period of time and to prevent the loss of photo opportunities.

According to a preferred aspect of the present invention, the image sensing apparatus further comprises display means for displaying the first image of the object when focus detection is performed by the focus detection means and the second image of the object when pick-up is performed by the image sensing means.

As a result, the state of focus of an object undergoing focus detection and the image of the object at the time of image pick-up can be confirmed visually in the form of an electronic image even if there is no optical finder provided. This makes it possible to prevent failures when taking pictures.

According to a preferred aspect of the present invention, the image sensing apparatus further comprises focusing control means for performing focusing based upon the results of focus detection by the focus detection means.

As a result, TTL focus detection is performed with a coarse image projected before image pick-up, and automatic focusing is carried out highly accurately in a short period based upon the result, thereby making it possible to focus the image of the object. A high-definition, focused image can subsequently be acquired.

According to a preferred aspect of the present invention, the image sensing apparatus further comprises display means for selectively displaying the first and second images of the object; wherein the optical path changeover means has image magnification changing means for forming the first image on the photoelectric conversion means at a first magnification at the first position and forming the second image on the photoelectric conversion means at a second magnification at the second position, whereby sizes of the first and second images displayed on the display means are made substantially the same.

In accordance with this arrangement, the normal image of an object and the reduced image of the object obtained by projection can be displayed with their sizes equalized in regard to the same subject imaged at different optical characteristics. This improves the ability to visually confirm an image of reduced size.

According to a preferred aspect of the present invention, the optical path changeover means of the image sensing apparatus forms a plurality of images of the object on the photoelectric conversion means at the first position and forms a single image of the object on the photoelectric conversion means at the second position.

In accordance with this arrangement, both an image for focus detection and an image for photography can be obtained through a simple structure by a single image sensing means.

According to a preferred aspect of the present invention, the optical path changeover means of the image sensing apparatus forms the first image of the object at a location displaced from the center of a light-receiving portion of the photoelectric conversion means at the first position and forms the second image of the object at the center of the light-receiving portion of the photoelectric conversion means at the second position.

In accordance with this arrangement, only a small image signal that has been formed on part of the light-receiving area of photoelectric conversion means is read out in a short period of time to acquire the first image of the object, and the entire image signal of the light-receiving area of the photoelectric conversion means is read out to acquire the second image of the subject.

According to a preferred aspect of the present invention, the second optical image forming means of the image sensing apparatus has an image forming power different from that of the first optical image forming means.

As a result, rangefinding based upon passive triangulation can be carried out.

According to a preferred aspect of the present invention, the image sensing apparatus further comprises image signal recording means for recording the output of the first photoelectric conversion means.

As a result, an image obtained from an image forming optical system for photography and an image obtained from the photoelectric conversion means thereof can be recorded and preserved.

According to a preferred aspect of the present invention, the first optical image forming means of the image sensing apparatus includes a zoom lens and the rangefinding means has image magnification correction means for correcting a fluctuation in image magnification that accompanies a zooming operation of the zoom lens.

This arrangement is such that when the image forming optical means for image pick-up is used for rangefinding, a parameter correction conforming to the power fluctuation is carried out to perform a rangefinding calculation. This makes it possible to perform accurate rangefinding at all times even when power fluctuates.

According to a preferred aspect of the present invention, the image sensing apparatus further comprises display means for displaying the first image.

In accordance with this arrangement, the image of a subject for image pick-up is displayed for monitoring. As a result, the state of subject focus can be checked and it is possible to prevent the taking of a photograph that is out of focus.

An image sensing apparatus according to a preferred aspect of the present invention comprises projection means for projecting a rangefinding a light flux toward an object to form a rangefinding pattern on the object; optical image forming means, which is spaced away from the projection means by a predetermined baselength, for selectively forming the image of the rangefinding pattern and the image of the object; photoelectric conversion means for photoelectrically converting the image of the rangefinding pattern and the image of the object; and rangefinding means for sensing the distance between the optical image forming means and the object based upon an output from the photoelectric conversion means when the image of the rangefinding pattern has been received by the photoelectric conversion means.

In accordance with this arrangement, both a projection pattern for rangefinding in active triangulation and an image of the object can be acquired by a single image sensing system, as a result of which the apparatus can be reduced in size and lowered in cost.

According to a preferred aspect of the present invention, the optical image forming means of the image sensing apparatus includes a zoom lens and the rangefinding means has image magnification correction means for correcting a fluctuation in image magnification that accompanies a zooming operation of the zoom lens.

In accordance with this arrangement, when the optical image forming means for image pick-up is used for rangefinding, a parameter correction conforming to the power fluctuation, is carried out to perform a rangefinding calculation. This makes it possible to perform accurate rangefinding at all times even when power fluctuates.

According to a preferred aspect of the present invention, the image sensing apparatus further comprises image signal recording means for recording the output of the photoelectric conversion means when the image of the subject has been received by the photoelectric conversion means.

As a result, an image obtained from an image forming optical system for image pick-up and an image obtained from the photoelectric conversion means thereof can be recorded and preserved.

According to a preferred aspect of the present invention, the image sensing apparatus further comprises wavelength region selecting means, which is interposed between the optical image forming means and the photoelectric conversion means, for passing a first wavelength region when the image of the rangefinding pattern is photoelectrically converted and passing a second wavelength region when the image of the object is photoelectrically converted.

In accordance with this arrangement, a wavelength selection suited to acquisition of a pattern image for rangefinding is performed at the time of rangefinding and a wavelength selection suited to acquisition of the image of the object at the time of image pick-up. As a result, highly accurate rangefinding can be performed and it is possible to obtain a highly precise image that is free of unnecessary light rays.

According to a preferred aspect of the present invention, the image sensing apparatus further comprises focusing means for focusing the first optical image forming means based upon an output of the rangefinding means; focal shift discrimination means for discriminating the state of focus of the image of the object based upon outputs from the rangefinding means and the focusing means; image signal combining means for combining outputs from the first and second photoelectric conversion means; display means for displaying an output image from the image signal combining means; and combining control means for changing the operation of the image signal combining means based upon an output from the focal shift discrimination means.

In accordance with this arrangement, the extent to which the image of an object is out of focus can be checked visually and clearly by images combined and displayed. This makes it possible to prevent the taking of a photograph that is out of focus.

According to a preferred aspect of the present invention, the combining control means of the image sensing apparatus varies relative amount of offset between display positions, on the display means, of outputs from the first and second photoelectric conversion means in dependence upon a focal shift signal output by the focal shift discriminating means.

In accordance with this arrangement, the amount of focal shift of the image of an object can be checked visually and clearly from the amount of relative offset between two images displayed in superposition. This makes it possible to prevent the taking of a photograph that is out of focus.

An image sensing apparatus according to a preferred aspect of the present invention comprises optical image forming means for capturing a light flux from an object and forming an image of the object; photoelectric conversion means for photoelectrically converting the image of the object; rangefinding means for sensing the distance between the optical image forming means and the object; focusing means for focusing the image forming optical means based upon an output from the rangefinding means; display means for displaying the image of the object from the photoelectric conversion means; focal shift discrimination means for discriminating the state of focus of the image of the object based upon outputs from the rangefinding means and the focusing means; and display control means for varying the form of display of the image of the object on the display means based upon an output from the focal shift discrimination means.

In accordance with this arrangement, the amount of focal shift of the image of an object can be checked visually and clearly based upon images combined and displayed. This makes it possible to prevent the taking of a photograph that is out of focus.

According to a preferred aspect of the present invention, the display means of the image sensing apparatus has first and second display areas, and the display control means varies the position of a displayed image in the second display area relative to a displayed image in the first display area in dependence upon a focal shift signal from the focal shift discrimination means.

In accordance with this arrangement, the amount of focal shift of the image of an object can be checked visually and clearly from the amount of relative offset between two images displayed in superposition. This makes it possible to prevent the taking of a photograph that is out of focus.

According to a preferred aspect of the present invention, the focal shift discrimination means of the image sensing apparatus detects the amount of focal shift from outputs from the rangefinding means and the focusing means.

As a result, a finder display or the like can be presented using information relating to the amount of focal shift sensed. This makes it possible to prevent the taking of a photograph that is out of focus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 21A, 21B are diagrams useful in describing the state of image formation when rangefinding is performed according to the sixth embodiment;

FIGS. 22A, 22B are diagrams useful in describing the principle of image-magnification correction according to the sixth embodiment;

FIG. 23 is a diagram useful in describing the concept of an image signal when a rangefinding calculation is performed according to the sixth embodiment;

FIG. 38 is a diagram useful in describing the state of an image display when rangefinding is performed according to the ninth embodiment; and FIG. 39 is a flowchart showing a procedure for controlling an image sensing apparatus according to the ninth embodiment.

DESCRIPTION OF THE PREFERRED EMBODIMENTS

Embodiments of the present invention will now be described with reference to the drawings.

<First Embodiment>

FIGS. 1 through 7 are diagrams relating to a first embodiment of the present invention.

Figure 1:
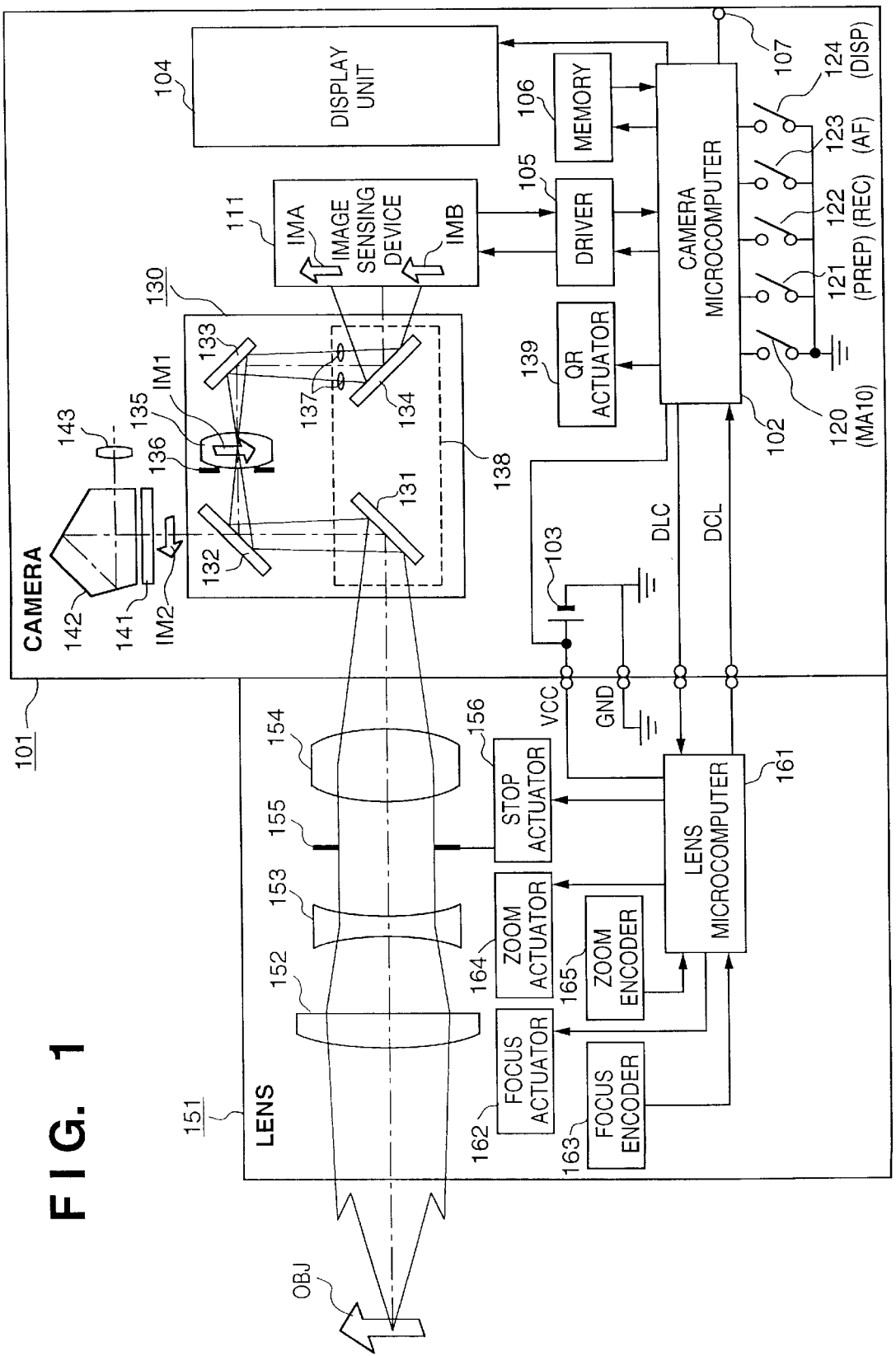
FIG. 1 is a block diagram illustrating the construction of an image sensing apparatus according to a first embodiment of the present invention, this diagram showing the apparatus at the time of focus detection.

FIG. 1 is a block diagram showing the construction of an image sensing apparatus according to a first embodiment. This embodiment relates to a so-called single-lens reflex camera in which an interchangeable lens having an image sensing optical system is capable of being removably mounted on a camera body having a image sensing device.

The camera includes a camera body 101 having a mount (not shown) joining various functional portions for image pick-up and an interchangeable lens 151, described later. An object is indicated at OBJ.

The camera is internally provided with a single-chip microcomputer 102 having a ROM, a RAM and A/D, D/A conversion functions. In accordance with a camera-sequence program stored in the ROM, the microcomputer 102 implements a series of camera operations, such as automatic exposure control (AE), autofocus (AF) and image sensing. The microcomputer 102 controls various circuits and lens operation by communicating with peripheral circuitry within the lens body 101 and with the interchangeable lens 151. According to the present invention, the ROM constitutes a storage medium and can be a semiconductor memory, an optical disk, a magneto-optic device or a magnetic medium, etc.

The mount joining the camera body 101 and the interchangeable lens 151 is provided with four connection terminals. A power supply 103 supplies the camera circuits and actuators with power-supply voltage and supplies the interchangeable lens 151 with power via a line $V_{CC}$.

A line DCL transmits a signal from the microcomputer 102 to a microcomputer 161 (described later) inside the lens. A line DLC transmits a signal from the microcomputer 161 inside the lens to the microcomputer 102 inside the camera body. The camera body 101 controls the interchangeable lens 151 via these two lines. The camera body 101 and interchangeable lens 151 are connected to ground via a line GND.

The camera body 101 has a display unit 104, such as a liquid crystal panel, having a display function for displaying photographic conditions and a monitor function for monitoring a sensed image.

A driver 105 drives and controls an image sensing device 111, described later. The driver 105 controls the storage of charge in the image sensing device 111, charge transfer, CDS (Correlated Double Sampling), AGC (Automatic Gain Control), A/D conversion, gamma correction and AWB (Automatic White Balance), etc.

A memory 106 records and preserves image signal data representing a sensed image and can be a semiconductor memory, magnetic disk or optical disk, etc.

A terminal 107 for outputting a recorded image to external equipment is connected to a personal computer or printer.

The image sensing device 111, such as a CCD, is a two-dimensional photoelectric sensor for photoelectrically converting the image of the object formed by an image sensing optical system 152–154.

The camera body has a main switch 120. When this switch is turned on (closed), the microcomputer 102 allows the execution of a prescribed program relating to preparations for photography, namely exposure metering and focus detection, etc.

Switches 121 (SW1) and 122 (SW2) are linked to a camera release button and are turned on (closed) by pressing the release button through first and second stroke lengths, respectively. More specifically, the switch 121 is for preparing for image pick-up. When this switch is turned on, preparatory photographic operations, such as exposure metering, focus detection and focusing, are executed. The switch 122 is a photography switch. When this switch is turned on, a photographic image that has been formed on the image sensing device 111 is acquired and recorded in the image memory 106.

An AF mode switch 123 is used to select the autofocus mode. A display switch 124 is used to designate a display for monitoring a photographic image.

The image of the object formed by the image-sensing optical system is formed again by a focus-detection module 130 using the various optical elements set forth below. Specifically, the focus-detection module 130 includes a first mirror 131 for fully reflecting the photographic light flux upward in FIG. 1; a semi-transparent second mirror 132 for passing about 70% of the fully reflected light flux and reflecting the remaining 30% of the light flux rightward in FIG. 1; a third mirror 133 for fully reflecting the light flux downward in FIG. 1; and a fourth mirror 134 for fully reflecting the fully reflected light flux rightward in FIG. 1; a field lens 135 placed in a first predetermined focal plane of the image-sensing optical system, with a primary image IM1 of the object OBJ being formed in this predetermined focal plane by the image-sensing optical system; a field mask 136 that decides a focus-detection area; and a pair of secondary image-forming lenses 137 for forming the images of the primary image IM1 again.

The entrance pupil of the pair of secondary image-forming lenses 137 and the exit pupil of a stop 155, described later, are placed in a projection relationship by the field lens 135. Consequently, two secondary images IMA and IMB resulting from the light flux that has passed through different pupil areas (the exit pupil of the stop 155 and the entrance pupil of the pair of secondary image-forming lenses 137) of the image-sensing optical system are formed on the image-sensing device 111.

A movable mirror unit 138 is capable of moving the first mirror 131, the fourth mirror 134 and the secondary image-forming lenses 137 in unison to advance and retract the same into and out of the photographic light flux.

A quick-return (QR) actuator 139 drives the movable mirror unit 138 to advance and retract the same.

A focusing screen 141 is placed in a second predetermined focal plane that is in a conjugate relationship with the first predetermined focal plane mentioned above. A secondary primary image IM2 resulting from light flux reflected by the first mirror 131 and passed by the second mirror 132 is formed on the focusing screen 141.

A pentagonal prism 142 and an eyepiece 143 construct an optical finder that makes it possible for the photographer to view the secondary primary image IM2.

The components on the side of the lens will now be described.

The interchangeable lens 151 is capable of being removably mounted on the camera body 101 and includes a focusing-lens group 152 for performing focusing by being advanced and retracted along the direction of the optic axis; a zoom-lens group 153 for performing zooming by being advanced and retracted along the direction of the optic axis; and a relay-lens group 154 for performing a prescribed image-forming operation together with the lens groups 152 and 153. The lens groups 152, 153 and 154 together construct the image-sensing optical system.

The stop 155 decides the entrant light flux of the image-sensing optical system, and an actuator 156 drives the stop 155.

Like the microcomputer 102, the microcomputer 161 inside the lens is a single-chip microcomputer having a ROM, a RAM and A/D, D/A conversion functions. In accordance with an instruction sent from the microcomputer 102 via the signal line DCL, the microcomputer 161 controls the driving of a focus actuator and zoom actuator, described later, as well as the driving of the actuator mentioned above. Various operating states of the lens and parameters specific to the lens are transmitted to the microcomputer 102 by the signal line DLC.

A focus actuator 162 drives the focusing-lens group 152 to advance and retract the same, and a focus encoder 163 senses position information indicative of the position of the focusing-lens group 152, namely object-distance information. A zoom actuator 164 drives the zoom-lens group 153 to advance and retract the same, and a zoom encoder 165 senses position information indicative of the position of the zoom-lens group 153, namely focal-length information.

<Principles>
First Embodiment

By virtue of the construction described above, the interchangeable lens 151 forms the image of the object OBJ on the image sensing device 111 of the camera and performs focusing, zooming and control of entrant-light quantity based upon a control instruction from the camera.

The state of image formation of the object OBJ at the time of focus detection prior to preparations for photography will now be described.

A light flux from the object OBJ passes through the lens groups 152, 153, 154 and stop 155 constructing the image-sensing optical system and is reflected by the first and second mirrors 131, 132, respectively, to form the first primary image IM1 on a first image-forming plane. The light flux is then reflected by the third mirror 133, after which the light flux impinges upon the two secondary image-forming lenses 137. Each of the lenses 137 functions as a pupil. Thus, the lenses 137 form two images by pupil-splitting or separating (referred to as simply "splitting", hereinafter). In other words, two light fluxes are obtained and these are reflected by the fourth mirror 134, after which the reflected light fluxes are projected onto the light-receiving surface of the image-sensing device 111 as the two secondary images IMA and IMB.

Figure 2:
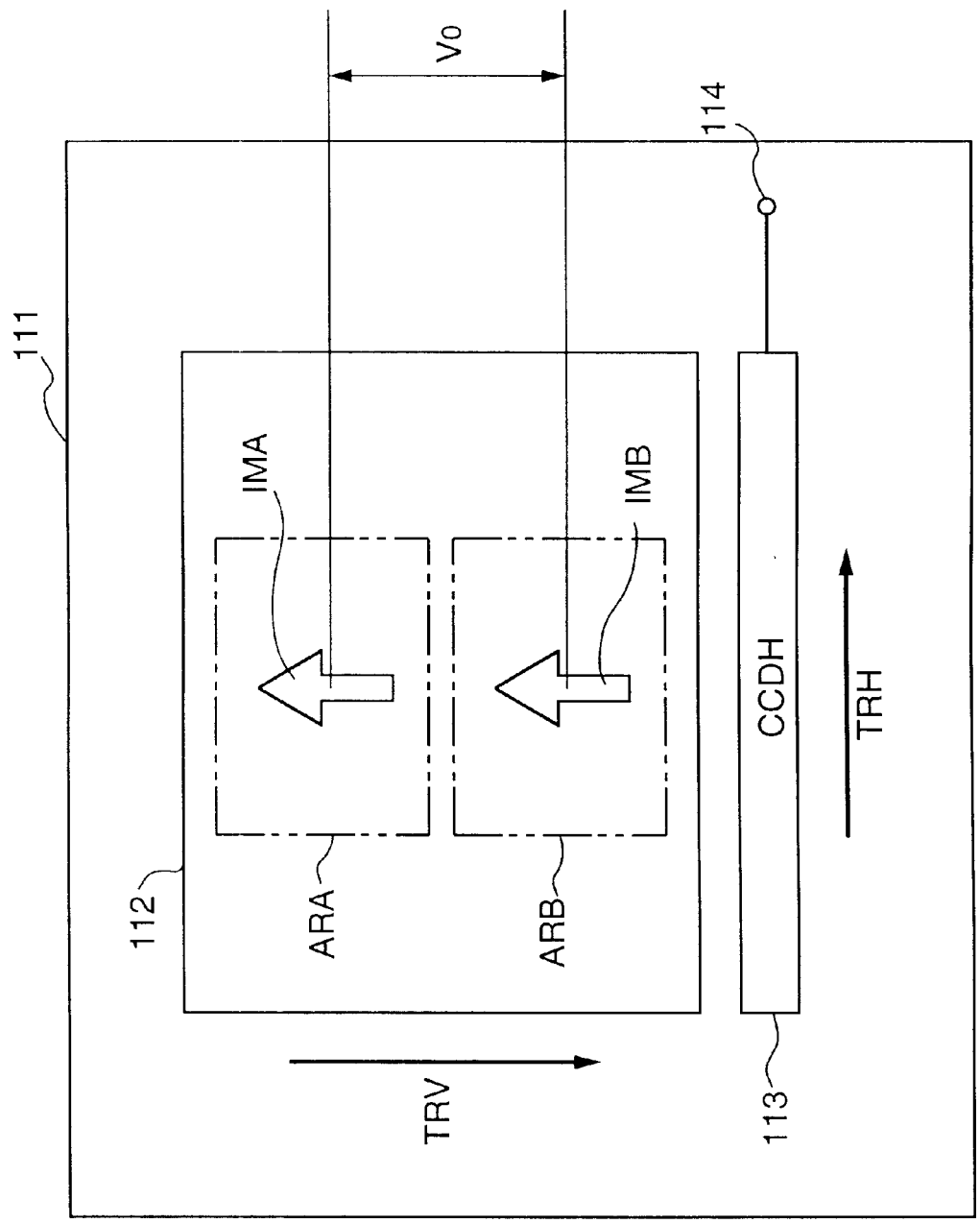
FIG. 2 is a diagram showing the formation of images of an object when the object is in focus at the time of focus detection according to the first embodiment.

FIG. 2 is a diagram showing the state of image formation of the secondary images IMA, IMB on the image-sensing device 111.

A light-receiving portion 112 of the image sensing device 111 has m×n light-receiving pixels and a charge-transfer portion (CCDV for vertical transfer, not shown) for transferring electric charge that has accumulated in these pixels. A horizontal transfer portion (CCDH) 113 stores electric charge transferred in the direction of arrow TRV by the vertical transfer portion CCDV in the light-receiving portion 112, then transfers the charge in the direction of arrow TRH and outputs an image signal from a signal-output portion 114 to the image-sensor driver 105.

Two areas ARA, ARB on the light-receiving portion 112 are images of the field mask 136 projected by the secondary image forming lenses 137 of FIG. 1. The secondary images IMA, IMB of the first primary image IM1 are formed in the areas ARA, ARB, respectively. Let $V_0$ represent the spacing between the two images IMA, IMB when the image-sensing optical system is in focus with respect to the object OBJ.

Figure 3:
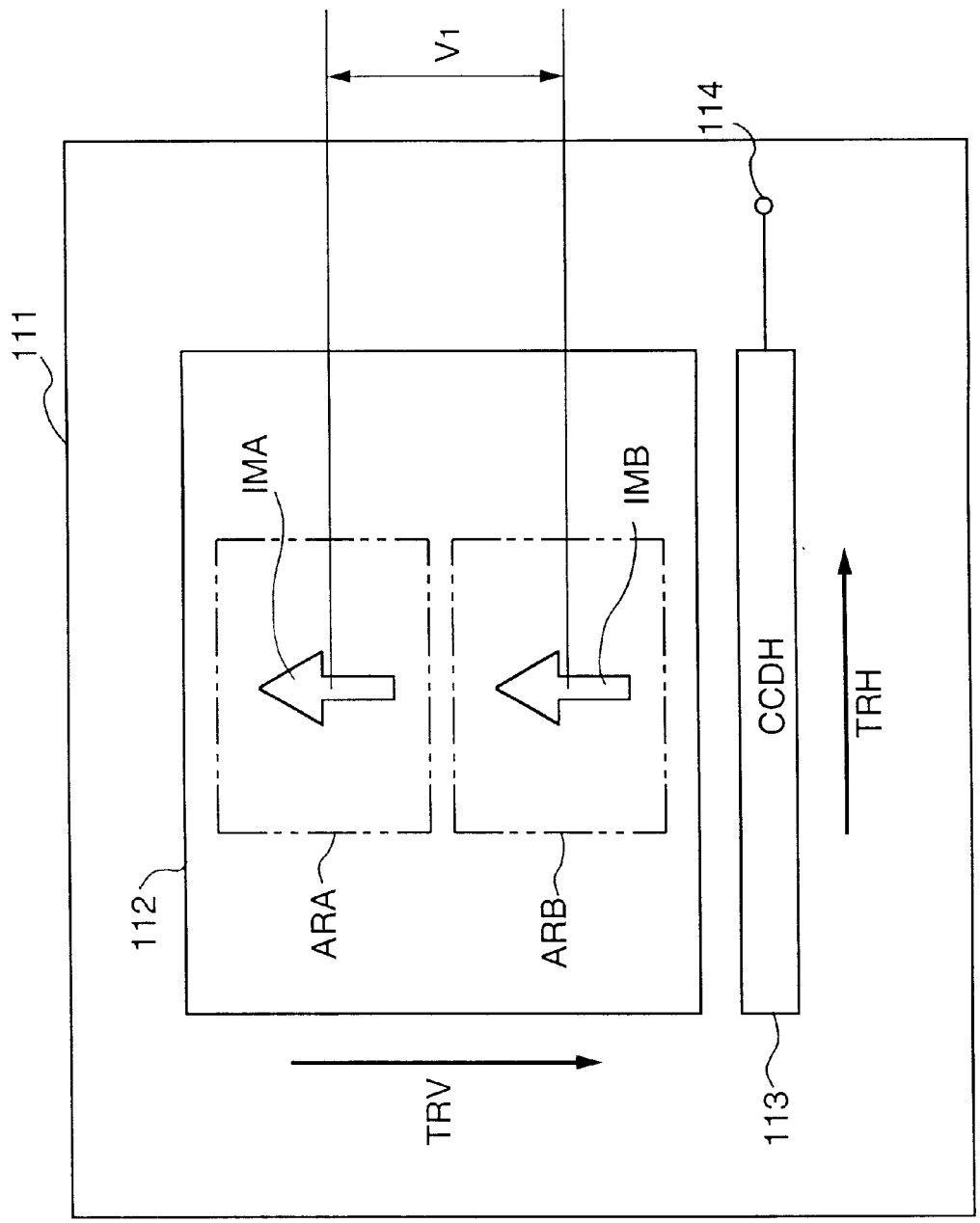
FIG. 3 is a diagram showing the formation of the images of an object when the object is not in focus at the time of focus detection according to the first embodiment.

FIG. 3 is a diagram showing the state of image formation of the secondary images on the image-sensing device 111 when the image-sensing optical system is not in focus with respect to the object OBJ. In this case the spacing between the two images IMA and IMB is $V_1$ ($\neq V_0$).

When the switch 121 which prepares the camera body 101 for photography is closed, stored electric charge in the light-receiving portion 112 is read out, converted from an analog to a digital value and transmitted to the microcomputer 102. In accordance with a well--known correlation algorithm, the spacing $V_1$ between the two above-mentioned images is calculated and the difference between $V_1$ and the in-focus spacing $V_0$, i.e., $$\Delta v = V_1 - V_0$$

is obtained, thereby making it possible to detect the extent to which the object OBJ is out of focus. The amount of such defocus is transmitted to the interchangeable lens 151 and the focusing-lens group 152 is driven accordingly to perform an autofocus operation.

Figure 4:
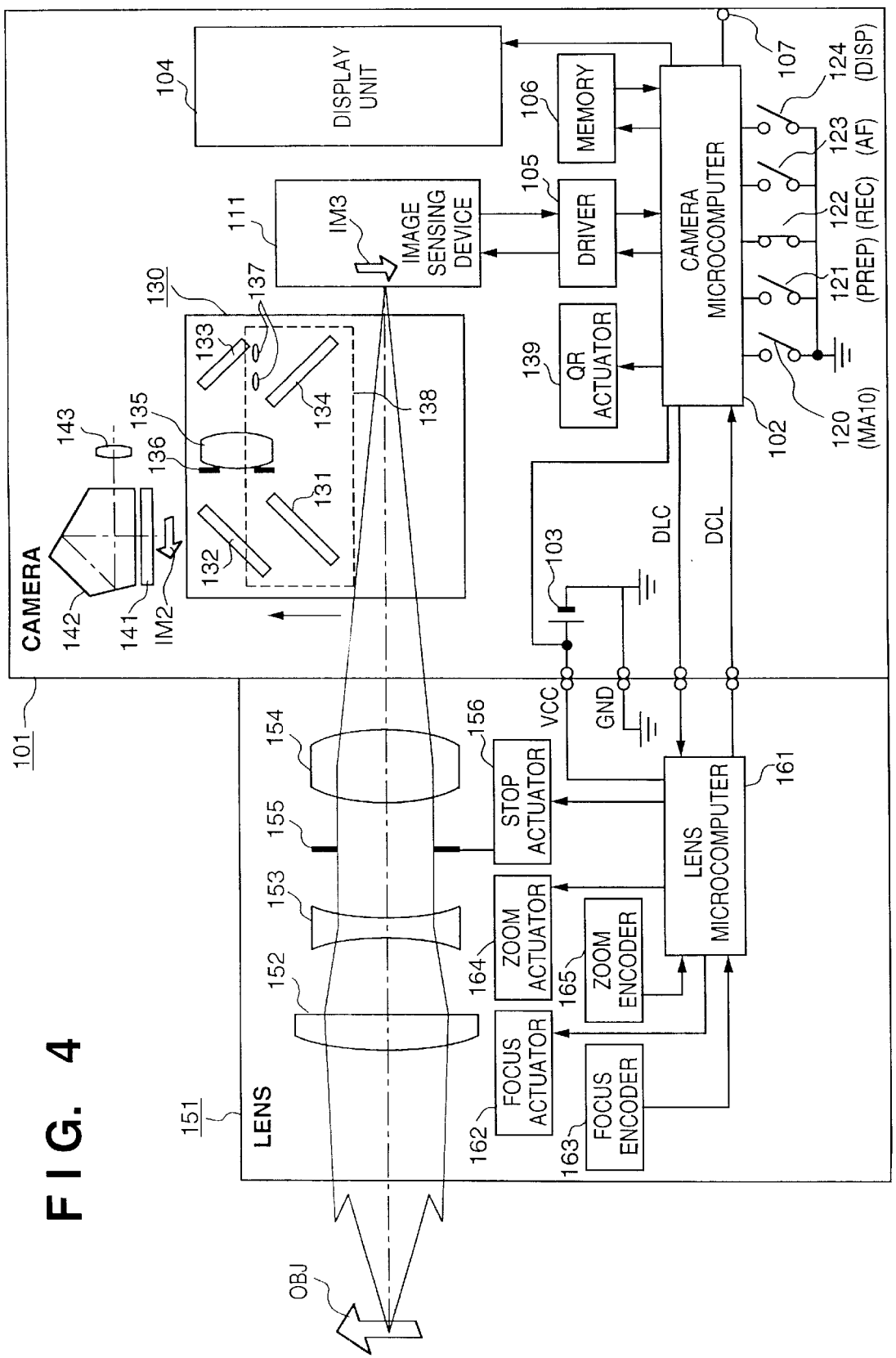
FIG. 4 is a diagram showing the image sensing apparatus at the time of image pick-up according to the first embodiment.

FIG. 4 is a diagram showing the camera when the photography switch 122 of the camera body 101 is closed upon the completion of the autofocus operation, thereby establishing the photographic state.

When the photography switch 122 is closed, the movable mirror unit 138 is withdrawn away from the optical path of photography (i.e., upward in FIG. 4) by the quick-return actuator 139. When this is done, the mirrors are removed from between the image-sensing optical system and image-sensing device 111 so that a primary image IM3 produced by the image-sensing optical system is formed on the image-sensing device 111.

Figure 5:
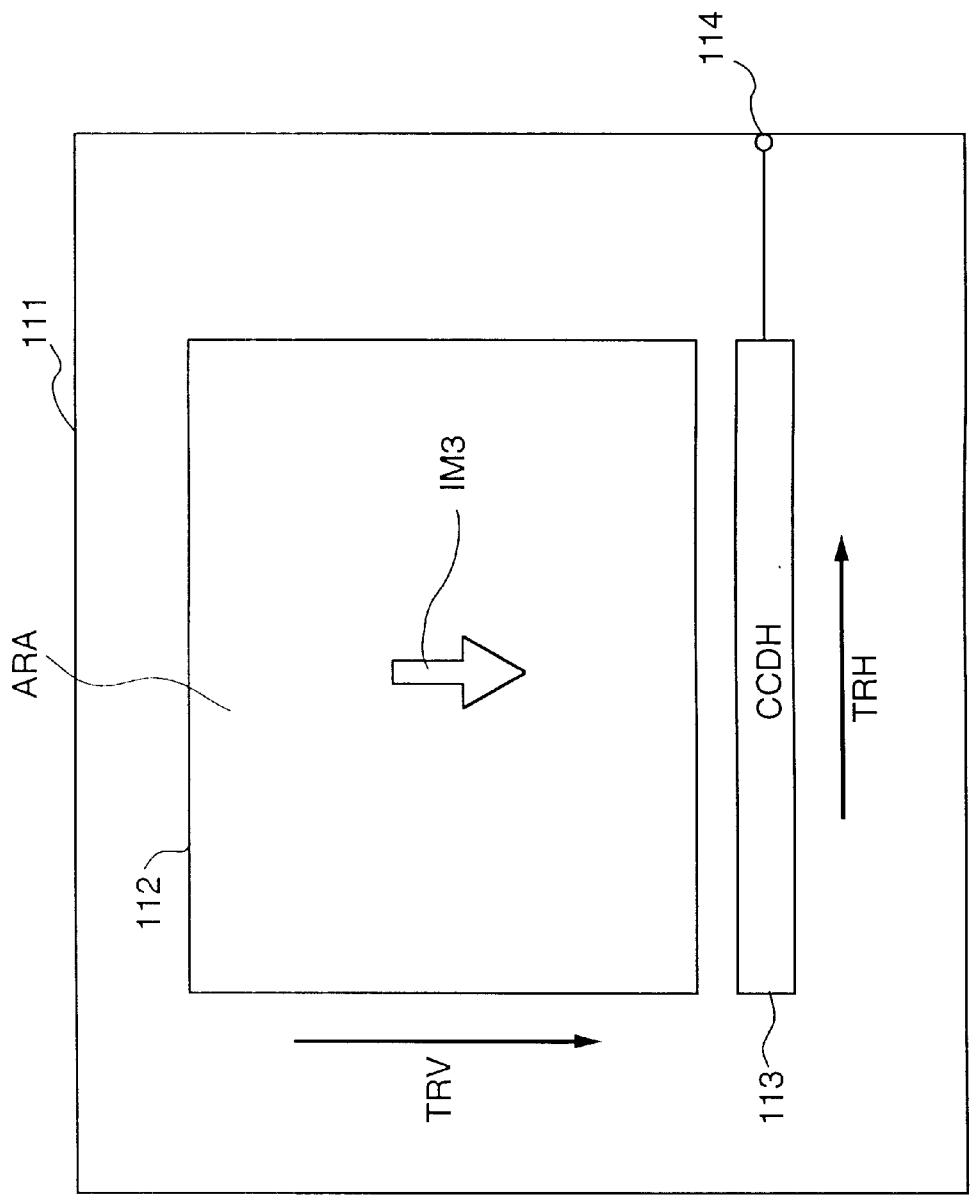
FIG. 5 is a diagram showing the formation of the image of an object at the time of image pick-up according to the first embodiment.

FIG. 5 is a diagram showing formation of the image of the object on the image-sensing device 111 at the time of photography. Here the primary image IM3 of the object OBJ is projected onto the light-receiving portion 112. Accordingly, the image signal prevailing under these conditions is accepted and recorded in the image memory 106 of the camera body 101, whereby the image is sensed.

<Control Procedure>
First Embodiment

Figure 6:
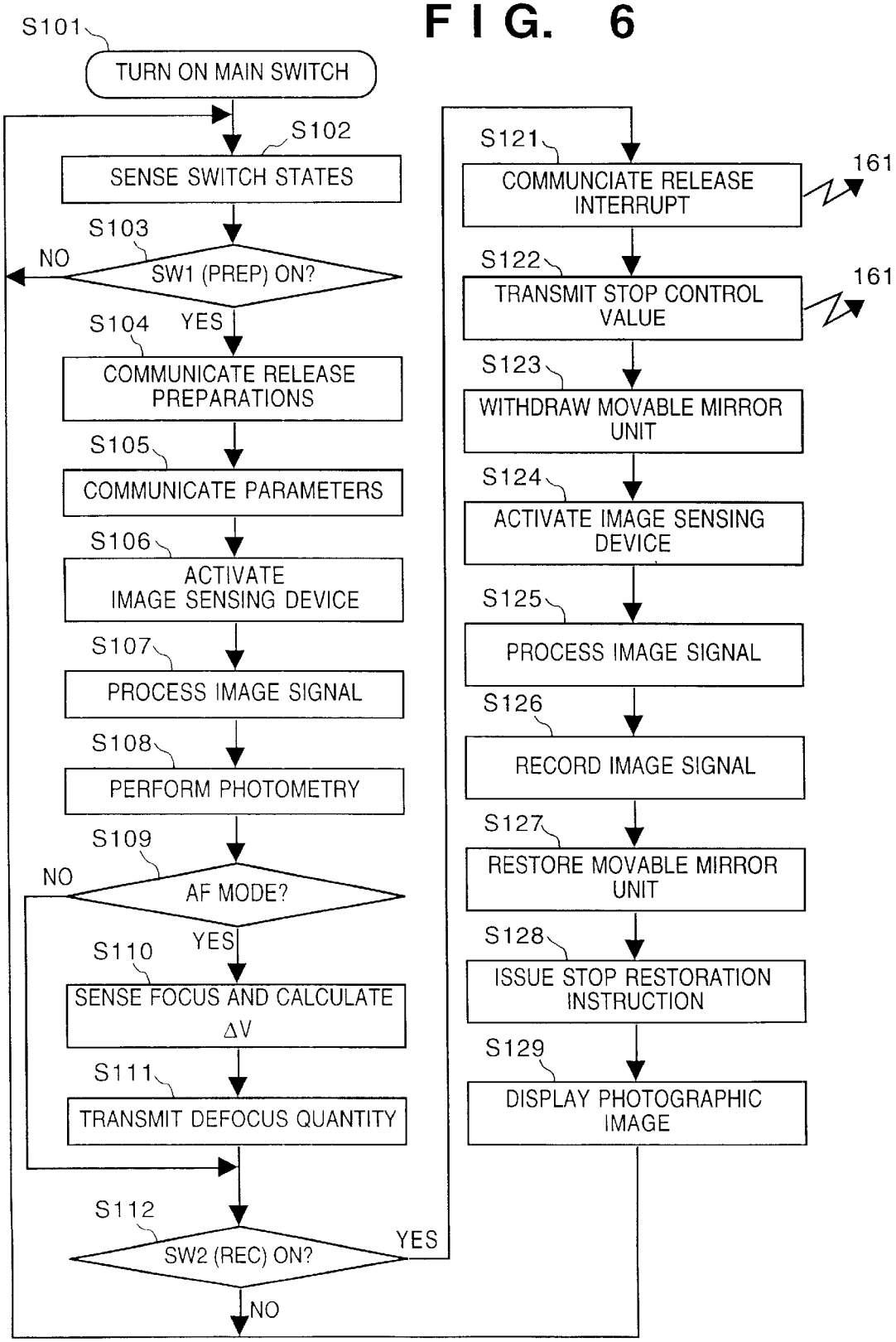
FIG. 6 is a flowchart showing a procedure for controlling a camera according to the first embodiment.
Figure 7:
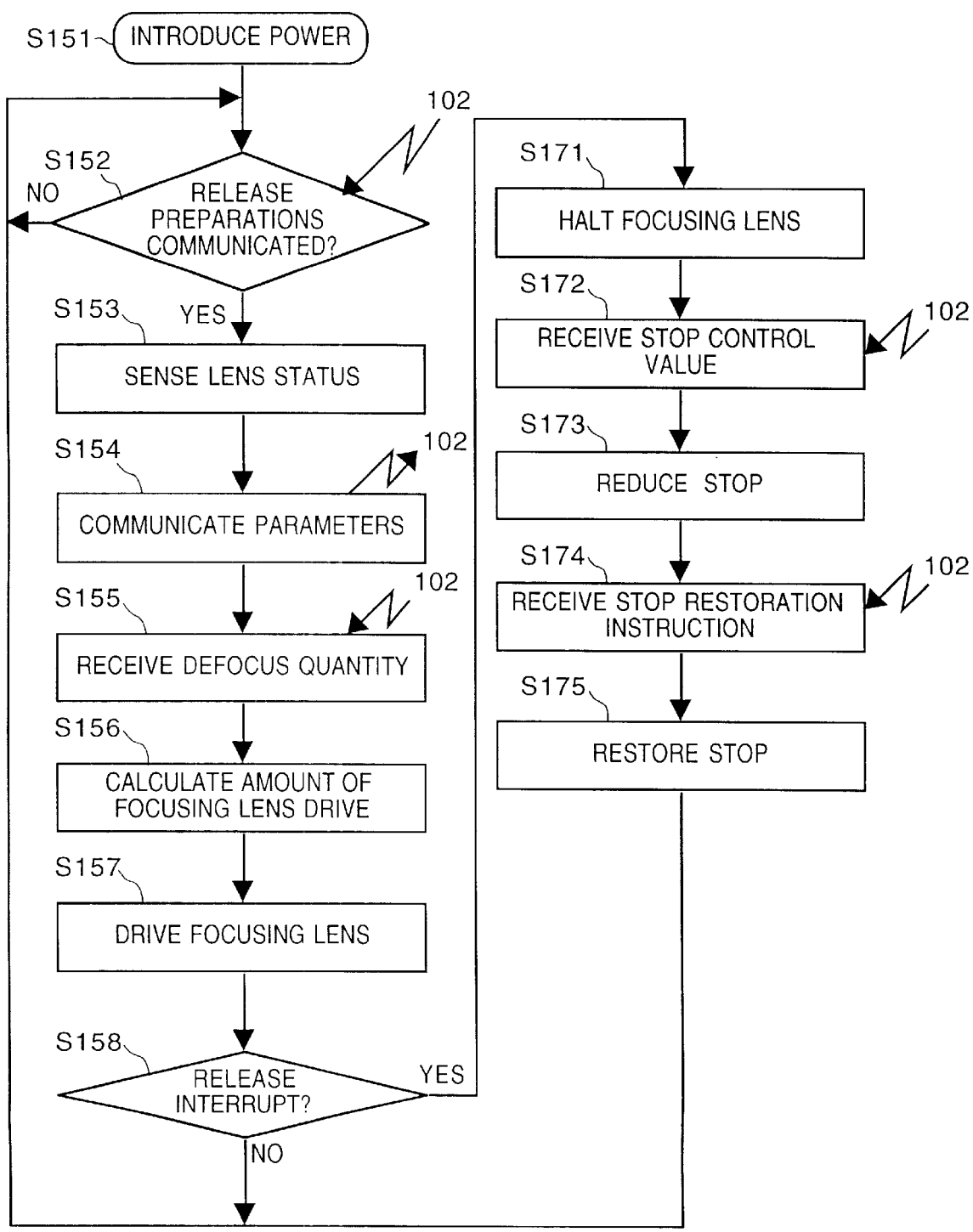
FIG. 7 is a flowchart showing a procedure for controlling a lens according to the first embodiment.

FIGS. 6 and 7 are flowcharts illustrating the control flows of the microcomputers 102, 161 when focus detection, focusing, and photography are performed by the camera body 101 and interchangeable lens 151 according to the first embodiment of the present invention.

The control flow of the microcomputer 102 inside the camera will be described first in accordance with FIG. 6 while making reference to FIG. 1.

When the main switch 120 of the camera body 101 is closed (turned on), the microcomputer 102 is activated from the sleep state and control proceeds from step S101 to step S102, at which the states of the switches 121–124 inside the camera body 101 are sensed.

The state of the photography-preparation switch 121 (SW1), which is turned on by pressing the release button through its first stroke length, is sensed at step S103. Control returns to step S102 when the switch 121 is off (open) and proceeds to step S104 when the switch 121 is on.

The fact that preparation for shutter release has been executed is communicated to the microcomputer 161 inside the interchangeable lens 151 at step S104. This is followed by step S105, at which parameters are communicated to the microcomputer 161. The communication of parameters involves transmitting lens-specific information such as the lens f-number, focal length and focusing sensitivity to the camera.

Next, at step S106, the image-sensing device 111 is activated to acquire an image signal.

Processing of the image signal acquired at step S106 is executed at step S107. More specifically, processing such as A/D conversion of the image signal, white balance adjustment, and gamma correction is executed.

This is followed by step S108, at which object-brightness information is calculated from the image signal processed at step S107. Further, in accordance with a predetermined exposure-control program, a control value for narrowing the stop 155 and the exposure time (charge storage time) of the image sensing device 111 are calculated.

The setting of the AF mode switch 123 is discriminated at step S109 to determine if the autofocus (AF) mode is in effect. Control proceeds to step S112 if the mode is not the AF mode and to step S110 if the mode is the AF mode.

The defocus quantity $\Delta V$ of the object is calculated from the spacing between the two secondary images IMA, IMB at step S110 in the manner illustrated in FIG. 3. Next, at step S111, the defocus quantity $\Delta V$ calculated at step S110 is transmitted to the microcomputer 161 inside the lens.

The state of the photography switch (SW2) 122 is discriminated at step S112. If the switch 122 is off, control returns to step S102 so that the processing of steps S102–S111 is executed again. If the photography switch 122 is found to be on at step S112, it is judged that release has been performed and control shifts to step S121.

The transition to the release operation is communicated to the microcomputer 161 in the lens at step S121. The stop-control value that was calculated at step S106 is transmitted to the microcomputer 161 at step S122.

Next, at step S123, the movable mirror unit 138 is withdrawn from the photographic optical path of FIG. 1 to the attitude shown in FIG. 4, where the mirror unit 128 is outside the optical path.

Control of charge accumulation and charge transfer in the image sensing device is performed at step S124 for the purpose of photography. This is followed by step S125, at which processing of the image signal acquired at step S124 is executed in the same manner as performed at step S107. More specifically, the image signal is applied to A/D conversion, white balance adjustment, gamma correction and compression processing, etc.

Next, at step S126, the signal processed at step S125 is recorded and preserved in the image memory 106. The withdrawn movable mirror unit 138 is driven at step S127 so as to be returned to the optical path for photography. An instruction for restoring the stop 155 is transmitted to the microcomputer 161 at step S128.

The image recorded at step S126 is displayed on the display unit 104 at step S129, thereby allowing the photographer to view the image that is the result of photography.

Control returns to step S102 when the above-described photographic operation is completed.

FIG. 7 is a flowchart illustrating control of the microcomputer 161 inside the lens.

Power is supplied to the interchangeable lens by turning on the main switch 120 on the camera side, whereupon control proceeds from step S151 to step S152. The microcomputer 161 is in the sleep state waiting for communication from the camera body. Control stops at step S152 if there is no communication from the camera body.

If communication relating to release preparation corresponding to step S104 in FIG. 6 is received from the microcomputer 102, control proceeds from step S152 to step S153.

This is followed by step S153, at which the microcomputer 161 inside the lens senses the states of the focus encoder 163 and zoom encoder 165 and judges the current status of the lens. Communication of parameters corresponding to step S105 in FIG. 6 is performed at step S154 based upon the lens status sensed at step S153.

A signal representing the amount of defocusing corresponding to step S111 in FIG. 6 is received at step S155.

The amount of focusing-lens drive necessary is calculated at step S156 based upon the amount of defocusing received at step S155 and the lens status sensed at step S153. Next, at step S157, the focusing lens is driven to performing focusing based upon the amount of drive calculated at step S156.

It is determined at step S158 whether a release interrupt corresponding to step S121 of FIG. 6 has occurred. If the decision is "NO", control returns to step S152. If a release interrupt occurs, however, control proceeds from step S158 to step S171, at which driving of the focusing lens is halted.

A stop-control value is received from the microcomputer 102 at step S172. Next, at step S173, the stop actuator 156 is driven in accordance with the stop-control value received at step S172. Photography is performed on the camera side.

When the photographic operation on the camera side is completed, a stop-restoration instruction is received at step S174. The stop is restored to the open state at step S175 in accordance with this instruction.

When the photographic operation on the lens side is completed, control returns to step S152.

The operation of the camera and lens according to the foregoing flowcharts will now be summarized.

At the photography preparation stage, the photographic light flux is split and projected upon the image-sensing device 111 via the focus-detection optical system in the manner shown in FIG. 1. When the main switch 120 and photography-preparation switch 121 are turned on by the photographer, the camera calculates the defocus quantity $\Delta V$ of the object from the spacing between the two secondary images projected upon the image-sensing device 111, as shown in FIG. 3, and transmits $\Delta V$ to the interchangeable lens 151. In response, the interchangeable lens 151 drives the focusing lens in accordance with the defocus quantity $\Delta V$, thereby performing focusing. Next, when the photography switch 122 is turned on, the movable mirror unit 138 is withdrawn from the photographic light flux, as shown in FIG. 4, so that the in-focus image of the object is projected upon the image-sensing device 111, as shown in FIG. 5. The camera acquires the image of the object and records the image in the image memory 106.

\<Advantages\>

First Embodiment (AD1) The focus-detection module 130 composed of the four mirrors (131–134) is placed in the optical path between the optical-lens system and the image-sensing device, and the pair of optical lenses 137 is provided in the optical path of the focus-detection module 130. The optical lens 137 forms two images on the image-sensing device 111 when the object is not in focus and forms one image on the image-sensing device 111 when the object is in focus. The defocus quantity $\Delta V$ can be obtained based upon the spacing $V_1$ between the two images. As a result, it is unnecessary to separately provide photoelectric conversion means for focus detection, and both focus detection and focusing can be performed using the light flux that has passed through the photographic lens. This makes it possible to realize an inexpensive, small-size camera exhibiting highly accurate automatic focusing.

(AD2) The focus-detection module 130 is disposed in back of the final lens group (the lens group 154 in the example of FIG. 1) of the image-sensing optical system. As a result, the module is suited to a digital still camera of the single-lens reflex type having a long back focus.

(AD3) Part of the photographic-light flux is split by a beam splitter (the mirror 132) before being introduced to the optical finder system (the pentagonal prism 142 and eyepiece 143). This makes it possible to obtain a high-quality optical finder and to visually confirm the state of focus of an object image in a highly accurate manner. The optical path of the optical finder system and part of the optical path of the focus-detection module 130 can be made to coincide, thereby making it possible to reduce the size of the overall camera.

\<Modifications\>

First Modification (M1) If there is no limitation upon the size of the camera overall, the optical path of the optical finder system and the optical path of the focus-detection module 130 may be separated completely. In such case a half-mirror (132', not shown in figures) such as the mirror 132 is provided between the lens 154 and the mirror 121, and the mirror 132 is made a fully reflective mirror. The optical finder is disposed above the mirror 132'.

(M2) The lenses 137 for splitting the optic axis into two portions should ideally be provided between the mirror 133 and the mirror 134. Theoretically, however, it is possible to provide the lenses 137 between the lens 135 and mirror 133 or between the mirror 132 and lens 135.

\<Second Embodiment\>

According to the first embodiment set forth above, the pair of secondary image-forming lenses 137 are arranged parallel to the light-incident direction onto the photographic screen 111 (that is, in a right-to-left direction with respect to the FIG. 1 orientation) so that the two secondary images (IMA and IMB) are disposed one above the other on the photographic screen 111. In the second embodiment described below, a pair of secondary image-forming lenses are adapted (in a direction vertical to the surface of FIG. 1 drawing) to be arranged so that two secondary images are juxtaposed side by side on the photographic screen and are vertically offset from the optic axis. Specifically, the construction of the second embodiment is substantially identical to that of the first embodiment except for the arrangement of secondary forming lenses.

Figure 8:
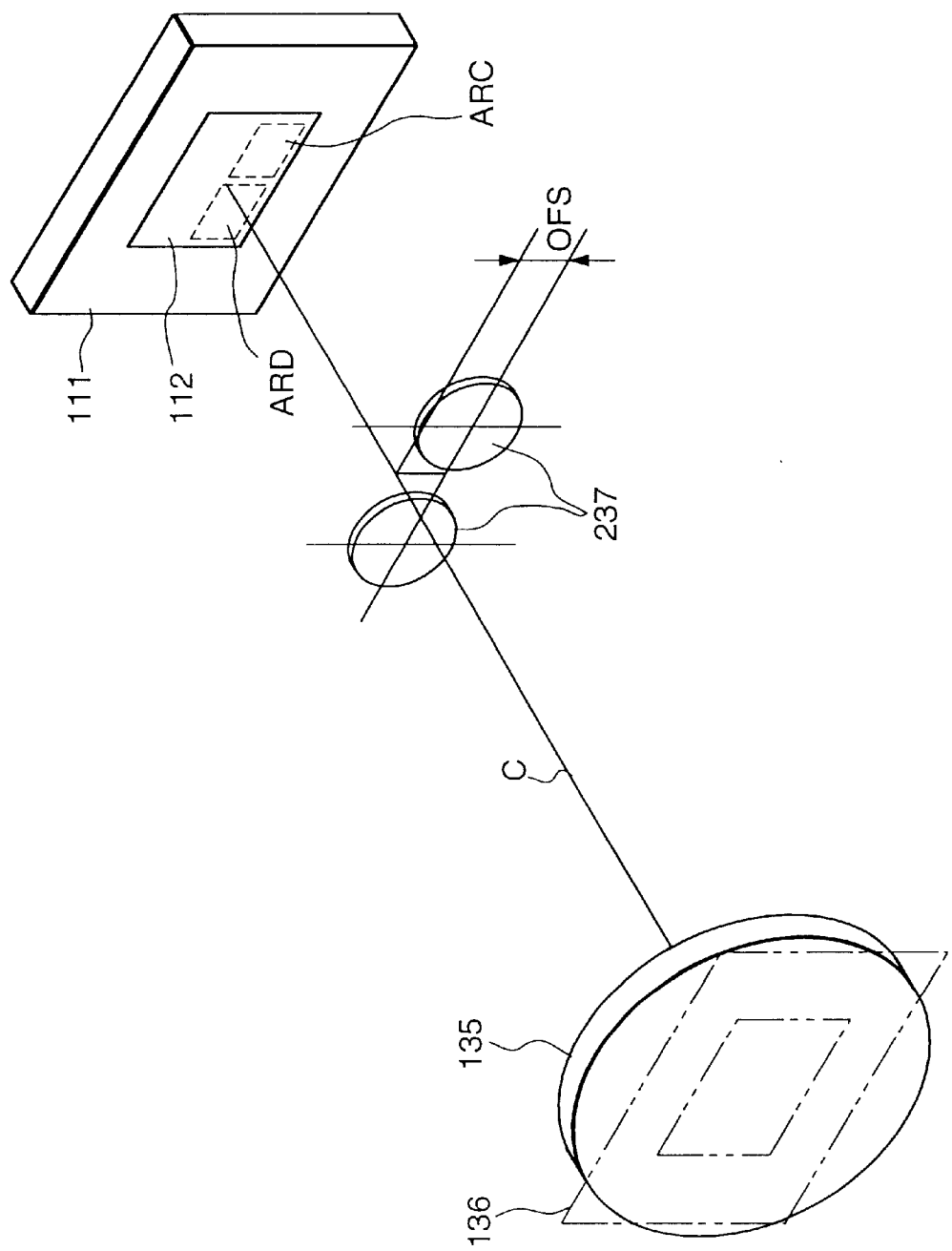
FIG. 8 is a diagram illustrating part of a focus detection optical system according to a second embodiment of the present invention.
Figure 9:
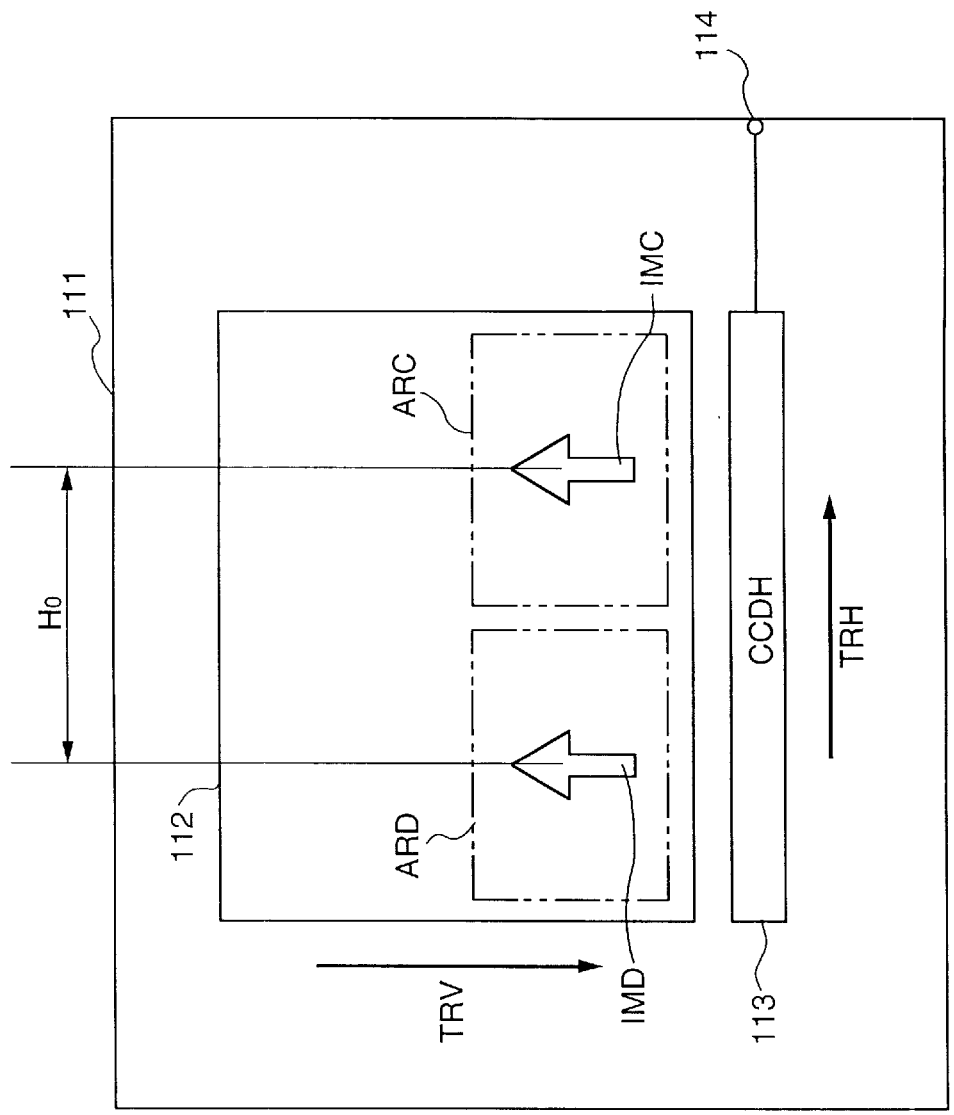
FIG. 9 is a diagram showing the formation of the images of an object when the object is in focus at the time of focus detection according to the second embodiment.

FIG. 8 is a perspective view showing a development of part of the focus-detection optical system according to the second embodiment, and FIG. 9 is a plan view showing the disposition of the secondary images on the image-sensing device 111. The construction and operation of this embodiment will now be described.

Elements other than those shown in FIG. 8 are identical with those of the first embodiment illustrated in FIG. 1.

FIG. 8 schematically illustrates an optical path from the field mask 136 to the image-sensing device 111. In FIG. 8, the third mirror 133 and the fourth mirror 134 are omitted from the focus-detection module 130 in FIG. 1 for the sake of simplified illustration purpose.

According to the second embodiment as shown in FIG. 8, the pair of two secondary image-forming lenses 237 are disposed horizontally, i.e., side by side with respect to the photographic screen, between the field lens 135 (having the field mask 136) and the image sensing device 111. The centers connecting the two secondary image-forming lenses 237 are offset by a distance OFS to a position below the optic axis C. Accordingly, the projected images of the field mask 136 formed by the secondary image-forming lenses 237 become downwardly offset areas ARC, ARD on the light-receiving portion 112 of the image-sensing device 111.

FIG. 9 illustrates the disposition of images on the image-sensing device 111 in the arrangement of FIG. 8. The images ARC, ARD of the field mask 136 are projected as areas on the light-receiving portion 112, and secondary images IMC, IMD of the object OBJ are formed in the areas ARC, ARD, respectively. Let $H_0$ represent the spacing between the two images when the object is in focus, and let $H_1$ represent the spacing between the two images when the object is not in focus. If $H_1$ is measured and $H_0$ and $H_1$ can be compared, then a defocus quantity $\Delta H$ ($=H_1-H_0$) of the object OBJ can be detected.

In FIG. 9, the two secondary image-projection areas ARC, ARD are disposed at the lower part the light-receiving portion 112, namely on the side near the exit in the transfer direction of the vertical-transfer CCD in the light-receiving portion. As a result, only the image signal on the lower half of the light-receiving portion 112 need be read for the purpose of detecting focus. In other words, if the image signal on the lower half of the light-receiving portion 112 is used in image processing for focus detection, then the image signal of the upper half of the light-receiving portion 112 maybe discarded without being read. In the first focus-detection cycle, therefore, the time needed to read out the image signal is shortened.

The flowcharts for controlling the camera and interchangeable lens in this embodiment are the same as the control flowcharts of the first embodiment shown in FIGS. 6 and 7 and need not be described again.

The second embodiment has the following advantage in addition to the advantages (AD1)–(AD3) of the first embodiment:

Since the image-signal readout time for detecting focus is shortened, it is possible to speed up the focus detection operation or autofocus operation.

\<Third Embodiment\>

In the first and second embodiments, focus detection is carried out based upon one pair of secondary images. In the third embodiment described below, the optical system is so adapted that focus-detection is carried out by forming two pairs of secondary images.

Figure 10:
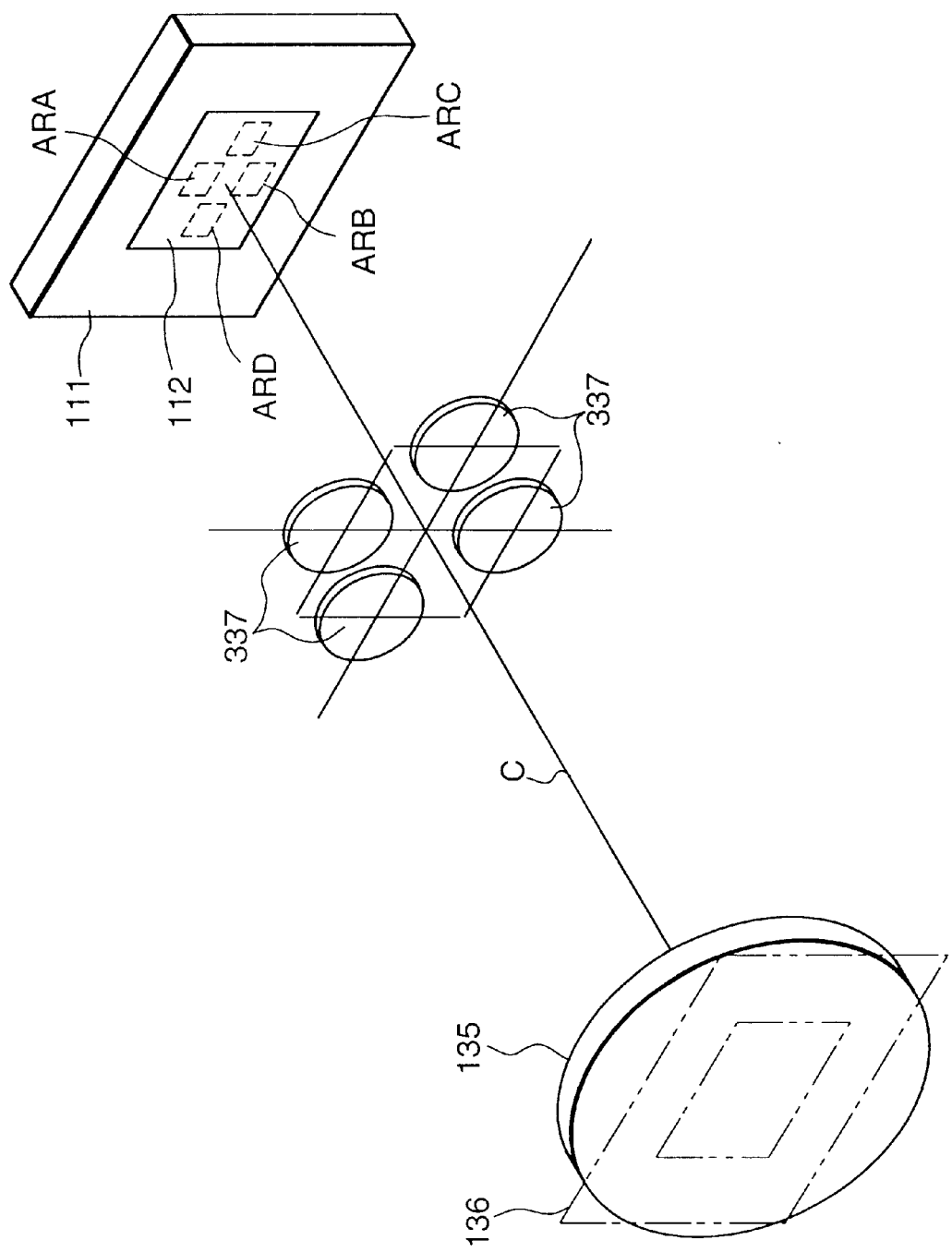
FIG. 10 is a diagram illustrating part of a focus detection optical system according to a third embodiment of the present invention.
Figure 11:
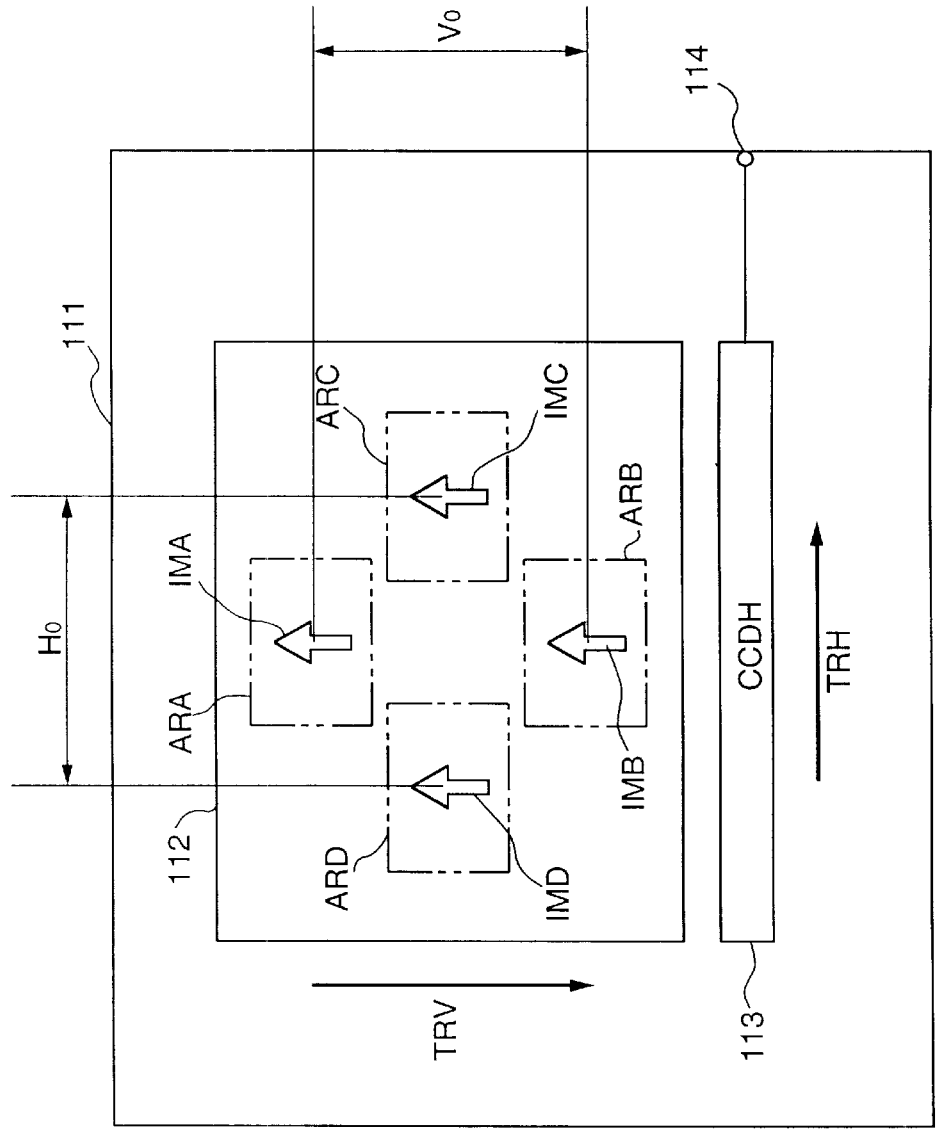
FIG. 11 is a diagram showing the formation of the images of an object when the object is in focus at the time of focus detection according to the third embodiment.

FIG. 10 is a perspective view showing a development of part of the focus-detection optical system according to the third embodiment, and FIG. 11 is a plan view showing the disposition of the secondary images on the image-sensing device 111. The construction and operation of this embodiment will now be described.

In FIG. 10, two pairs of secondary image-forming lenses 337 are disposed between the field lens 135 (having the field mask 136) and the image-sensing device 111. The projected images of the field mask 136 formed by the secondary image forming lenses 337 become four areas ARA, ARB, ARC and ARD on the light-receiving portion 112 of the image-sensing device 111.

Elements other than those shown in FIG. 10 are identical with those of the first embodiment illustrated in FIG. 1.

FIG. 11 illustrates the disposition of images on the image-sensing device 111 in the arrangement of FIG. 10. The images ARA, ARB, ARC, ARD of the field mask 136 are projected on the light-receiving portion 112, and secondary images IMA, IMB, IMC, IMD of the object OBJ are formed in the areas ARA, ARB, ARC, ARD, respectively. Let $V_0$ represent the spacing between the two images IMA, IMB when the object is in focus, and let Ho represent the spacing between the two images IMC, IMD when the object is in focus. If the spacings between the images when the object is not in focus are measured and compared with the spacings $V_0$ and $H_0$, then a defocus quantity of the object OBJ can be detected.

Except for the fact that two sets of operations for detecting the amount of defocusing of the image of the object are provided in the third embodiment, the flowcharts for controlling the camera and interchangeable lens in this embodiment are the same as the control flowcharts of the first embodiment shown in FIGS. 6 and 7 and need not be described again.

The third embodiment has the following advantage in addition to the advantages (AD1)–(AD3) of the first embodiment:

Since focus detection is carried out based upon images of the object OBJ that are offset vertically and horizontally, focus detection can be performed with greater accuracy.

<Fourth Embodiment>

In the first through third embodiments described above, the secondary image-forming optical system for focus detection uses mirrors for deflecting the light flux. In the fourth embodiment described below, use is made of a reducing lens instead of mirrors.

FIGS. 12–17 are diagrams relating to the fourth embodiment.

Figure 12:
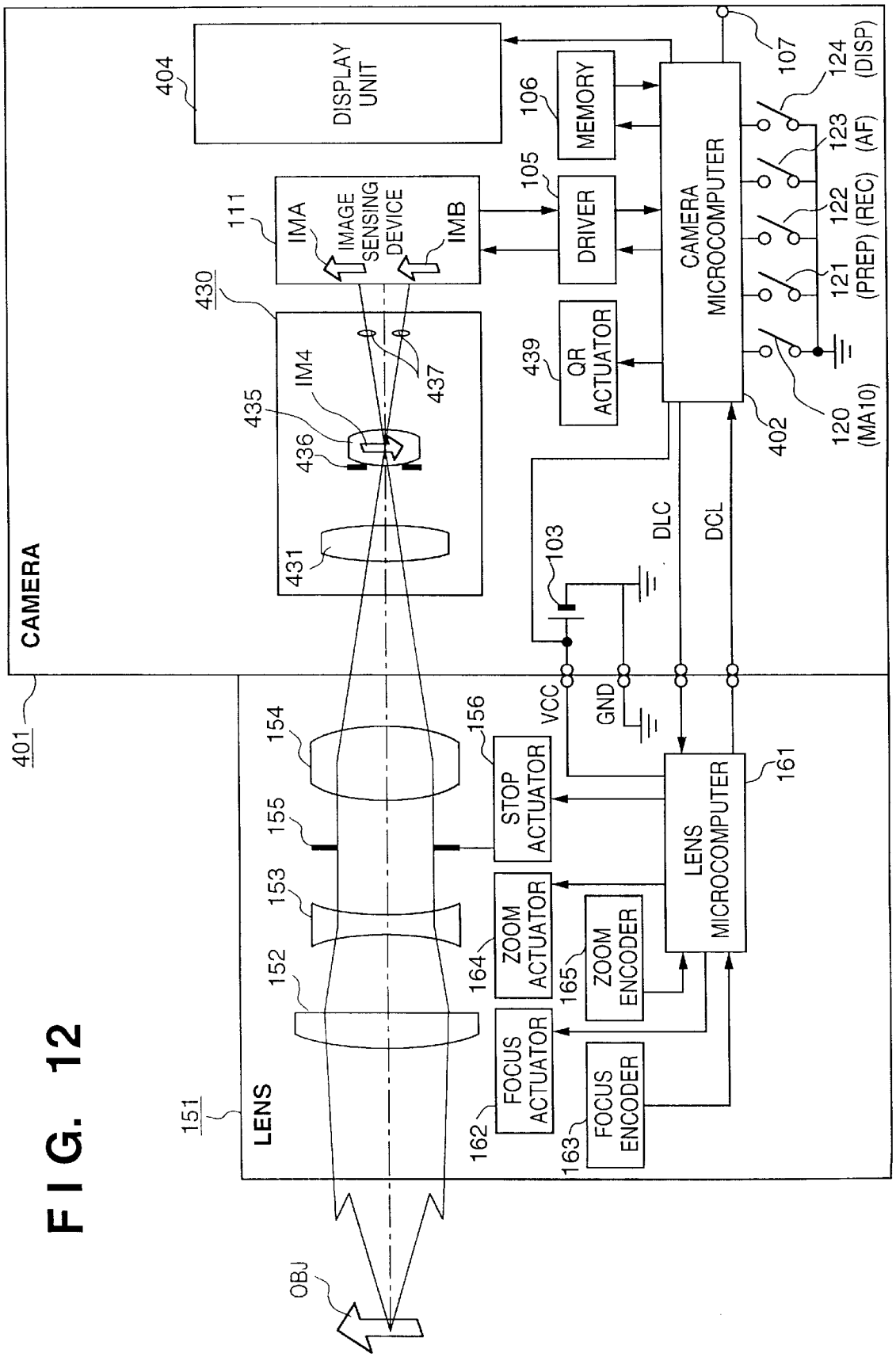
FIG. 12 is a block diagram illustrating the construction of an image sensing apparatus according to a fourth embodiment of the present invention, this diagram showing the apparatus at the time of focus detection.

FIG. 12 is a diagram showing the construction of an image-sensing apparatus according to the present invention. This shows the apparatus when detection of focus is carried out. According to this embodiment, the focus-detection module 130 of the first embodiment shown in FIG. 1 is replaced by a focus-detection module 430. Though the optical finder composed of such elements as the pentagonal prism is eliminated, other elements are the same as those shown in FIG. 1. The construction and operation of this embodiment will now be described.

As shown in FIG. 12, the focus-detection module 430 includes a reducing lens 431, a field mask 436, a field lens 435 and two secondary image-forming lenses 437. The stop 155 of the interchangeable lens 151 and the entrance pupil of the pair of secondary image-forming lenses 137 are in a projection relationship owing to the field lens 135. A quick-return (QR) actuator 439 is provided for advancing and retracting the focus-detection module 430 into and out of the projected light flux.

The image of the object OBJ is formed as a primary image IM4 on the primary image-forming surface in the field lens 435 via the image-sensing optical system, which is constructed by the lens groups 152–154 and stop 155, and the above-mentioned reducing lens 431. It should be noted that the primary image IM4 has a size different from that of the first primary image IM1 or IM2 of the first embodiment owing to the intervention of the reducing lens 431.

The primary image IM4 is split by the two secondary image forming lenses 437 disposed one above the other, whereby the image is formed again. These secondary images are projected upon the image sensing device 111 as IMA and IMB.

Figure 13:
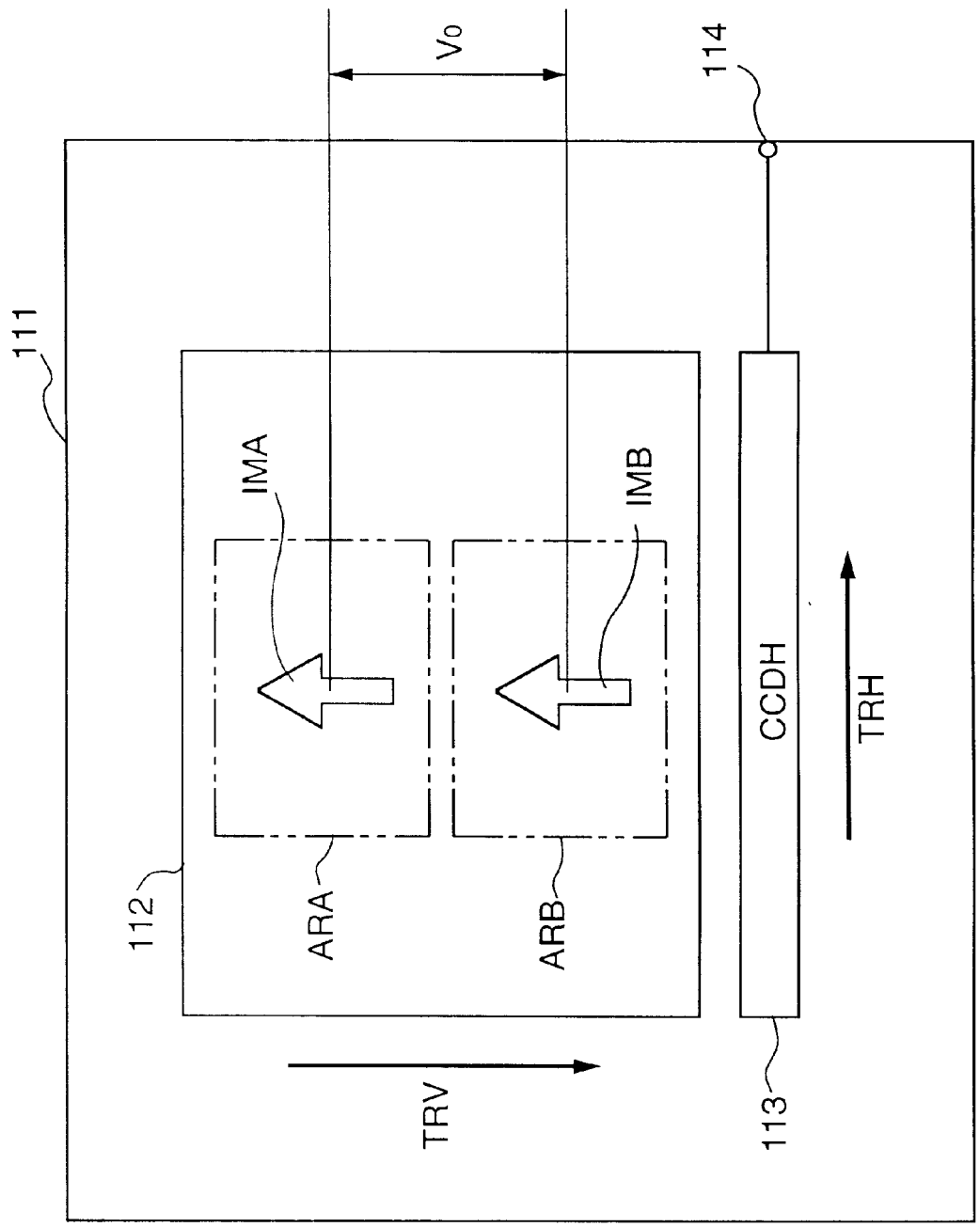
FIG. 13 is a diagram showing the formation of the images of an object when the object is in focus at the time of focus detection according to the fourth embodiment.

FIG. 13 is a diagram showing formation of the secondary images on the image sensing device 111. In a manner similar to that of the first embodiment, this embodiment detects the amount of defocusing of the object OBJ based upon a change in the difference between the two images with respect to the reference spacing value $V_0$ between the images.

Figure 14:
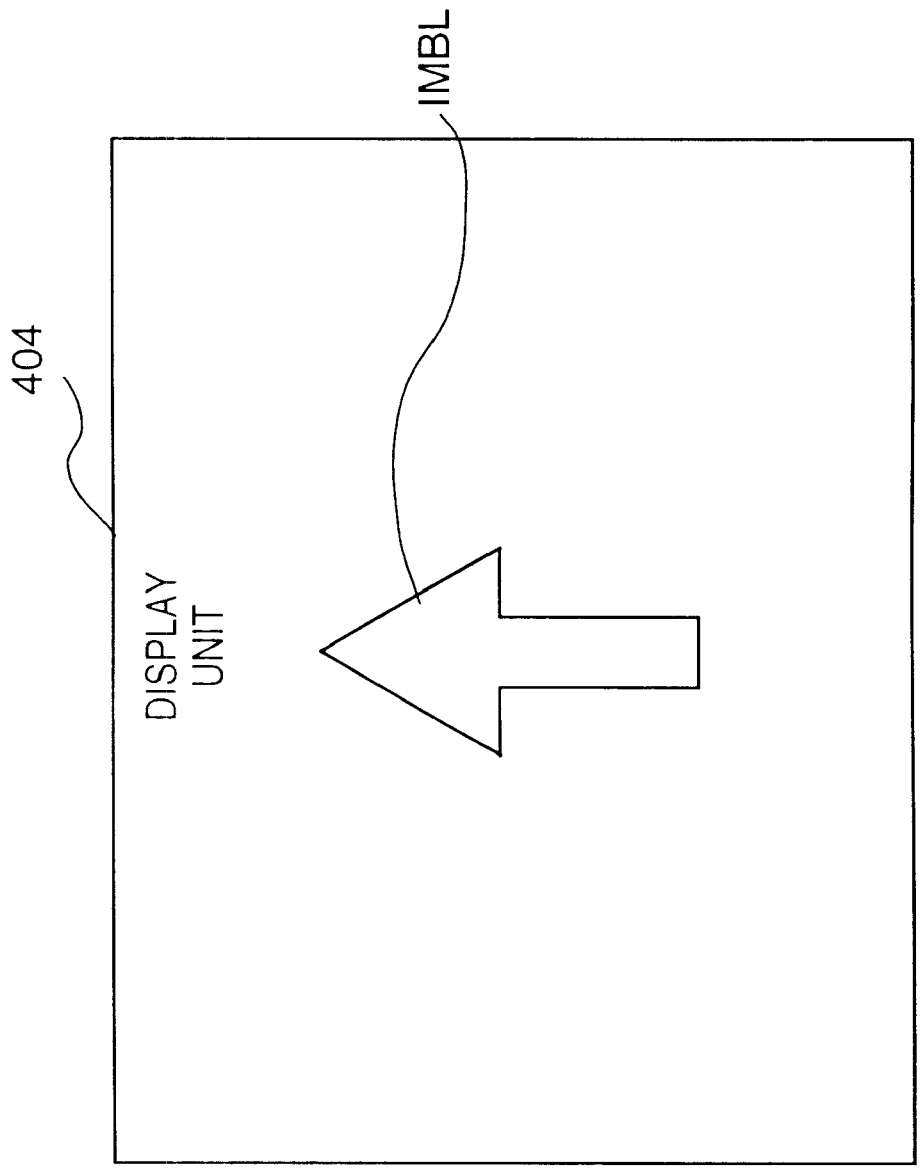
FIG. 14 is a diagram useful in describing the state of a display on a display unit at the time of focus detection according to the fourth embodiment.

FIG. 14 illustrates the state of the display presented on a display unit 404 when focus detection is performed. One of the two secondary images, e.g., IMB, projected upon the image-sensing device 111 in FIG. 13 is subjected to enlargement processing and displayed on the display unit 404 as IMBL, thereby making it possible for the photographer to check the composition of the photographic area as well as the state of focusing.

Figure 15:
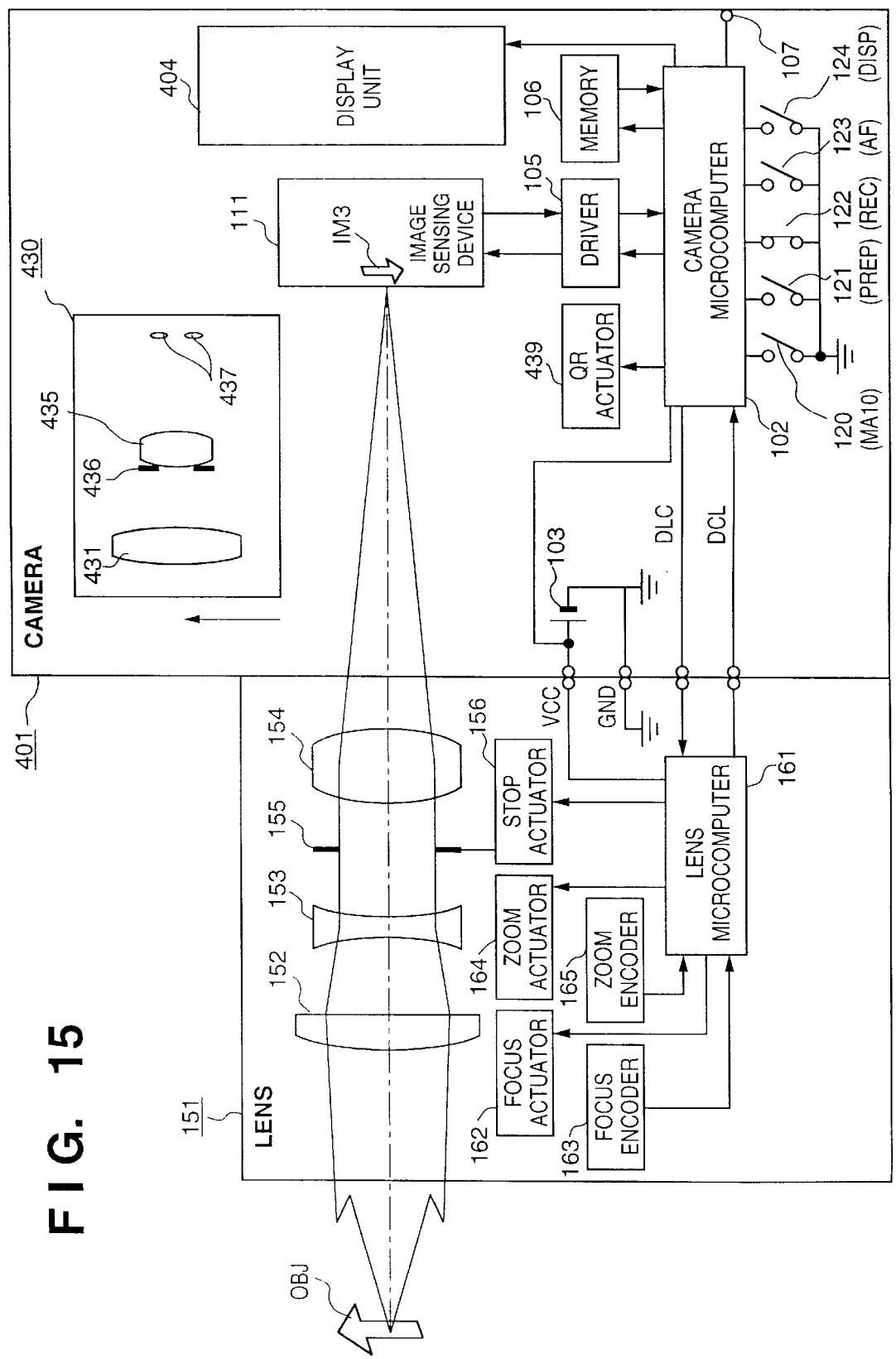
FIG. 15 is a diagram showing the image sensing apparatus at the time of image pick-up according to the fourth embodiment.

FIG. 15 is a diagram showing the camera when the photography switch 122 of the camera body 101 is closed upon the completion of the autofocus operation, thereby establishing the photographic state.

When the photography switch 122 is closed, the entire focus-detection module 430 is withdrawn away from the optical path of photography (i.e., upward in FIG. 15) by the quick-return actuator 439.

Figure 16:
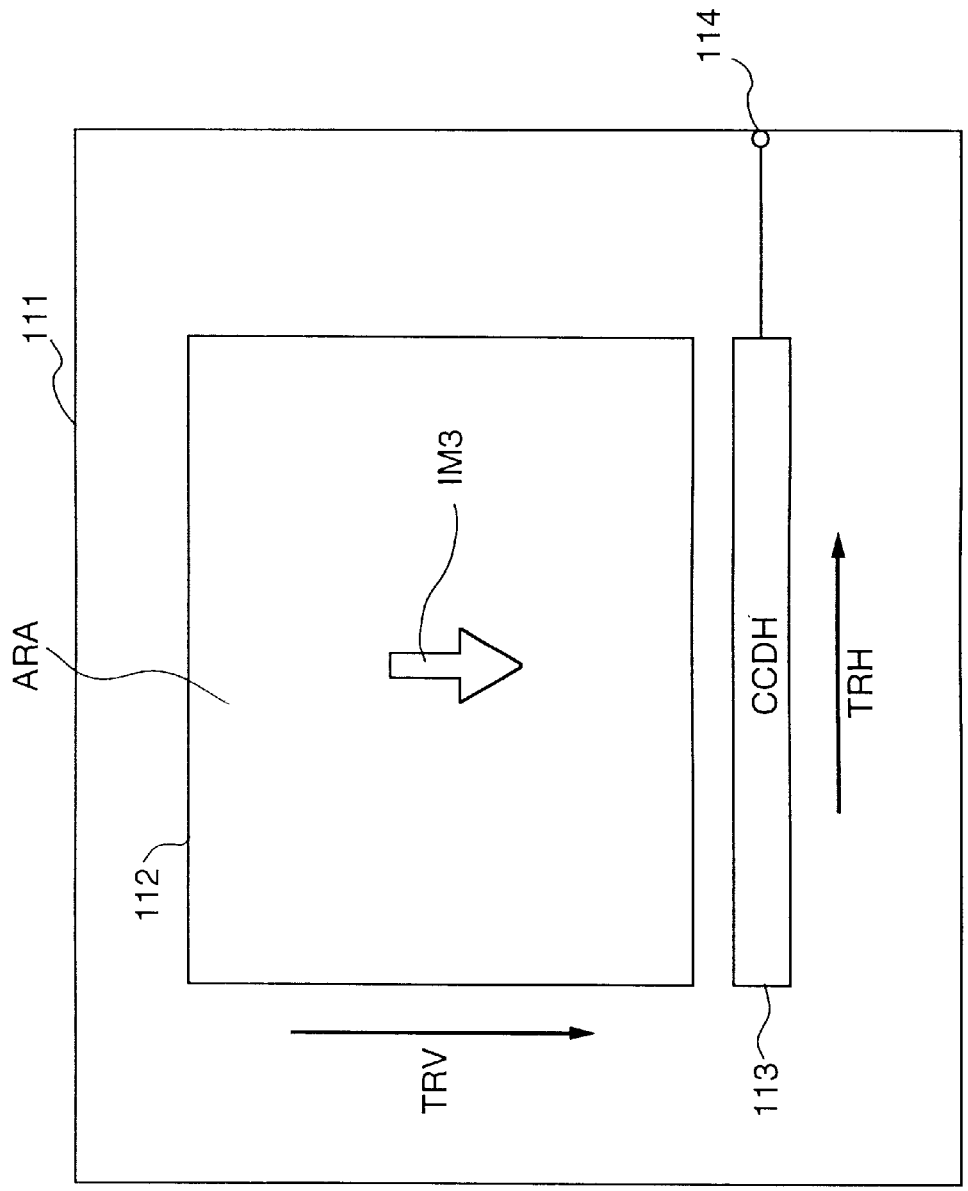
FIG. 16 is a diagram showing the formation of the image of an object at the time of image pick-up according to the fourth embodiment.

FIG. 16 is a diagram showing formation of the image of the object on the image-sensing device 111 at the time of photography. Here the primary image IM3 of the object OBJ is projected onto the light-receiving portion 112 in a manner similar to that of the first embodiment. Accordingly, the image signal prevailing under these conditions is accepted and recorded in the image memory 106 of the camera body 401, whereby the image is sensed.

Figure 17:
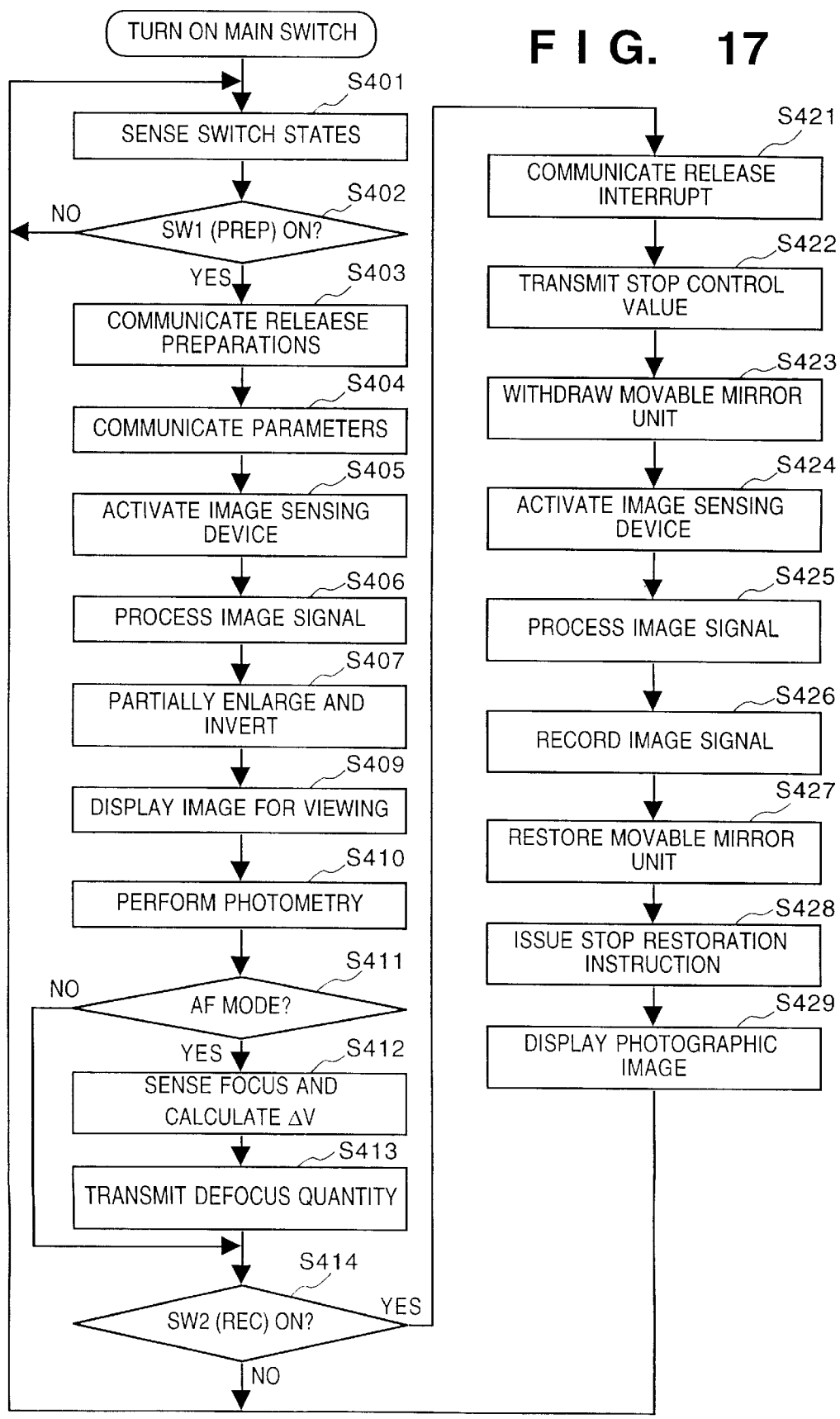
FIG. 17 is a flowchart showing a procedure for controlling a camera according to the fourth embodiment.

FIG. 17 is a flowchart illustrating the control flow of a microcomputer 402 inside the camera body. This flowchart differs from that of FIG. 6 only in the addition of an operation for displaying a finder image at the time of focus detection.

When the main switch 120 of the camera body 401 is turned on, the microcomputer 402 is activated from the sleep state and control proceeds from step S401 to steps S402, S403 and S404.

The fact that preparation for shutter release has been executed is communicated to the microcomputer 161 inside the interchangeable lens 151 at step S404. This is followed by step S405, at which parameters are communicated to the microcomputer 161.

Next, at step S406, the image sensing device 111 is activated to acquire an image signal.

Processing of the image signal acquired at step S406 is executed at step S4107. More specifically, processing such as A/D conversion of the image signal, white balance adjustment, and gamma correction is executed.

This is followed by step S408, at which the image to be displayed on the display unit 404, namely the image in the area ARB of FIG. 13, is enlarged and then rotated by 180° about its center. In comparison with the image that prevails at the time of imaging, therefore, the image is turned upside down when focus detection is performed.

The image for viewing purposes obtained at step S408 is displayed on the display unit 404 at step S409.

This is followed by step S410, at which object brightness information is calculated from the image signal processed at step S407. Further, in accordance with a predetermined exposure-control program, a control value for narrowing the stop 155 and the exposure time (charge storage time) of the image sensing device 111 are calculated.

The setting of the AF mode switch 123 is discriminated at step S411 to determine if the autofocus (AF) mode is in effect. Control proceeds to step S414 if the mode is not the AF mode and to step S412 if the mode is the AF mode.

The amount of defocus of the object is calculated from the spacing between the two secondary images at step S412 in the manner illustrated in FIG. 13. Next, at step S413, the amount of defocus calculated at step S412 is transmitted to the microcomputer 161 inside the lens.

The state of the photography switch 122 is discriminated at step S414. If the switch 122 is off, control returns to step S402. If the photography switch 122 is found to be ON, it is judged that release has been performed and control shifts to step S421.

The release sequence of steps S421–S429 is the same as the processing of steps S121–S129 in FIG. 6 and need not be described again. Further, the flow for controlling the interchangeable lens 151 is the same as that of the first embodiment shown in FIG. 7 and need not be described again.

The operation of the camera and lens according to the foregoing flow will now be summarized.

At the photography preparation stage, the photographic light flux is split and projected upon the image-sensing device 111 via the focus-detection module 430 in the manner shown in FIG. 12. When the main switch 120 and photography preparation switch 121 are turned on by the photographer, the camera enlarges one of the two secondary images, which are projected upon the image-sensing device 111 in the manner shown in FIG. 13, and displays the enlarged image on the display unit 404, as illustrated in FIG. 14. Next, the camera calculates the amount of object defocus from the spacing between the two secondary images and transmits this to the interchangeable lens 151. In response, the interchangeable lens 151 drives the focusing lens in accordance with the defocus quantity, thereby performing focusing. Next, when the photography switch 122 is turned on, the focus-detection module 430 is withdrawn from the photographic light flux, as shown in FIG. 15, so that the in-focus image of the object is projected upon the image-sensing device 111, as shown in FIG. 16. The camera acquires the image of the object and records the image in the image memory 106.

The fourth embodiment has the following advantages in addition to the advantages (AD1), (AD2) of the first embodiment:

(AD6) A mirror for deflecting the optical path is not required in the focus-detection module 430, thereby making it possible to reduce the size of the module and simplify the same.

(AD7) Since the image for purposes of focus detection is displayed on the monitor screen of the display unit, an optical finder is unnecessary. This makes it possible to reduce the size and lower the cost of the apparatus.

<Fifth Embodiment>

In the fourth embodiment described above, the reducing lens is used in the optical system for focus detection. In a fifth embodiment described below, however, a relay lens is inserted into the optical system for focus detection and the reducing lens is not employed.

Figure 18:
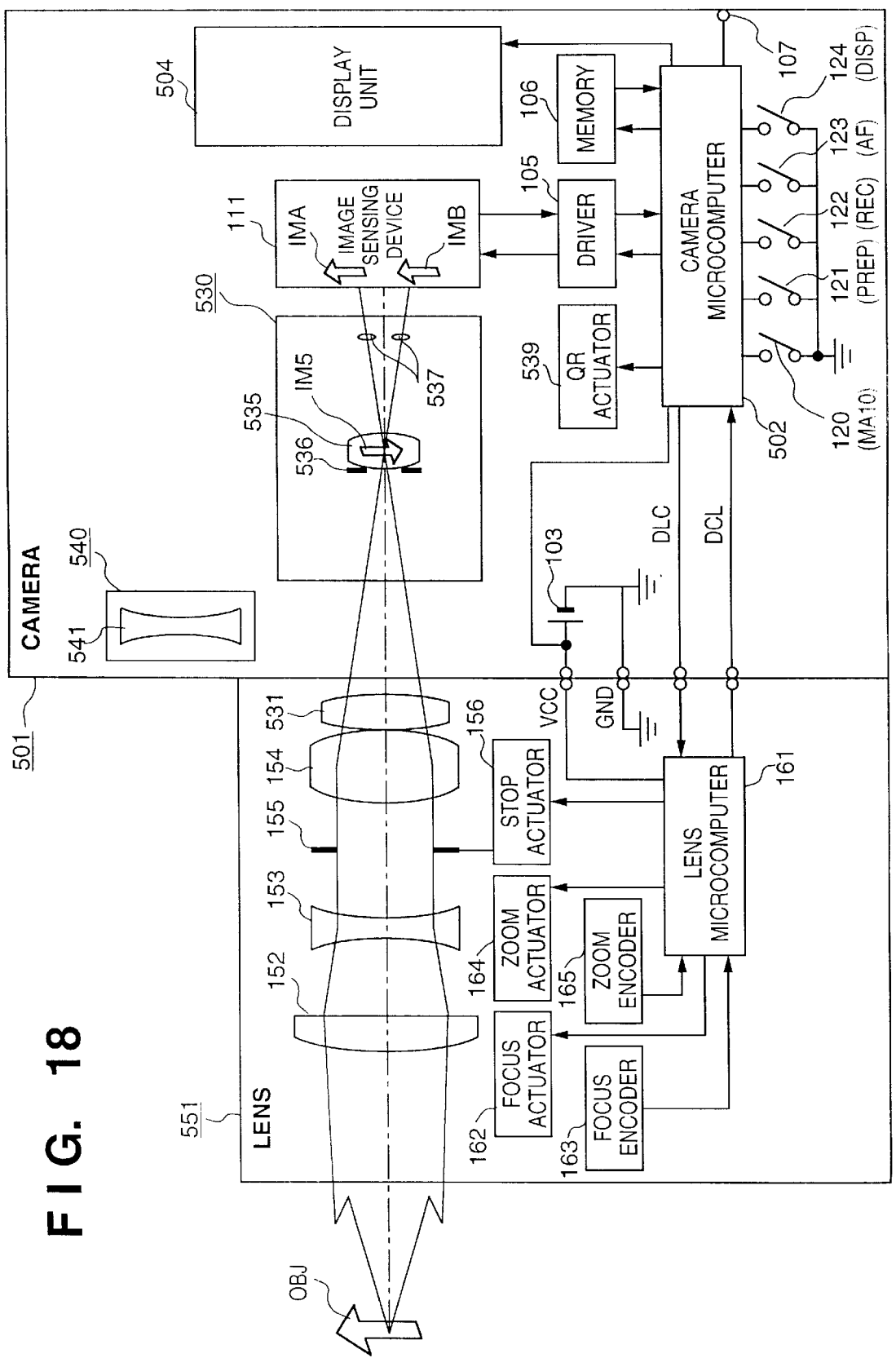
FIG. 18 is a block diagram illustrating the construction of an image sensing apparatus according to a fifth embodiment of the present invention, this diagram showing the apparatus at the time of focus detection.
Figure 19:
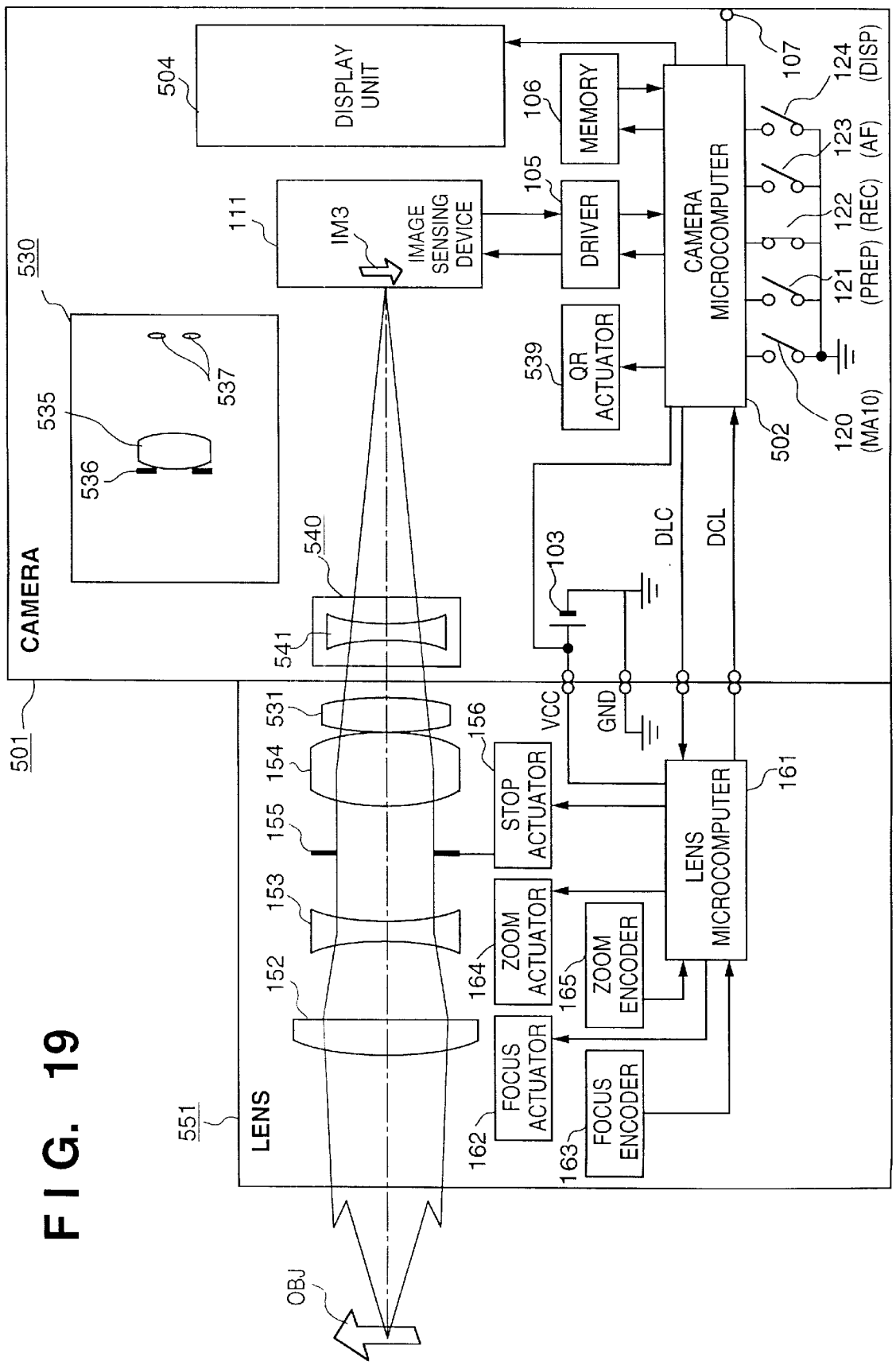
FIG. 19 is a diagram showing the construction of an image sensing apparatus at the time of image pick-up according to the fifth embodiment.

FIGS. 18 and 19 are diagrams relating to the fifth embodiment.

FIG. 18 is a diagram showing the construction of an image sensing apparatus according to the present invention. This shows the apparatus when detection of focus is carried out. According to this embodiment, the focus-detection module 430 of FIG. 12 is replaced by a focus-detection module 530, and a relay lens module 540 is additionally provided. A lens 531 is provided at the rearmost portion of the image-forming optical system inside an interchangeable lens 551. Other components are the same as shown in FIG. 12.

As shown in FIG. 18, the focus-detection module 530 includes a field mask 536, a field lens 535 and a pair of secondary image-forming lenses 537. The stop 155 of the interchangeable lens 551 and the entrance pupil of the pair of secondary image-forming lenses 537 are in a projection relationship owing to the field lens 535.

The relay lens module 540 is provided internally with a concave relay lens 541. A quick-return actuator (QR) 539 is provided for moving the focus-detection module 530 and relay lens module 540 into the photographic light flux alternatively.

The image of the object OBJ is formed as a primary image IM5 on the primary image-forming surface in the field lens 535 via the image-sensing optical system, which is constructed by the lens groups 152–154, stop 155 and lens 531. The arrangement is such that the primary image IM5 has a size substantially the same as that of the image IM4 of the fourth embodiment.

The primary image IM5 is split by the two secondary image forming lenses 437, whereby the image is formed again. These secondary images are projected upon the image-sensing device 111 as IMA and IMB. The projected images are the same as those shown in FIG. 13. In addition, the viewing image displayed on a display unit 504 is similar to that shown in FIG. 14.

FIG. 19 is a diagram showing the camera when the photography switch 122 of the camera body 501 is closed upon the completion of the autofocus operation, thereby establishing the photographic state.

When the photography switch 122 is closed, the entire focus-detection module 530 is withdrawn away from the optical path of photography (i.e., upward in FIG. 19) by the quick-return actuator 539. The relay lens module 540 is inserted into the photographic optical path in place of the focus-detection module 530. When this is done, the primary image IM3 formed by the image-sensing optical system in the interchangeable lens 551 and the relay lens 541 in the camera body 501 is formed on the image-sensing device 111. The state of the formed image is the same as that of the primary image shown in FIG. 16. Accordingly, the image signal prevailing under these conditions is accepted and recorded in the image memory 106 of the camera body 501, whereby the image is sensed.

The control flow of this embodiment is the same as that of the fourth embodiment and need not be described again.

The fifth embodiment has the following advantages in addition to the advantages (AD1), (AD2) of the first embodiment and the advantages (AD6), (AD7) of the fourth embodiment:

(AD8) Since use is made of the relay lens 541 advanced and retracted at the time of photography, greater freedom is provided in terms of optical design and the optical system can be reduced in size and improved in performance.

(AD9) The optical structure of the focus-detection module 530 is simplified and optical aberration of this module can be reduced to improve the accuracy of focus detection.

It should be noted that the focus-detection optical system of the second or third embodiment may be applied to the fourth or fifth embodiment. Further, a half-mirror may be placed in front of the focus-detection module of the fourth or fifth embodiment to extract part of the photographic light flux and introduce this flux to an optical finder. Furthermore, the invention may be applied not only to an image sensing apparatus of interchangeable lens type but also to an image-sensing apparatus having a fixed lens.

<Sixth Embodiment>

FIGS. 20 through 24 are diagrams relating to the sixth embodiment.

Figure 20:
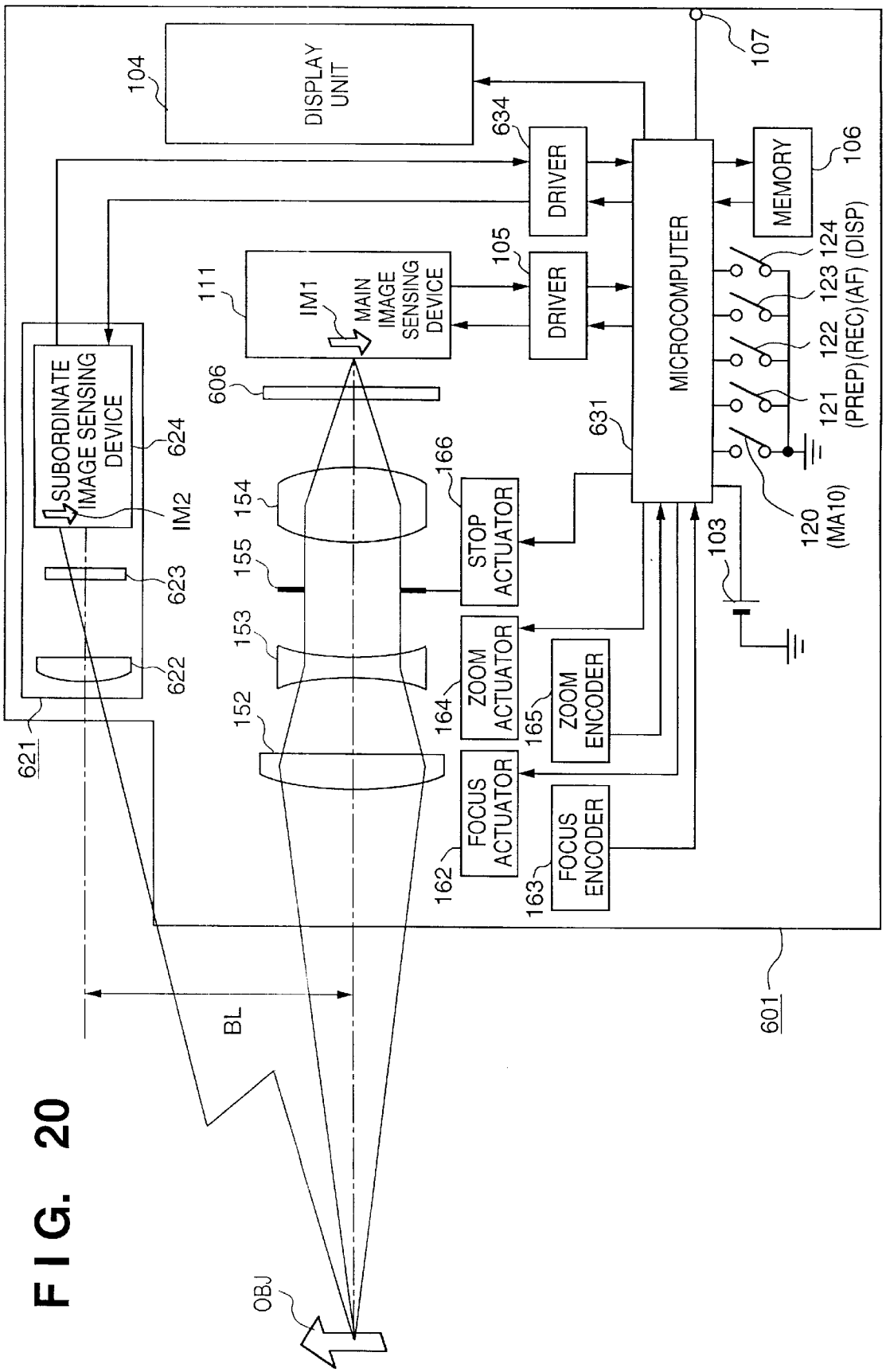
FIG. 20 is a block diagram illustrating the construction of an image sensing apparatus according to a sixth embodiment of the present invention.

FIG. 20 is a block diagram showing the construction of an image sensing apparatus according to a sixth embodiment.

Numeral 601 denotes a camera body having various functional components for forming the image of an object OBJ, detecting focus and sensing the image.

The camera body includes the focusing-lens group 152 for performing focusing by being advanced and retracted along the direction of the optic axis; the zoom-lens group 153 for performing zooming by being advanced and retracted along the direction of the optic axis; and the relay-lens group 154 for performing a prescribed image-forming operation together with the lens groups 152 and 153. The stop 155 decides the entrant light flux of the image-sensing optical system.

An infrared blocking filter 606 blocks infrared light from the object OBJ and passes only visible light. The lens groups 152, 153, 154, the stop 155, and the infrared blocking filter 606 together construct the image-sensing optical system. A first IM1 of the object OBJ is formed on a main image sensing device 111.

As in the first and other embodiments, the main image-sensing device 111 is a two-dimensional photoelectric sensor, such as a CCD, for photoelectrically converting the first image IM1.

The camera body further includes a rangefinding module 621 having a light-receiving lens 622 for forming the image of the object OBJ whose range is to be measured, an infrared blocking filter 623 for blocking infrared light and passing only visible light of the light flux that has passed through the light-receiving lens 622, and a subordinate image-sensing device 624. The rangefinding optical system, which includes the light-receiving lens 622 and the infrared blocking filter 623, has an image forming power different from that of the above-mentioned image-sensing optical system and forms a second image IM2 of the object OBJ on the subordinate image sensing device 624, described later.

The subordinate image sensing device 624, such as a CCD, is a two-dimensional photoelectric sensor for photoelectrically converting the second image IM2. The module 621 including these elements is so disposed that its optic axis is spaced away from the optic axis of the image-sensing optical system by a distance equivalent to a baselength BL.

A microcomputer 631 is a single-chip microcomputer having a ROM, a RAM and A/D, D/A conversion functions. In accordance with a camera sequence program stored in the ROM (not shown), the microcomputer 631 implements a series of camera operations, such as automatic exposure control (AE), autofocus (AF) and image sensing. To this end, the microcomputer 631 controls the operation of peripheral circuits and actuators inside the camera body 601. According to the present invention, the ROM constitutes a storage medium and can be a semiconductor memory, an optical disk, a magneto-optic disk or a magnetic medium, etc.

The power supply 103 supplies the camera circuits and actuators with power.

The driver 105 drives and controls the main image sensing device 111. The driver 105 controls the storage of charge in the image-sensing device 111, charge-transfer, CDS (Correlated Double Sampling), AGC (Automatic Gain Control), A/D conversion, gamma correction and AWB (Automatic White Balance), etc.

A driver 634 drives and controls the subordinate image-sensing device 624 and, like the driver 105 of the main image-sensing device, controls the storage of charge in the image-sensing device 111, the charge transfer, the CDS, the AGC, the A/D conversion, the gamma correction and the AWB, etc.

The memory 106 records and preserves image signal data representing an image sensed by the main-image-sensing device 111 and can be a semiconductor memory, an optical disk, a magneto-optical disk or a magnetic medium, etc.

The terminal 107 for outputting a recorded image to external equipment is connected to a personal computer or printer.

The camera body has a display unit 104, such as a liquid crystal panel, having a display function for displaying photographic conditions and a monitor function for monitoring a photographic image.

As in the first embodiment, the camera body has the main switch 120. When this switch is turned on, the microcomputer 631 allows the execution of a prescribed program relating to preparations for photography, namely exposure metering and focus detection, etc.

The switches 121 and 122 are linked to the camera release button and are turned on by pressing the release button through first and second stroke lengths, respectively. More specifically, the switch 121 is for preparing for picture taking. When this switch is turned on, preparatory photographic operations, such as exposure metering, focus detection and focusing, are executed. The switch 122 is a photography switch. When this switch is turned on, a photographic image that has been formed on the image sensing device 111 is acquired and recorded in the image memory 106.

The AF mode switch 123 is used to select the autofocus mode. The display switch 124 is used to designate a display mode for monitoring a photographic image.

The focus actuator 162 drives the focusing-lens group 152 to advance and retract the same, and the focus encoder 163 senses position information indicative of the position of the focusing-lens group 152, namely object-distance information. The zoom actuator 164 drives the zoom-lens group 153 to advance and retract the same, and the zoom encoder 165 senses position information indicative of the position of the zoom-lens group 153, namely focal-length information.

The stop actuator 156 controls the stopping down of the stop 155 and restores the stop 155 to the open state.

By virtue of the construction described above, the camera body 601 acquires the first image IM1 and second image IM2 of the object OBJ and performs rangefinding, focusing, and image sensing through methods described later.

<Principles>

Sixth Embodiment

The state of image formation of the object OBJ at the time of focus detection prior to preparations for photography will now be described.

A light flux from the object OBJ passes through the image-sensing optical system comprising the lens groups 152, 153, 154 and is formed on the main image-sensing device 111 as the first image IM1. Further, the second image IM2 is formed on the subordinate image-sensing device 624 inside the rangefinding module 621.

Figure 21B:
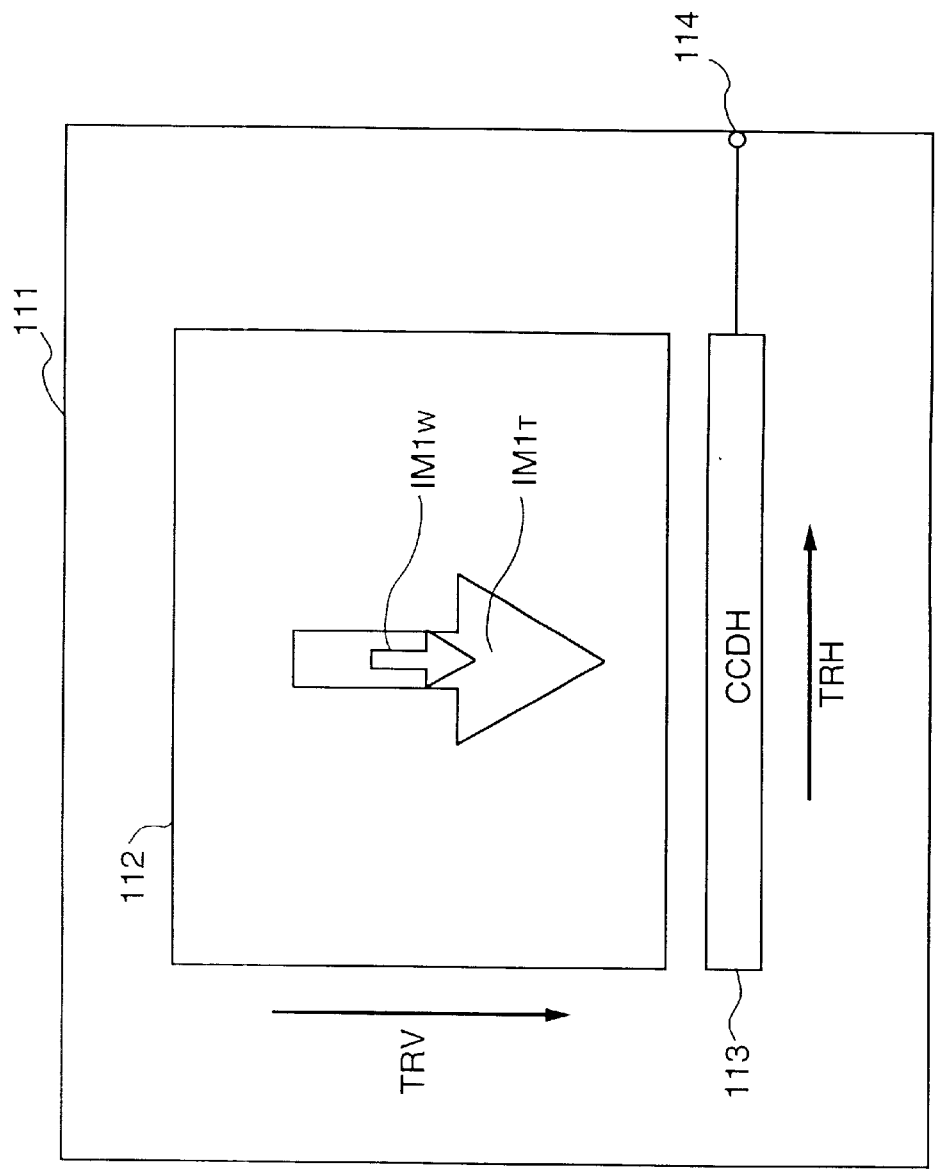

FIGS. 21A, 21B are diagrams illustrating the two image-sensing devices 111, 624 and the dispositions of two images formed on these image-sensing devices.

The light-receiving portion 112 of the image sensing device 111 comprises $m_1 \times n_1$ light-receiving pixels and a charge-transfer portion (vertical transfer CCD) for transferring electric charge that has accumulated in these pixels. The horizontal transfer CCD 113 stores electric charge transferred in the direction of arrow TRV by the vertical transfer CCD in the light-receiving portion 112, then transfers the charge in the direction of arrow TRH and outputs an image signal from the signal-output portion 114 to the image-sensor driver 105.

In FIG. 21B, $IM1_T$ represents the image of the object OBJ when the image-sensing optical system has been set to the maximum telescopic mode, and $IM1_W$ represents the image of the object OBJ when the image-sensing optical system has been set to the maximum wide-angle mode. Thus, the size of the first image IM1 of the object varies depending upon the state of the image-sensing optical system.

A light-receiving portion 625 of the subordinate image-sensing device 624 comprises $m_2 \times n_2$ light-receiving pixels and a charge transfer portion (vertical transfer CCD) for transferring electric charge that has accumulated in these pixels. A horizontal transfer CCD 626 stores electric charge transferred in the direction of arrow TRV by the vertical transfer CCD in the light-receiving portion 625, then transfers the charge in the direction of arrow TRH and outputs an image signal from the signal output portion 627 to the image-sensor driver 634.

In FIG. 21A, $IM2_{INF}$ represents the image obtained when the object OBJ is at infinity, and $IM2_{DEF}$ represents the image obtained when the object OBJ is at a finite distance. Thus, the position of the second image IM2 of the object varies depending upon the distance of the object OBJ.

FIGS. 22A, 22B are diagrams useful in describing the principle of image magnification correction for detecting object distance from the first and second images IM1 and IM2, respectively, of the object.

According to the principle of rangefinding by triangulation, a disparity in regard to the object is detected from the relative positions of two images formed by two image-forming systems spaced apart by a predetermined baselength, and the object distance is found from this disparity. In this case, it is required that the sizes of the two images be equalized. However, as described above in connection with FIGS. 21A, 21B, the first image IM1 varies in size depending upon the zoom setting of the image-sensing optical system. Even if the two images have the same optical size, the number of pixels (or pixel size) of the light-receiving portion 112 of image-sensing device 111 and the number of pixels (or pixel size) of the light-receiving portion 625 of image-sensing device 624 differ. Consequently, if the image signal is processed digitally, it is necessary to subject the image to a magnitude correction based upon the difference in the numbers of pixels.

In this embodiment, the image forming characteristics of the image-sensing optical system are recognized from the results of detection from the focus encoder 163 and zoom encoder 165 inside the camera body 601, and the size of the first image IM1 is made equal to the size of the second image IM2 based upon the results of recognition.

FIGS. 22A, 22B are diagrams illustrating the respective images after application of the above-described size correction. FIGS. 21A, 21B illustrate the sizes of the optical images on the image sensing devices 624, 111, while FIGS. 22A, 22B conceptually illustrate the image signals in image computation memories (not shown in FIG. 20) within the microcomputer 631. In FIG. 22A, $IM2_{DEF}$ represents the image signal read out of the subordinate image sensing device 624 and stored in a second computation memory RAM2, and $IM1_0$ represents the image signal read out of the main image sensing device 111 and stored in a first computation memory RAM1. The signal $IM1_0$ is an image signal that has undergone the size correction described above. As the result of the size correction, the image $IM2_{DEF}$ regarding the second image IM2 of the object and the image $IM1_0$ regarding the first image IM1 of the object are the same in size but and differ only in terms of their relative positions, as illustrated in FIG. 23.

FIG. 23 is a schematic view showing spacing $V_{DEF}$ of image signals stored in the two computation memories RAM1, RAM2 mentioned above.

In accordance with a well-known correlation algorithm, the distance $V_{DEF}$ of the image $IM2_{DEF}$ relative from the image $IM1_0$ is obtained and distance DST to the object OBJ can be calculated from the following equation using a reference spacing $V_0$, the focal length f of the light-receiving lens 622 and baselength BL of the rangefinding module 621:

$$DST = \frac{f \cdot BL}{\Delta V} \quad (EQ. 1)$$

where the following holds:

$$\Delta V = V_{DEF} - V_0 \quad (EQ. 2)$$

Ideally, the reference spacing $V_0$ should be zero when the object is at infinity. In general, however, the optical systems and image-sensing elements develop positional offsets in the camera-manufacturing process. According to this embodiment, therefore, information representing the reference spacing $V_0$ conforming to the positions of the focusing-lens group 152 and zoom-lens group 153 is stored in the ROM (not shown) of the microcomputer 631.

Figure 24:
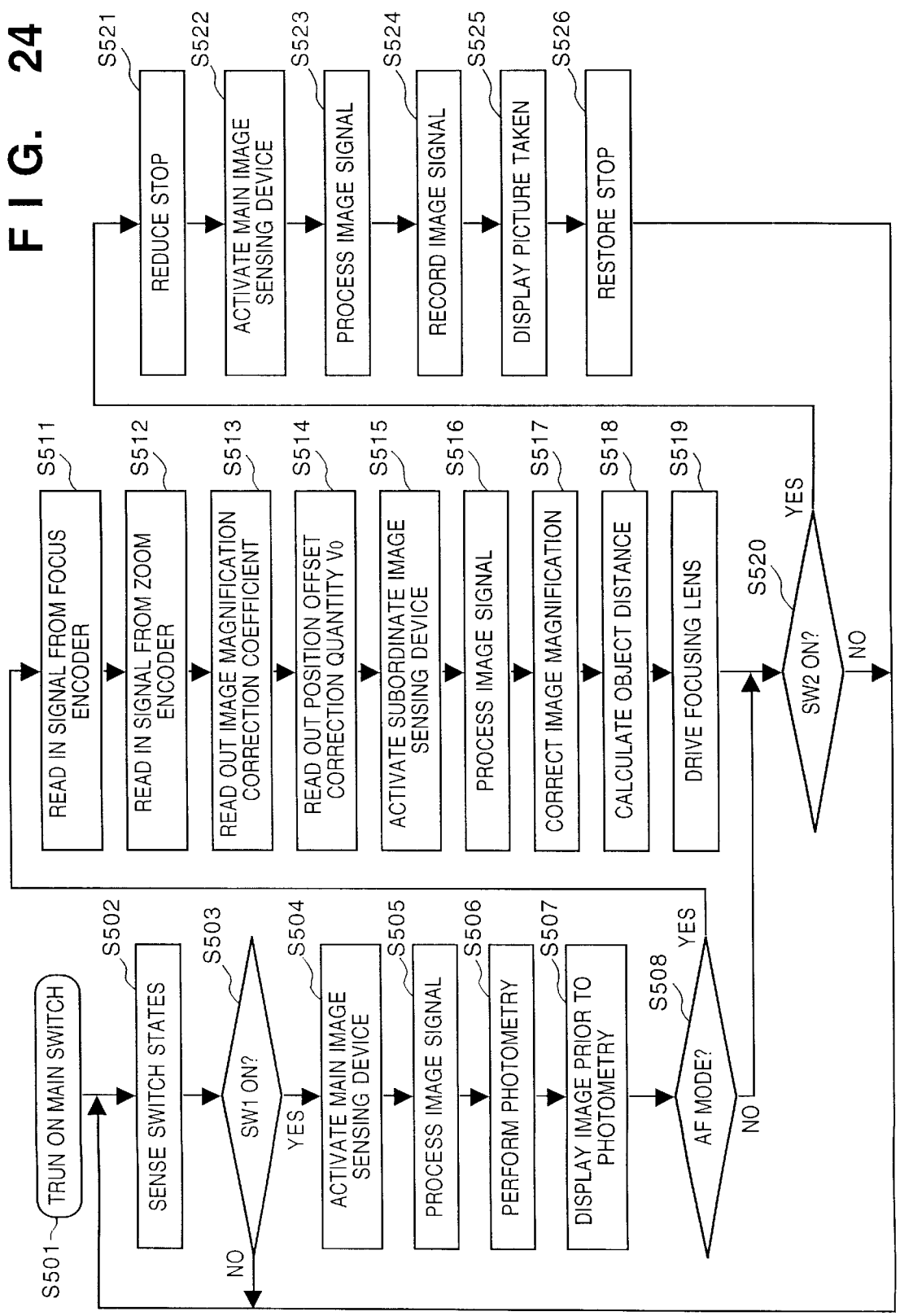
FIG. 24 is a flowchart showing a procedure for controlling an image sensing apparatus according to the sixth embodiment.

FIG. 24 is a flowchart showing the control flow of the microcomputer 631 when focus detection, focusing and photography are performed in the camera body 601 according to the sixth embodiment.

<Control Procedure>
Sixth Embodiment

The control flow of FIG. 24 will be described while making reference to FIGS. 20 through 23.

When the main switch 120 of the camera body 101 is turned on, the microcomputer 631 is activated from the sleep state and control proceeds from step S501 to step S502, at which the states of the switches 121–124 inside the camera body 601 are sensed.

The state of the photography preparation switch 121 (SW1), which is turned on by pressing the release button through its first stroke length, is sensed at step S503. Control returns to step S502 when the switch 121 is off and proceeds to step S504 when the switch 121 is on.

Next, at step S504, the main image-sensing device 111 is activated to acquire an image signal.

Processing of the image signal acquired at step S504 is executed at step S505. More specifically, processing such as A/D conversion of the image signal, white balance adjustment and gamma correction, is executed.

This is followed by step S506, at which object-brightness information is calculated from the image signal processed at step S505. Further, in accordance with a predetermined exposure-control program, a control value for stopping down the stop 155 and the exposure time (charge storage time) of the image sensing device 111 are calculated.

The image signal produced by the image sensing device 111 at steps S504 and S505, namely the image signal $1M1_W$ or $1M1_T$ in FIG. 21B, is displayed on the display unit 104 at step S507.

Next, the setting of the AF mode switch 123 is discriminated at step S508 to determine if the autofocus (AF) mode is in effect. Control jumps to step S520 if the mode is not the AF mode and proceeds to step S511 if the mode is the AF mode. The autofocus operation, described below, is then executed.

The microcomputer 631 senses the state of the focus encoder 163 at step S511 and senses the state of the zoom encoder 165 at step S512 to judge the current optical status of the lens.

A coefficient for making the size of the first image IM1 of the object equal to that the second image of the object, namely an image-magnification correction coefficient, is read out of the ROM (not shown) of microcomputer 631 at step S513 in the manner described above in connection with FIGS. 22A, 22B. Coefficients are stored in the ROM as matrix data corresponding to the states of the focus encoder 163 and zoom encoder 165.

Next, a position-offset correction quantity $V_O$ is read out of ROM at step S514 in the same manner as the image-magnification correction coefficient.

The subordinate image-sensing device 624 is activated at step S515 to obtain an image signal.

Processing of the image signal acquired at step S515 is executed at step S516. More specifically, processing such as A/D conversion of the image signal, white balance adjustment and gamma correction, is executed.

This is followed by step S517, at which image size is corrected by multiplying the image signal of the first image IM1 acquired at step S505 by the image-magnification correction coefficient read out at step S513.

Next, at step S518, the distance to the object is calculated in accordance with Equations (EQ.1), (EQ.2) using the first image IM1 whose size has been corrected at step S517, the second image IM2 obtained at step S516 and the position-offset correction quantity $V_O$ obtained at step S514.

The focusing lens group 152 is driven at step S519 based upon the result of the above-described calculation to bring the first image IM1, which is for image sensing purposes, into focus.

The state of the photography switch 122 (SW2) is discriminated at step S520. If the switch 122 is off, control returns to step S502 so that the processing of steps S502–S519 is executed again. If the photography switch 122 is found to be on at step S520, it is judged that release has been performed and control shifts to step S521.

The stop actuator 166 is driven at step S521 in accordance with the stop-control value calculated at step S506.

Charge accumulation and charge transfer of the main image-sensing device 111 for photography are controlled at step S522. This is followed by step S523, at which processing of the image signal acquired at step S522 is executed in the same manner as performed at step S505. More specifically, the image signal is applied to A/D conversion, white balance adjustment, gamma correction, and compression processing, etc.

Next, at step S524, the signal processed at step S523 is recorded and preserved in the image memory 106. The image recorded at step S524 is displayed on the display unit 104 at step S525, thereby allowing the photographer to check the image that is the result of photography.

The stop actuator 166 is restored to open the stop 155 at step S526.

Control returns to step S502 when the above-described photographic operation is completed.

The operation of the camera according to the foregoing flowchart will now be summarized.

At the photography-preparation stage, the first image IM1 of the object is formed on the image-sensing device 111 via the image sensing optical system and the second image IM2 of the object is formed on the subordinate image sensing device 624 via the light-receiving lens 622, as illustrated in FIG. 20 and FIGS. 21A, 21B.

When the main switch 120 and photography preparation switch 121 are turned on by the photographer, the camera obtains the two above-mentioned images, performs the image-magnification correction, as shown in FIGS. 22A, 22B, and calculates the distance to the object OBJ by calculating the spacing between the two images in the manner shown in FIG. 23. The focusing-lens group 152 is driven based upon the calculated value, whereby focusing is achieved. Continuous focusing is performed by executing this operation repeatedly. Meanwhile, the first image IM1 of the object is displayed on the display unit 104 to inform the photographer of the composition of the picture taken and of the state of focusing.

When the photography switch 122 is turned on, the image of the object projected upon the image-sensing device 111 is recorded in the image memory 106 and image of the picture taken is displayed on the display unit 104.

<Advantages>

Sixth Embodiment

The sixth embodiment provides the following advantages:

(AD10) The rangefinding module can be simplified to make possible an autofocus camera that is compact and low in price.

(AD11) The image-sensing optical system serves also as the rangefinding optical system. As a result, when telescopic photography requiring more accurate rangefinding is performed, the image of the object for rangefinding purposes is also projected in enlarged size. This makes it possible to achieve a rangefinding accuracy that conforms to the state of the image sensing optical system.

(AD12) Parameter correction, e.g., correction of image magnification, at the time of rangefinding computation is carried out using a rangefinding parameter that conforms to the state of the image sensing optical system. Even if the state of the image sensing optical system changes, therefore, accurate detection of object distance is possible at all times.

(AD13) The autofocus operation is executed repeatedly at the photography preparation stage. This makes it possible to shorten release time lag from issuance of a photography-start instruction to implementation of image sensing.

(AD14) Since the automatically focused image of the object is displayed on the display unit 104, such as a liquid crystal monitor, the state of focus of the image of the object can be verified visually and accurately in real-time.

<Seventh Embodiment>

The sixth embodiment concerns a passive-triangulation-type rangefinding device composed of a single image-sensing system and a single rangefinding module. A seventh embodiment described below provides an active-triangulation-type rangefinding device (i.e., a device in which infrared light is projected upon an object and rangefinding is performed based upon the reflected light)

comprising a single image-sensing system and a single projection system.

<Seventh Embodiment>

Figure 25:
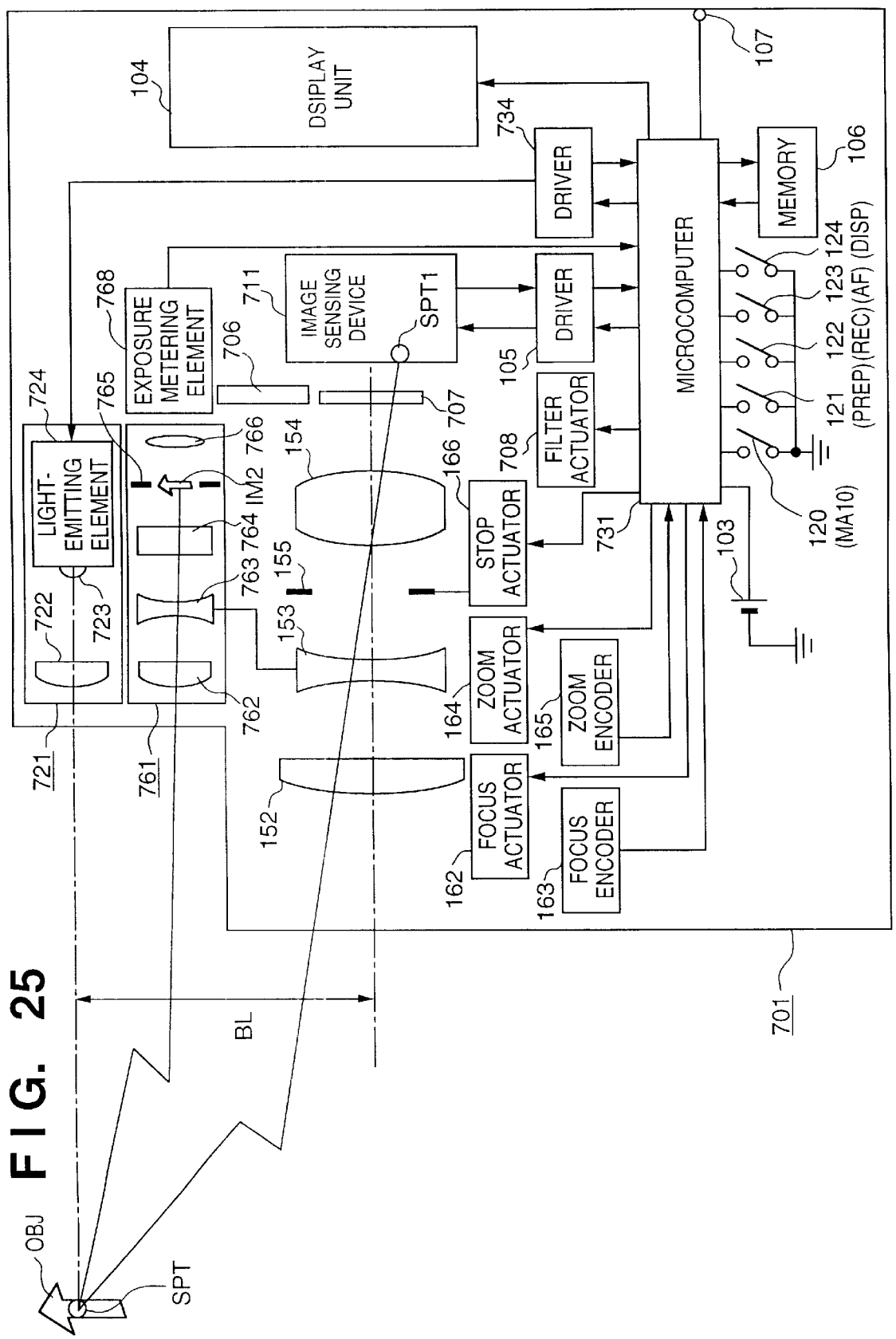
FIG. 25 is a diagram showing the construction of an image sensing apparatus at the time of rangefinding according to the seventh embodiment.

FIGS. 25 through 31 are diagrams for describing the construction and operation of the seventh embodiment. FIG. 25 illustrates the disposition of the image-sensing apparatus when rangefinding is performed according to the seventh embodiment. Components in FIGS. 25 through 31 that perform actions identical with those of the sixth embodiment are designated by like reference characters and need not be described again in detail.

Numeral 701 denotes a camera body having various functional components for forming the image of an object OBJ, detecting focus and sensing the image. The image sensing optical system is composed of the elements 152–155 of the sixth embodiment.

An infrared blocking filter 706 blocks infrared light from the object OBJ and passes only visible light. Since the filter 706 is used for ordinary image sensing, it is withdrawn from the light flux of the sensed image at the time of rangefinding (shown in FIG. 25).

An infrared passing filter 707 blocks visible light and passes only infrared light from the object OBJ. Since the filter 707 is used for rangefinding, the filter is inserted into the light flux of the sensed image only at the time of rangefinding. The lens groups 152, 153, 154, stop 155 and filters 706, 707 together construct the image-sensing optical system.

Numeral 711 denotes an image-sensing device, such as a CCD. This is a two-dimensional photoelectric sensor for photoelectrically converting the object image, which is for image-sensing purposes, or the image of an infrared spot which is for rangefinding, described later. The image-sensing device 711 is sensitive to light from the visible to infrared wavelengths.

A projection module 721 includes a light-emitting element 724 that emits infrared light from a light-emitting portion 723, and a projecting lens 722 for projecting the emitted infrared light onto the object OBJ. The projection module 721 having these elements is spaced away from the optic axis of the image-sensing optical system by the baselength BL. As a result, a rangefinding pattern that corresponds to the projected image of the light-emitting portion 723, namely an infrared spot SPT, is formed on the object OBJ. The infrared spot SPT is formed, via the image-sensing optical system, as an infrared spot image $SPT_1$ on the main image-sensing device 711 at a position spaced a predetermined distance away from the center thereof. Since the infrared-passing filter 707 has been inserted into the light flux of the sensed image, the light flux of the object OBJ per se does not pass through the filter; only the light flux from the infrared spot SPT arrives at the main image-sensing device 711.

A driver 734 drives the light-emitting element 724 so that the latter emits rangefinding infrared light at the time of a rangefinding operation in accordance with an instruction from a microcomputer 731.

The microcomputer 731 is a single-chip microcomputer having a ROM, a RAM and A/D, D/A conversion functions. In accordance with a camera sequence program stored in the ROM serving as a storage medium, the microcomputer 731 implements a series of camera operations, such as automatic exposure control (AE), autofocus (AF) and image sensing in a manner similar to that of the sixth embodiment. To this end, the microcomputer 731 controls the operation of peripheral circuits and actuators inside the camera body 701.

The power supply 103, the driver 105, the memory 106, the terminal 107, the display unit 104 and the switches 120–124, 162–166 are similar to those of the sixth embodiment.

An optical finder 761 is composed of a lens group 762, a zoom lens 762, an erecting prism 764 such as a Porro lens, a field mask 765 and an eyepiece 766. A zoom linkage member 767 mechanically connects the zoom lens 153 with the zoom lens 763. The magnification of the optical finder 761 is automatically adjusted by the zoom linkage member 767 in operative association with the zooming operation of the image-sensing optical system. An exposure-metering element 768 is disposed in the vicinity of the optical finder 761. The exposure metering element 768 splits the light flux within the optical finder 761 by a beam splitter (not shown) and measures the brightness of the object before a picture is taken.

<Principles>

Seventh Embodiment

An erect real image IM2 of the object OBJ is projected into the field mask 765 by the optical finder 761 so that the photographer can verify the zone of photography by viewing the finder image IM2 through the eyepiece 766.

The state of image formation of the infrared spot image SPT, at the time of rangefinding, which is a preparation for photography, will now be described.

Figure 26:
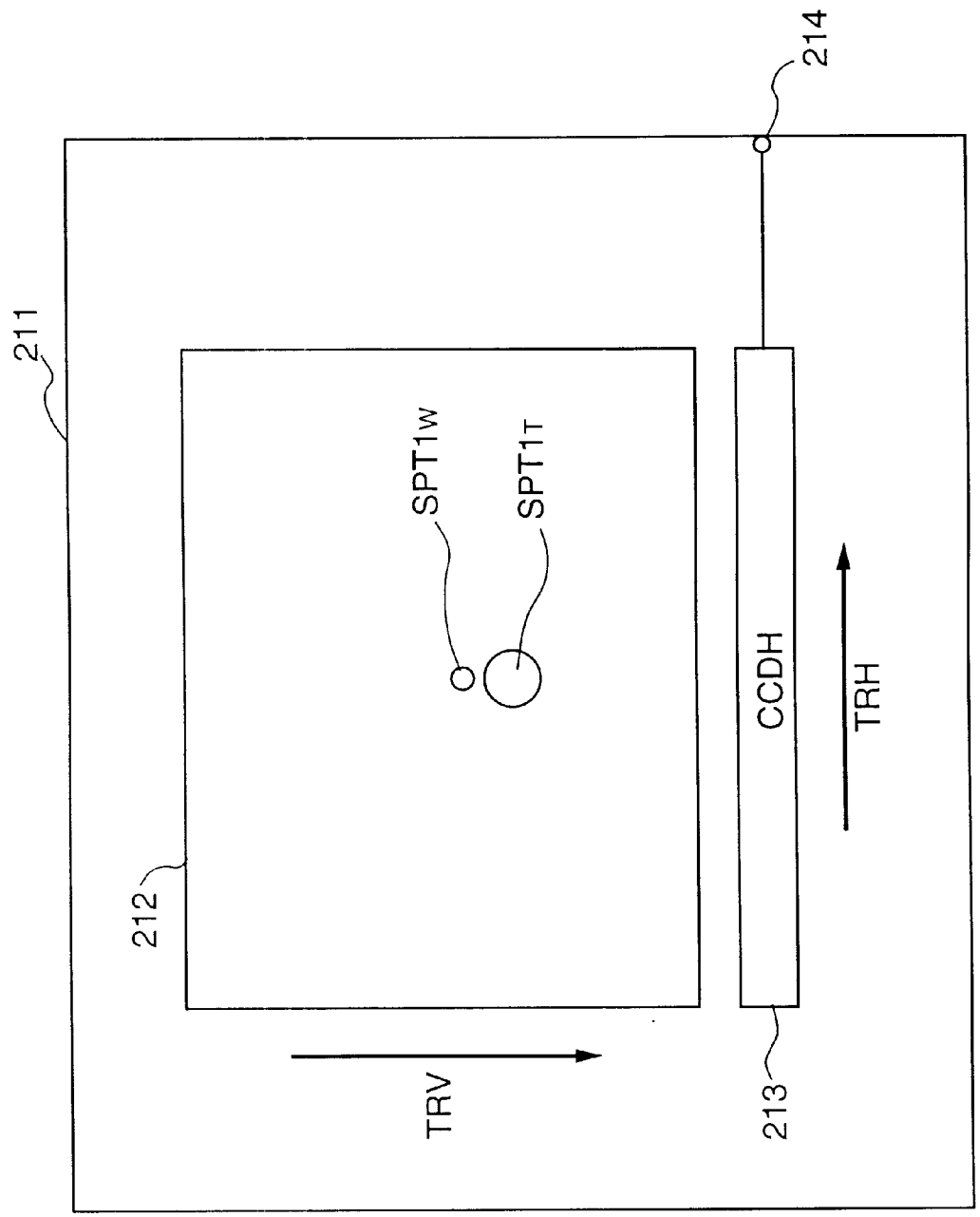
FIG. 26 is a diagram useful in describing the state of formation of a spot image for rangefinding according to the seventh embodiment.

FIG. 26 is a diagram illustrating the disposition of the infrared spot image SPT, formed on the main-image sensing device at the time of rangefinding.

A light-receiving portion 212 of the main image-sensing device 711 comprises $m_1 \times n_1$ light-receiving pixels and a charge transfer portion (vertical transfer CCD) for transferring electric charge that has accumulated in these pixels. A horizontal transfer CCD 213 stores electric charge transferred in the direction of arrow TRV by the vertical transfer CCD in the light-receiving portion 212, then transfers the charge in the direction of arrow TRH and outputs an image signal from a signal output portion 214 to the image-sensor driver 105.

Further, $SPT1_T$ represents the image of the infrared spot SPT when the image-sensing optical system has been set to the maximum telescopic mode, and $SPT1_W$ represents the image of the infrared spot when the image-sensing optical system has been set to the maximum wide-angle mode. Thus, the size and projected position of the image vary depending upon the state of the image-sensing optical system.

Figure 27:
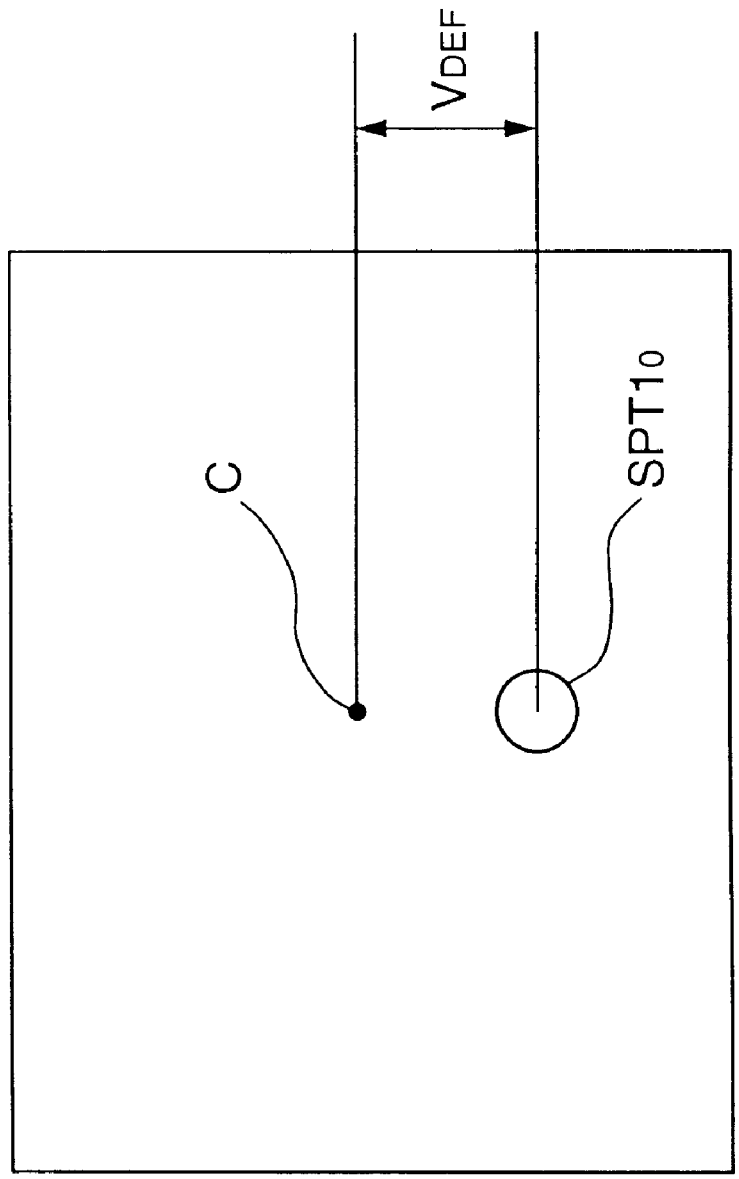
FIG. 27 is a diagram useful in describing the concept of an image signal when a rangefinding calculation is performed according to the seventh embodiment.

FIG. 27 illustrates the result of subjecting the image $SPT1_T$ or $SPT1_W$ to processing similar to that of the sixth embodiment and normalizing size and position. The normalized image signal is indicated at $SPT1_0$. Spacing $V_{DEF}$ between the position of the center of gravity of the signal $SPT1_0$ and a predetermined reference position C is obtained. The distance DST to the object OBJ can be detected in accordance with Equations (EQ.1) and (EQ.2), in a manner similar to that of the sixth embodiment, using the reference spacing $V_0$, the normalized focal length $f_0$ of the image-sensing optical system and baselength BL of the optical finder 761. As in the sixth embodiment, information relating to the reference spacing $V_0$ conforming to the positions of the focusing-lens group 152 and zoom-lens group 153 is stored in the ROM of the microcomputer 731. Further, $f_0$ represents the focal length of the image-sensing optical system normalized by normalization of the size and position of the spot image. This is an imaginary focal length for obtaining the normalized image signal $SPT1_0$ of FIG. 27 at all times even if there is a changed in the zoom state.

The object OBJ is brought into focus automatically if the focusing lens group 152 is driven based upon the distance DST to the object OBJ calculated in accordance with Equations (EQ.1), (EQ.2).

Figure 28:
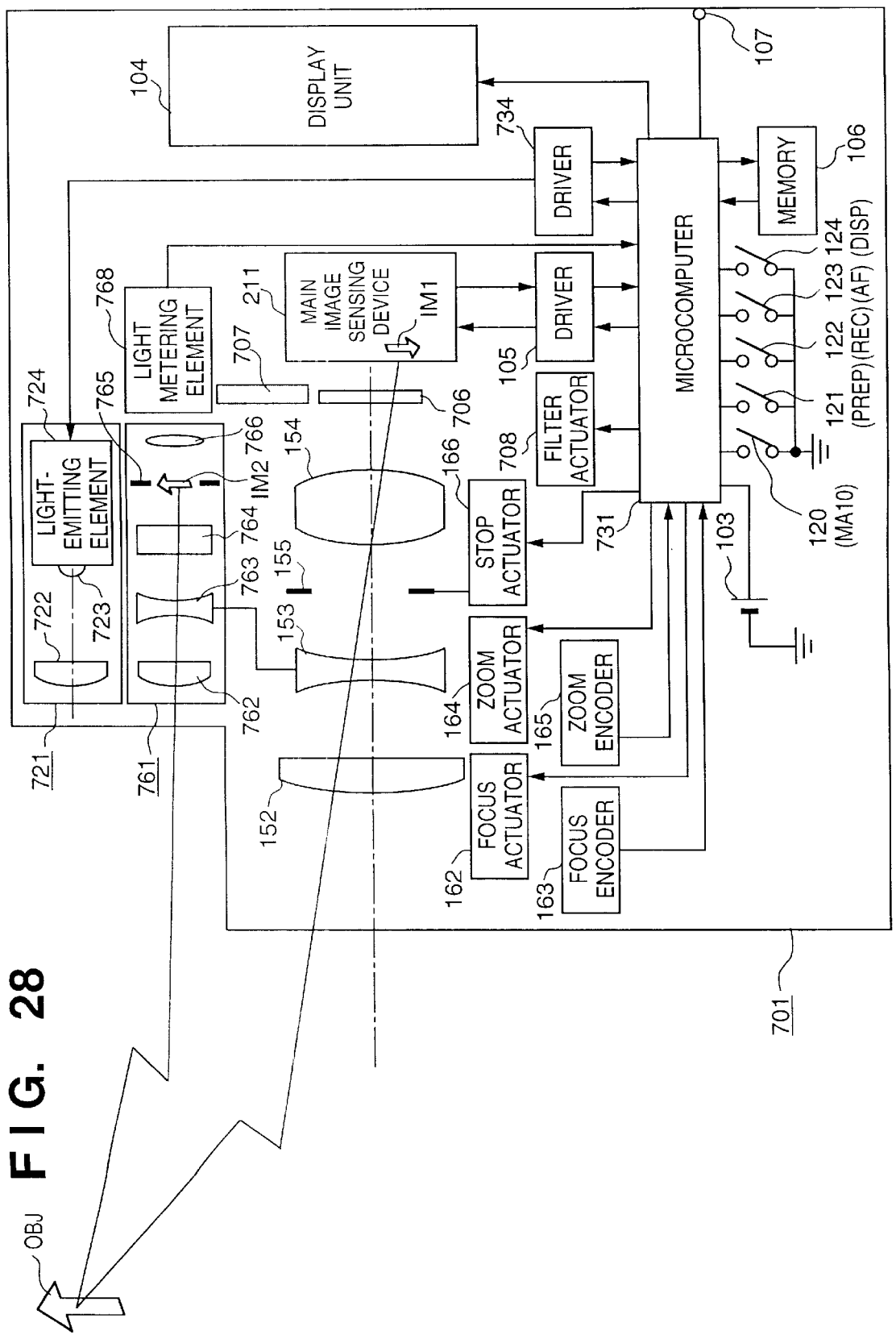
FIG. 28 is a diagram showing the construction of an image sensing apparatus at the time of image pick-up according to the seventh embodiment.

FIG. 28 is a diagram showing the camera when the photography switch 122 of the camera body 701 is closed upon the completion of the autofocus operation, thereby establishing the image-sensing state.

When the photography switch 122 is turned on, the light-emitting element 724 stops emitting infrared light. The filter actuator 708 is then actuated to withdraw the infrared passing filter 707 from the photographic light flux and insert the infrared blocking filter 706 into the light flux. When this is done, the image IM1 of the object OBJ is formed on the main image-sensing device 711 via the image-sensing optical system. If FIGS. 25 and 28 are compared, it will be seen that the positions of the infrared blocking filter 706 and infrared passing filter 707 are reversed.

Figure 29:
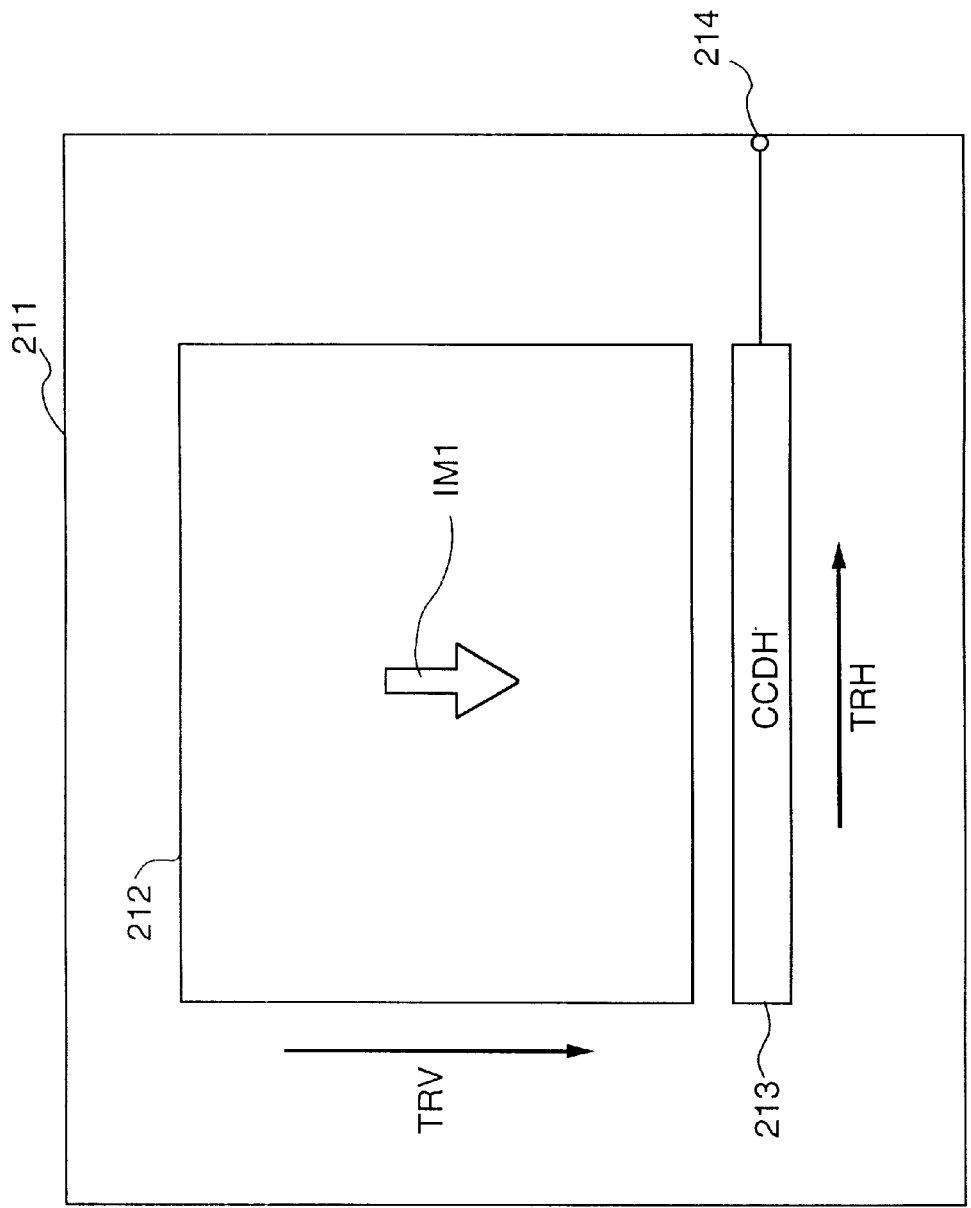
FIGS. 29 is a diagram useful in describing the state of image formation when image pick-up is performed according to the seventh embodiment.

FIG. 29 is a diagram showing the formation of the image of the object on the main image-sensing device 711 at the time of photography. The primary image IM1 of the object OBJ is projected upon the image-receiving portion 212. Accordingly, the image signal is acquired under these conditions and recorded in the image memory 106 of the camera body 701, whereby the image is sensed.

Figure 30:
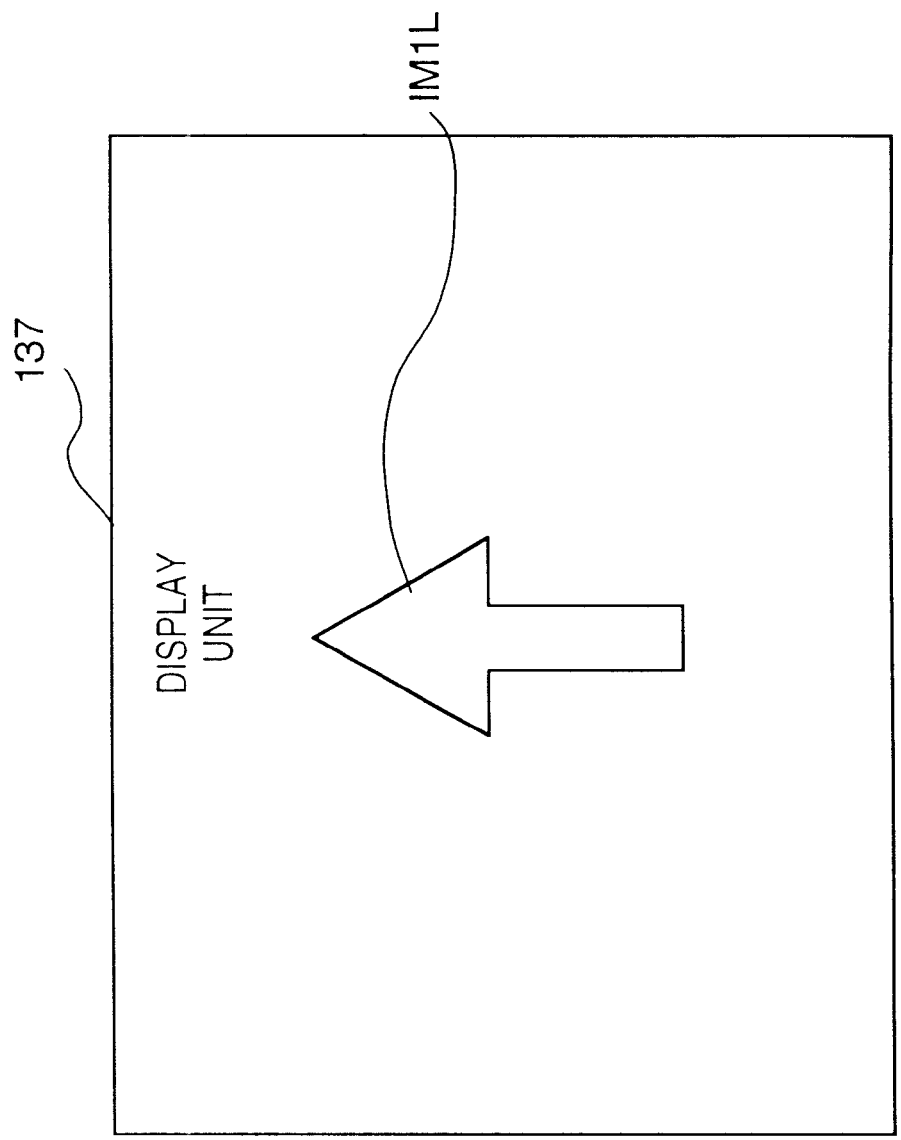
FIG. 30 is a diagram useful in describing the state of an image display after image pick-up according to the seventh embodiment.

FIG. 30 is a diagram showing the state of the display on the display unit 104 after image sensing. The image IM1 acquired in FIG. 29 is displayed on the display screen of the display unit 104 as an image $IM1_L$ resulting from photography. This allows the photographer to determine whether photography has been performed correctly.

Figure 31:
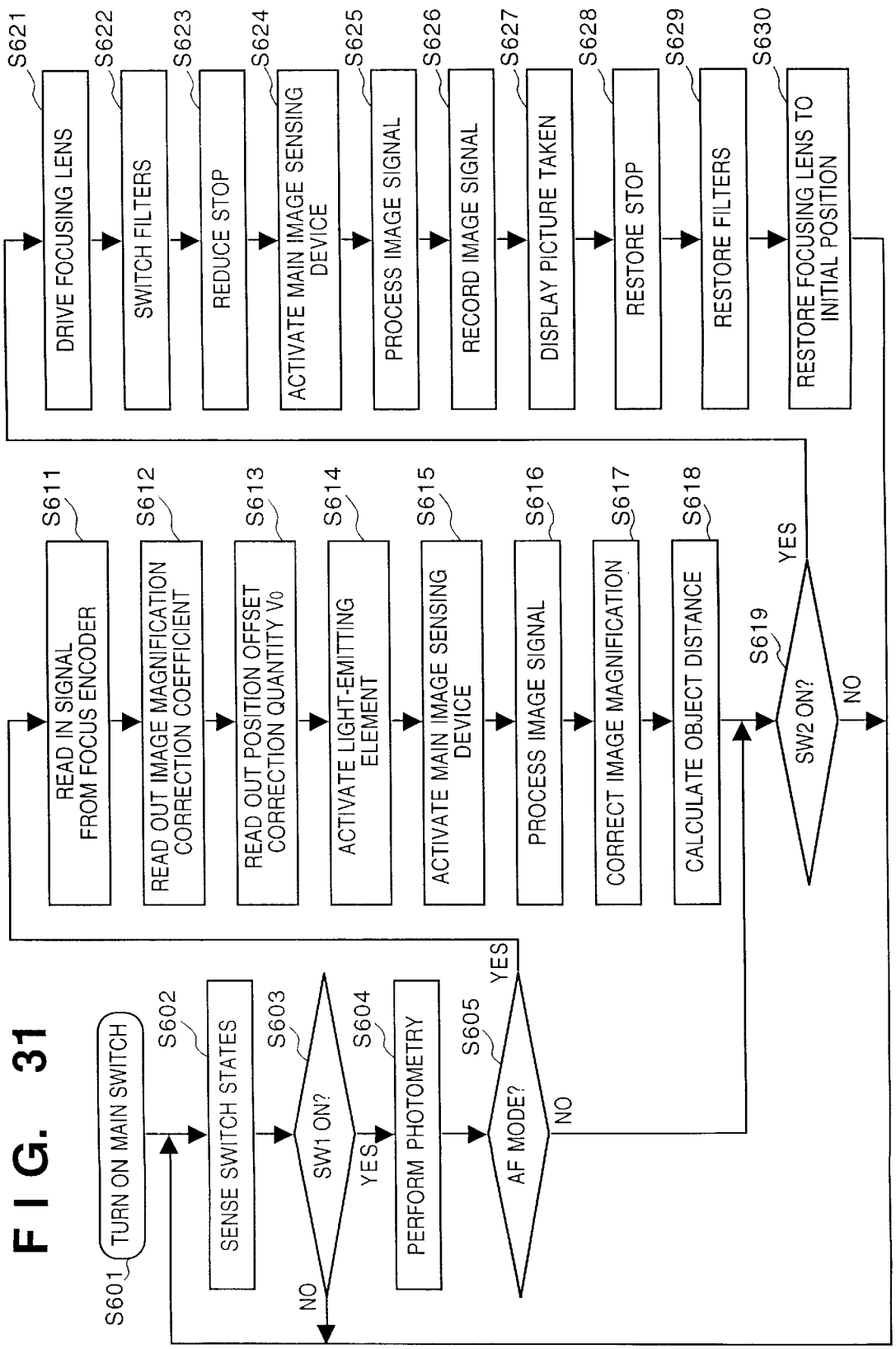
FIG. 31 is a flowchart showing a procedure for controlling an image sensing apparatus according to the seventh embodiment.

FIG. 31 is a flowchart showing the control flow of the microcomputer 731 when focus detection, focusing, and photography are performed in the camera body 701 according to the seventh embodiment. The control flowchart of FIG. 31 will be described with reference to FIGS. 25 through 30.

When the main switch 120 of the camera body 701 is turned on, the microcomputer 731 is activated from the sleep state and control proceeds from step S601 to step S602, at which the states of the switches 121–124 inside the camera body 701 are sensed.

The state of the photography-preparation switch 121 (SW1), which is turned on by pressing the release button through its first stroke length, is sensed at step S603. Control returns to step S602 when the switch 121 is off and proceeds to step S604 when the switch 121 is on.

This is followed by step S604, at which the output of the exposure-metering element 768 is read out, object-brightness information is calculated and, in accordance with a predetermined exposure-control program, a control value for narrowing the stop 155 and the exposure time (charge storage time) of the image-sensing device 711 are calculated.

Next, the setting of the AF mode switch 123 is discriminated at step S605 to determine if the autofocus (AF) mode is in effect. Control jumps to step S619 if the mode is not the AF mode and proceeds to step S611 if the mode is the AF mode.

The microcomputer 731 senses the state of the zoom encoder 165 at step S611 to judge the current optical status of the lens. It should be noted that when rangefinding is performed according to this embodiment, the focusing lens 152 is always at an initial position that corresponds to infinity. The state of the focus encoder 163, therefore, is not sensed.

A coefficient for making the size of the infrared spot image SPT1 conform to the reference value, namely an image-magnification correction coefficient, is read out of the ROM (not shown) of microcomputer 731 at step S612 in the manner described above in connection with FIG. 27. Coefficients are stored in the ROM as matrix data corresponding to the state of the zoom encoder 165.

Next, the image-position-offset-correction quantity $V_O$ is read out of ROM at step S613 in the same manner as the image-magnification correction coefficient.

The light-emitting element 724 is activated at step S614 to project rangefinding infrared light toward the object OBJ.

The main image-sensing device 711 is activated at step S615 to obtain the signal representing the infrared spot image $SPT_1$.

Processing of the image signal acquired at step S615 is executed at step S616. More specifically, the image signal is converted from an analog to a digital quantity.

This is followed by step S617, at which the image size is corrected by multiplying the image signal of the infrared spot image $SPT_1$ acquired at step S616 by the image-magnification correction coefficient read out at step S612. The resulting signal is converted to the signal SPT10 normalized in the manner shown in FIG. 27.

Next, at step S618, the distance DEF to the object is calculated upon calculating $V_{DEF}$ in accordance with Equations (EQ.1), (EQ.2) using the normalized signal SPT10 obtained at step S617 and the positional-offset correction quantity $V_O$ obtained at step S613.

The state of the photography switch 122 (SW2) is discriminated at step S619. If the switch 122 is off, control returns to step S602 so that the processing of steps S602–S618, namely the rangefinding operation, is executed again. If the photography switch 122 is found to be on at step S619, it is judged that release has been performed and control shifts to step S621.

The focusing lens 152 is driven at step S621 based upon the result of the calculation at step S618 to bring the image IM1 into focus.

The filter actuator 708 is driven at step S622 to withdraw the infrared passing filter 707 from the photographic light flux and insert the infrared blocking filter 706 into the photographic light flux instead.

The stop actuator 166 is driven at step S623 in accordance with the stop-control value calculated at step S604.

Charge accumulation and charge transfer of the main image-sensing device for photography are controlled at step S624. This is followed by step S625, at which processing of the image signal acquired at the above-mentioned steps is executed. More specifically, the image signal is applied to A/D conversion, white balance adjustment, gamma correction and compression processing, etc.

Next, at step S626, the signal processed at step S625 is recorded and preserved in the image memory 106. The image recorded at step S626 is displayed on the display unit 104 at step S627, thereby allowing the photographer to check the image that is the result of photography.

The stop actuator 166 is restored to open the stop 155 at step S628. The infrared blocking filter 706 and infrared passing filter 707 are interchanged, i.e., restored to the positions that prevail at the time of the rangefinding operation, at step S629. The focusing lens group 152 is restored to its initial position at step S630.

Control returns to step S502 when the above-described photographic operation is completed.

The operation of the camera according to the foregoing flowchart will now be summarized.

When a switch operation in preparation for photography is performed by the photographer, infrared light is projected toward the object OBJ from the projection module 721 to form the infrared spot SPT on the object, as shown in FIG. 25. As a result, the image-sensing optical system forms the image of the infrared spot SPT on the main image-sensing device 711 via the infrared passing filter 707, and the distance to the object OBJ is detected based upon the amount of shift of the spot image from the reference position.

Next, when a picture is taken, the projection of infrared light is halted and the focusing lens is driven based upon the results of rangefinding. Next, photography is performed upon changing over the filter in front of the main image-sensing device 711 to the infrared blocking filter 706, namely to the filter that passes visible light, the image acquired is stored and preserved in the image memory 106 and the image of the picture taken is displayed on the display unit 104.

In accordance with the seventh embodiment, the following advantages are obtained in addition to the advantages (AD10)–(AD14) of the sixth embodiment:

(AD15) An active-triangulation-type rangefinding device that projects infrared light can be provided. This makes it possible to sense distance accurately even in a dark field.

(AD16) Since an infrared spot image is obtained by an image-sensing optical system having a large aperture, it is possible to measure distance even to a distant object.

(AD17) Since a changeover is made between an infrared-passing filter used for rangefinding and an infrared-blocking filter used for imaging, rangefinding can be performed without the influence of external light even when the field is bright. In addition, degradation of the photographic image by infrared light can be prevented at the time of imaging, making it possible to obtain a high-quality image.

(AD18) Since the camera has an optical finder, it is unnecessary to present an image display by a liquid crystal monitor or the like at the time of photographic preparations such as rangefinding. This makes it possible to conserve power.

<Eighth Embodiment>

In the sixth embodiment described above, the image from the main image-sensing device 111 is displayed on the display unit 104, such as a liquid crystal monitor, as is when rangefinding is performed. However, a liquid crystal monitor provides a display of low resolution and, though it makes it possible to roughly ascertain the focused state, accurate verification of focusing is difficult. In an eighth embodiment described below, a second image of an object is displayed by being superimposed on a first image of the object after being shifted by an amount proportional to the amount of defocusing. In other words, the eighth embodiment provides a finder of double-image coincidence type.

FIGS. 32 through 35 are diagrams relating to the eighth embodiment.

Figure 32:
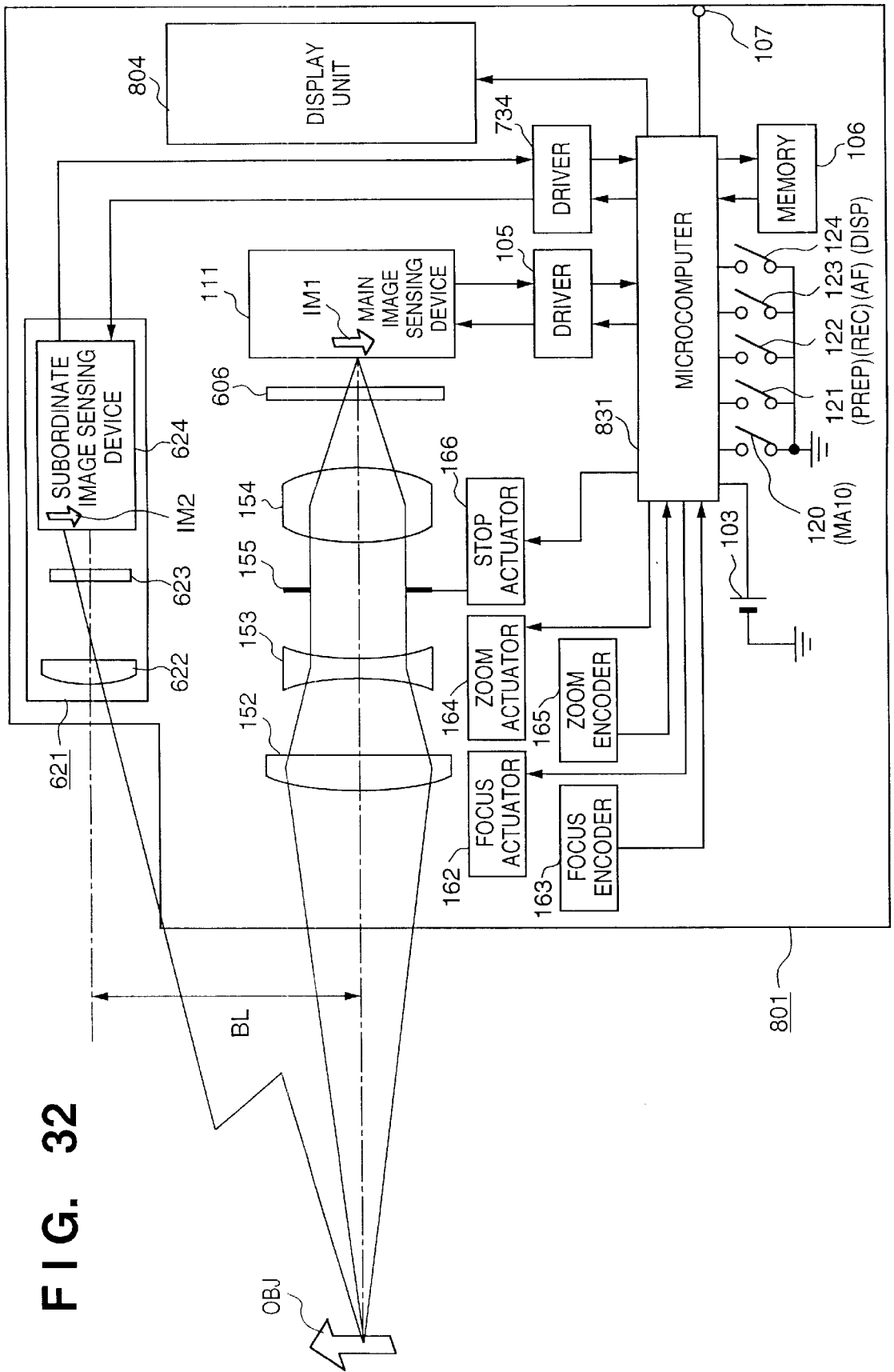
FIG. 32 is a block diagram illustrating the construction of an image sensing apparatus according to an eighth embodiment of the present invention.

FIG. 32 is a block diagram showing the structure of a camera body 801 used in the eighth embodiment. The components are the same as those of the sixth embodiment, the only difference being the manner of control at the time of rangefinding and the manner in which an image is displayed. In the camera body 801 of FIG. 32, the reference numerals 831 and 804 of the microcomputer and display unit, respectively, are different from those of the sixth embodiment. All other components are the same as those of the sixth embodiment and operate in the same fashion and need not be described again.

Figure 33:
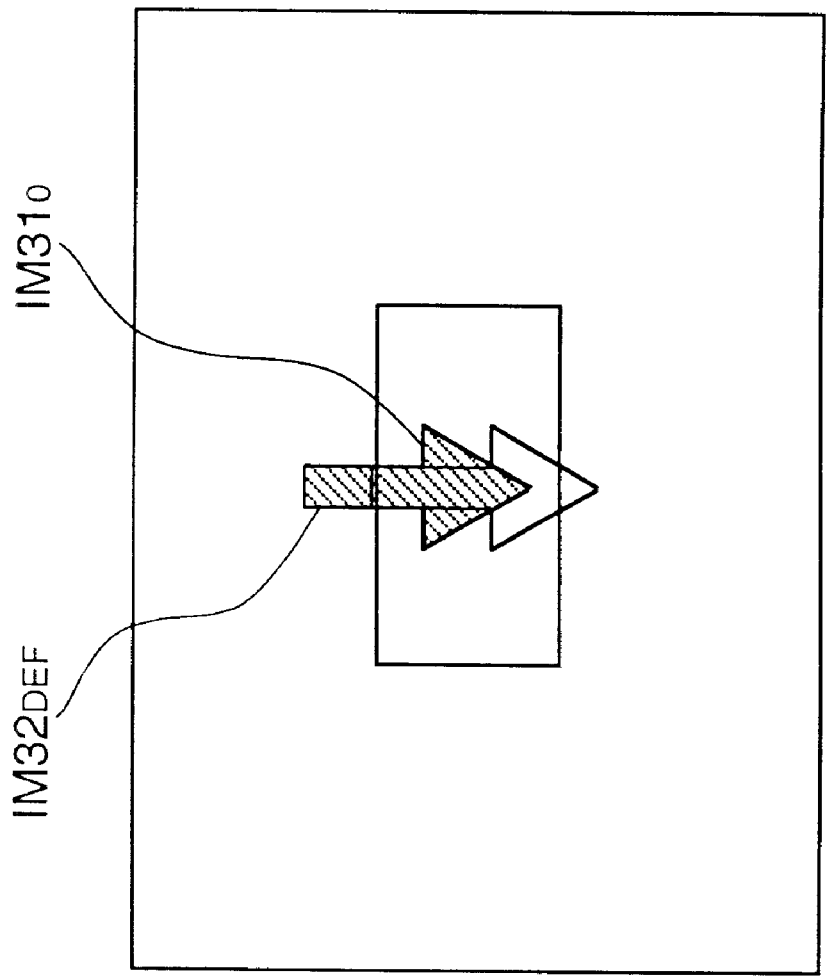
FIG. 33 is a diagram useful in describing the concept of an image signal when a rangefinding calculation is performed according to the eighth embodiment.

FIG. 33 corresponds to FIG. 23 of the sixth embodiment and illustrates a first object image IM31$_0$ for imaging formed in the computation memory and a second object image IM32DEF within the rangefinding module 621. In the sixth embodiment, computation is performed to make the size of the first image IM1 of the object conform to the size of the second image of the object. According to the eighth embodiment, however, these images are used in presenting a display. The second image, therefore, is made to conform to the first image, which is for image picture-taking purposes, and it is so arranged that the sizes and limits of the images displayed on the display unit 804 will coincide with the imaging area.

Figure 34:
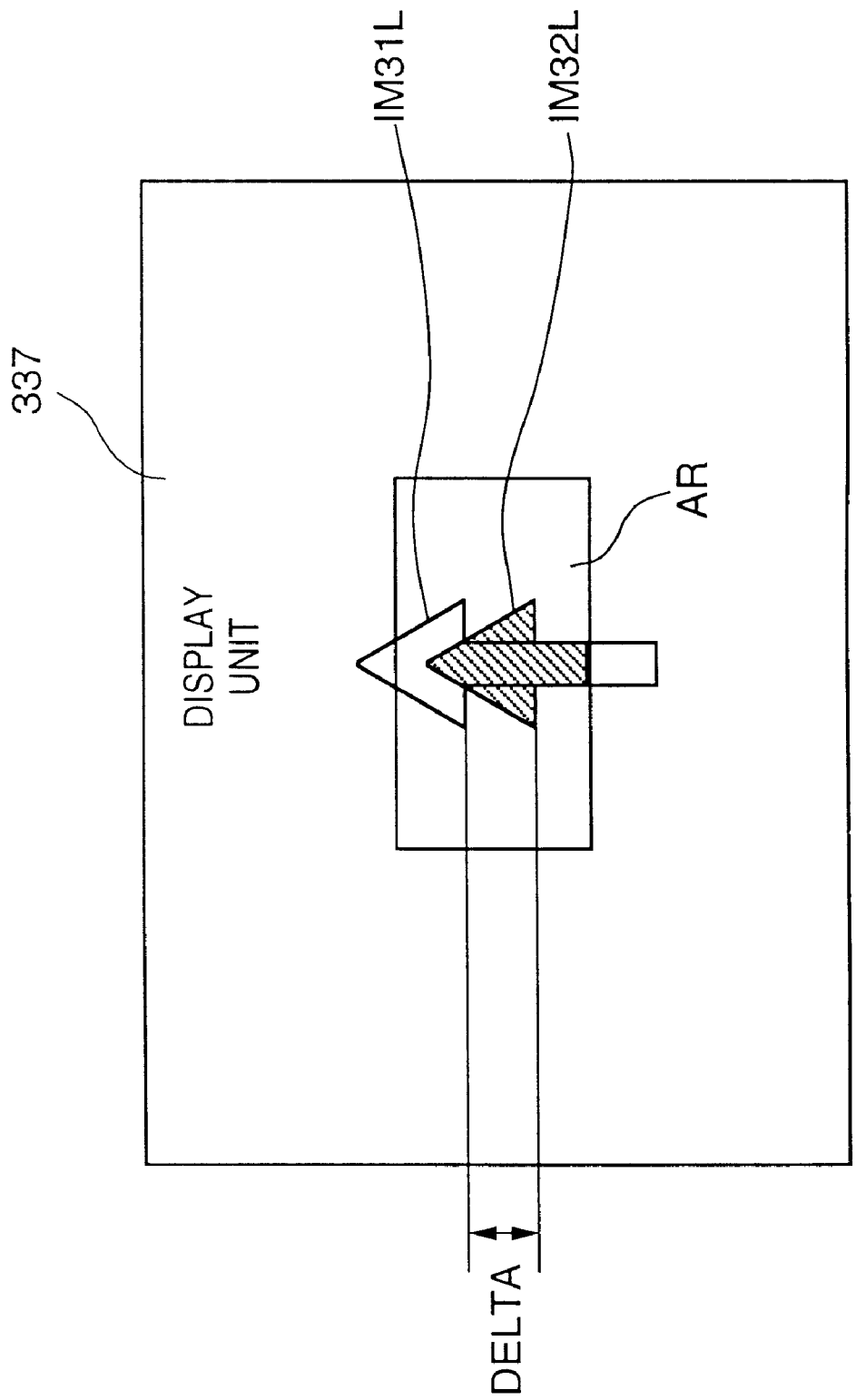
FIG. 34 is a diagram useful in describing the state of an image display when rangefinding is performed according to the eighth embodiment.

FIG. 34 is a diagram illustrating the state of a display on the display unit 804 displaying the image signals of FIG. 33.

An image IM31L from the main image-sensing device 111 is displayed over the entire display area. A rectangular area AR centered on the display area is a twin-image display area in which an image IM32L, which is obtained by extracting part of the image from the subordinate image-sensing device 624, is displayed in superposition on the image IM31L. The images IM31L and IM32L are displayed in a form offset from each other by an amount DELTA calculated in accordance with the following equation:

$$\text{DELTA} = K \cdot (V_{DEF} - D_{FOCUS}) \tag{EQ.3}$$

where $V_{DEF}$ represents a quantity relating to the distance to the object OBJ, $D_{FOCUS}$ represents a quantity relating to the amount of feed of the focusing lens 152 and K represents a coefficient for improving visibility by enlarging the display-offset quantity.

For example, if we assume that the distance to the object OBJ is infinity and that the amount of feed of the focusing lens 152 for focusing the object is zero, then we have $$\text{DELTA} = K(V_{DEF} - D_{FOCUS}) = K \cdot (0-0) = 0 \tag{EQ.4}$$

If the distance to the object is finite, then values of $V_{DEF}$ and $D_{FOCUS}$ conforming thereto are used. However, if the object is in focus owing to the feed of the focusing lens 152, then DELTA = 0 holds at this time as well.

In other words, if the offset quantity DELTA corresponds to the amount of focal shift of the image-sensing system with respect to the object OBJ and the image IM1 of the object is in focus, then DELTA will always be equal to zero. Accordingly, a coincidence finder can be implemented by the arrangement described above.

Figure 35:
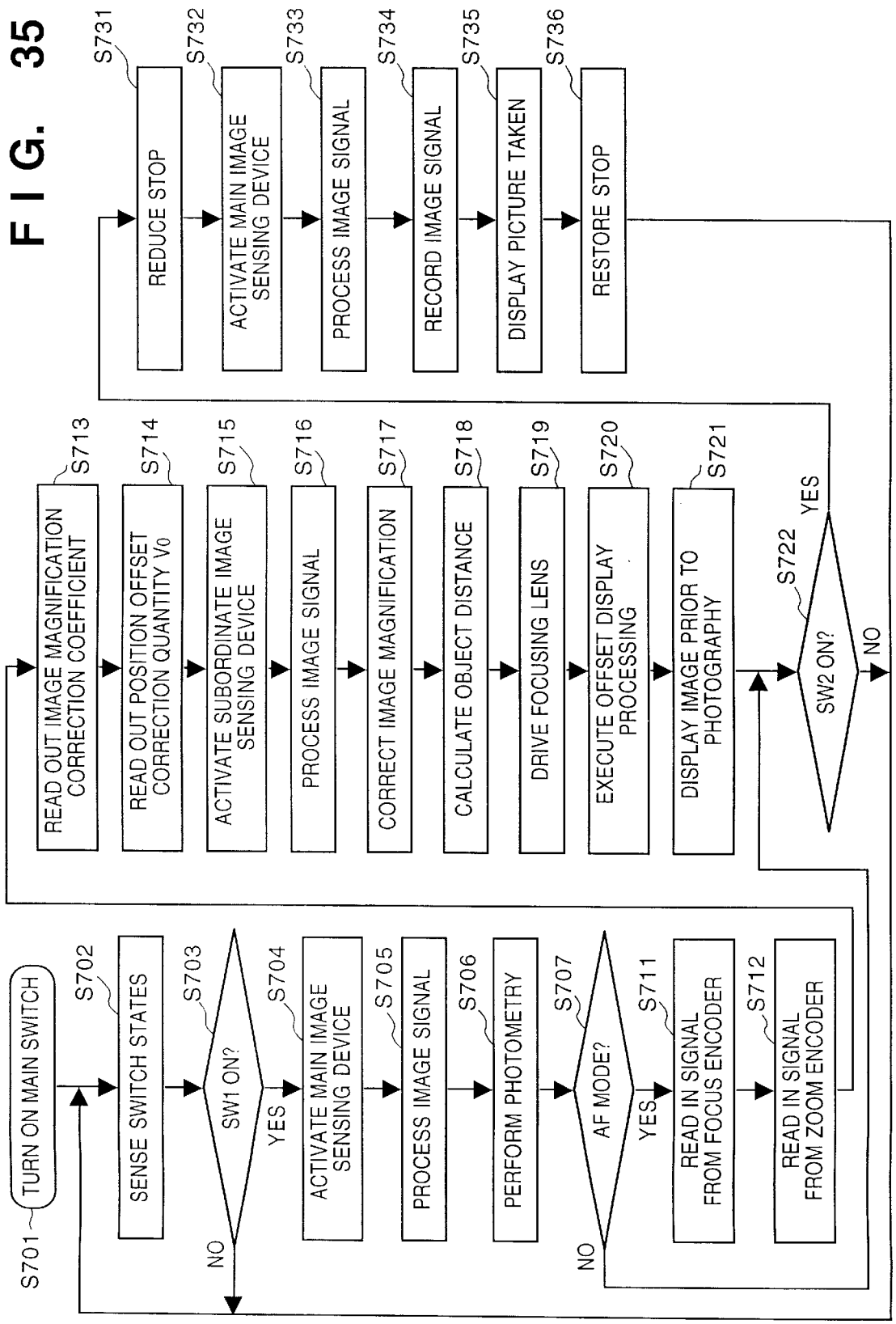
FIG. 35 is a flowchart showing a procedure for controlling an image sensing apparatus according to the eighth embodiment.

FIG. 35 is a flowchart illustrating the flow of control by the microcomputer 831 in a case where focus detection, focusing and photography are carried out in the camera body 801 of the eighth embodiment.

The control flow of FIG. 35 will be described while making reference to FIGS. 32 and 34.

When the main switch 120 of the camera body 801 is turned on, the microcomputer 831 is activated from the sleep state and control proceeds from step S701 to step S702, at which the states of the switches 121–124 inside the camera body 801 are sensed.

The state of the photography-preparation switch 121 (SW1), which is turned on by pressing the release button through its first stroke length, is sensed at step S703. Control returns to step S702 when the switch 121 is off and proceeds to step S704 when the switch 121 is on.

Next, at step S704, the main image-sensing device 111 is activated to acquire an image signal.

Processing of the image signal acquired at step S704 is executed at step S705. More specifically, processing such as A/D conversion of the image signal, white balance adjustment and gamma correction is executed.

This is followed by step S706, at which object-brightness information is calculated from the image signal processed at step S705. Further, in accordance with a predetermined exposure-control program, a control value for stopping down the stop 155 and the exposure time (charge storage time) of the image-sensing device 111 are calculated.

Next, the setting of the AF mode switch 123 is discriminated at step S707 to determine if the autofocus (AF) mode is in effect. Control jumps to step S722 if the mode is not the AF mode and proceeds to step S711 if the mode is the AF mode.

The microcomputer 831 senses the state of the focus encoder 163 at step S711 and senses the state of the zoom encoder 165 at step S712 to judge the current optical status of the lens.

A coefficient for making the size of the first image IM1 of the object equal to that the second image of the object, namely an image magnification correction coefficient, is read out of the ROM of microcomputer 831 at step S713 in the manner described above in connection with FIGS. 22A, 22B. Coefficients are stored in the ROM as matrix data corresponding to the states of the focus encoder 163 and zoom encoder 165.

Next, a position-offset-correction quantity $V_0$ is read out of the ROM at step S714 in the same manner as the image-magnification correction coefficient.

The subordinate image sensing device 624 is activated at step S715 to obtain an image signal.

Processing of the image signal acquired at step S715 is executed at step S716. More specifically, processing such as A/D conversion of the image signal, white balance adjustment and gamma correction is executed.

This is followed by step S717, at which the image size is corrected by multiplying the image signal of the second image IM2 acquired at step S715 by the reciprocal of the image-magnification correction coefficient read out at step S713.

Next, at step S718, the distance to the object is calculated in accordance with Equations (EQ.1), (EQ.2) using the second image IM2 that was subjected to the image-magnification correction at step S717, the first image IM1 obtained at step S705 and the position-offset-correction quantity $V_0$ obtained at step S714.

The focusing-lens group 152 is driven at step S719 based upon the result of the above-described calculation to bring the first image IM1 into focus.

This is followed by step S720, at which the offset DELTA between the two images for display shown in FIG. 34 is calculated in accordance with Equation (EQ.3) and processing for superposing the two images is executed.

Next, at step S721, the image signal obtained at step S720, namely the split-image coincidence image signal, is displayed on the display unit 804.

The state of the photography switch 122 (SW2) is discriminated at step S722. If the switch 122 is off, control returns to step S702 so that the processing of steps S702–S721 is executed again. If the photography switch 122 is found to be on at step S722, it is judged that release has been performed and control shifts to step S731.

Steps S731–S736 are for an image-sensing operation identical with that of steps S521–S526 of FIG. 24 according to the sixth embodiment. When the processing of step S736 is completed, control returns to step S702.

The operation of the camera according to the foregoing flowchart will now be summarized.

When the main switch 120 and photography-preparation-switch 121 are turned on by the photographer, the camera performs the rangefinding calculation and carries out auto-focusing by driving the focusing lens in a manner similar to that of the sixth embodiment. On the basis of the results of rangefinding calculation and the results of driving the focusing lens, the state of focusing of the object is displayed as the amount of shift between two images on the double-image coincidence display device. Continuous focusing is performed by repeatedly executing this operation and the photographer is notified of the results of focusing in the form of the amount of offset between the twin images. Next, when the photography switch 122 is turned on, the image of the object projected upon the main image-sensing device is recorded in the image memory and an image of the picture taken is displayed on the display unit 804.

The eighth embodiment provides the following advantage in addition to the advantages (AD10)–(AD14) according to the sixth embodiment.

(AD19) The state of focusing is displayed as a coincidence finder image on an electronic finder such as a liquid crystal monitor. As a result, the status of focus of the image of the object is made much more discernible.

<Ninth Embodiment>

According to the eighth embodiment, a photoelectric coincidence finder is realized using the rangefinding device of the sixth embodiment. A ninth embodiment described below illustrates a case where the photoelectric coincidence finder is realized using the conventional passive- or active-type rangefinding device.

FIGS. 36 through 39 are diagrams relating to the ninth embodiment.

Figure 36:
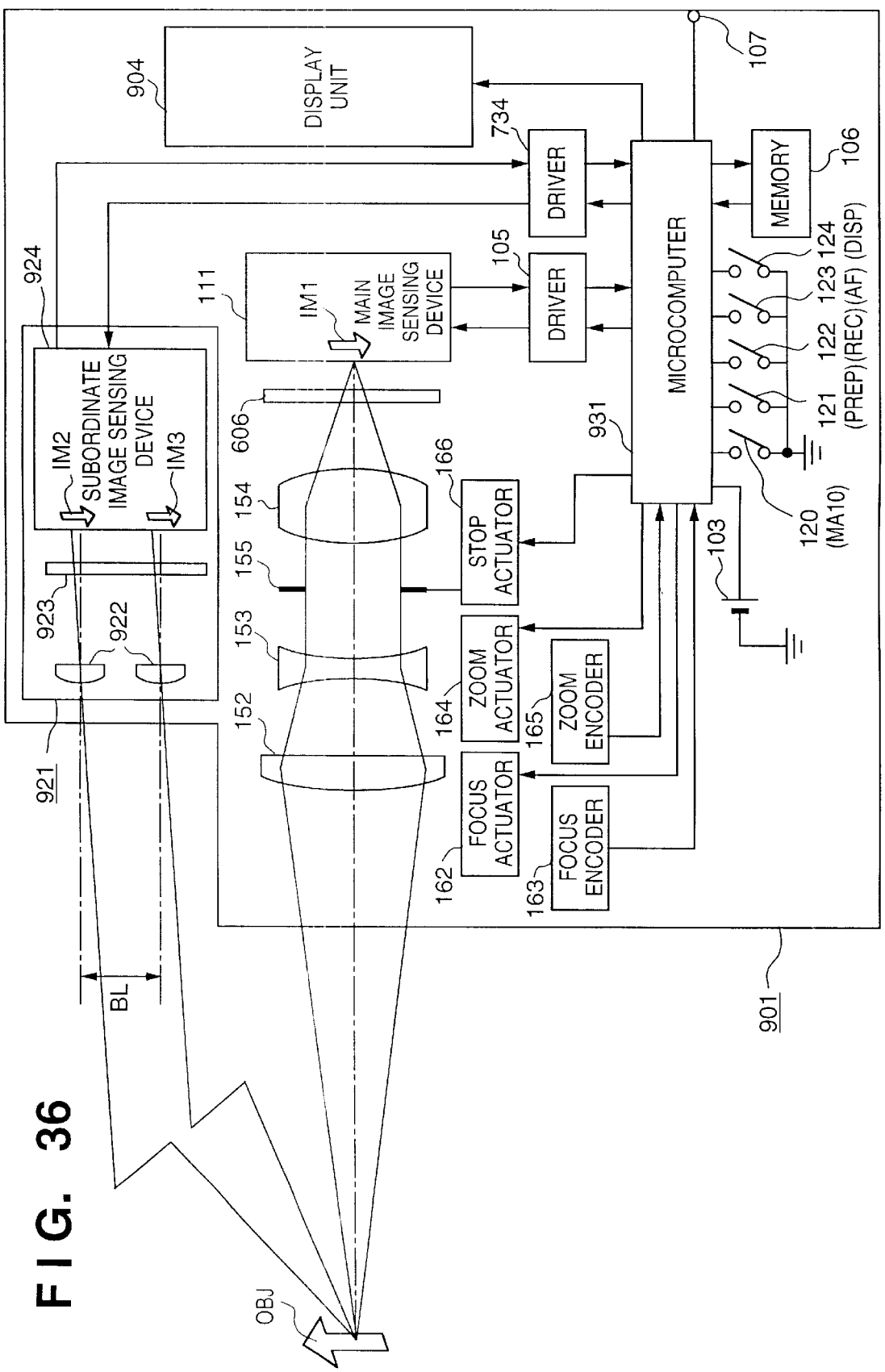
FIG. 36 is a block diagram illustrating the construction of an image sensing apparatus according to a ninth embodiment of the present invention.

FIG. 36 is a diagram showing the construction of a camera body 901 according to the ninth embodiment. Components other than those described below operate in the same manner as set forth in connection with the sixth embodiment of FIG. 20. Only the components that differ will be described.

The camera body 901 has various functional components for forming the image of an object OBJ, detecting focus, and sensing the image.

A rangefinding module 921 has two light-receiving lenses 922 of the same power spaced apart by a predetermined baselength BL for forming images IM2, IM3 of the object OBJ whose distance is to be measured, an infrared-blocking filter 923 for blocking infrared light and passing only visible light of the light flux that has passed through the light-receiving lens 922, and a subordinate image-sensing device 924. The rangefinding optical system, which includes the light-receiving lenses 922 and the infrared-blocking filter 923, forms a second image IM2 of the object OBJ and a third image IM3 of the object OBJ on the subordinate image-sensing device 924, described later.

The subordinate image-sensing device 924, such as a CCD, is a two-dimensional photoelectric sensor for photoelectrically converting the second and third images IM2, IM3 of the object. The distance to the object OBJ can be detected from the spacing between images IM2, IM3 and the baselength BL using a prescribed calculation formula.

A microcomputer 431 performs rangefinding and presents a display on a coincidence finder in accordance with a flowchart described below.

Figure 37:
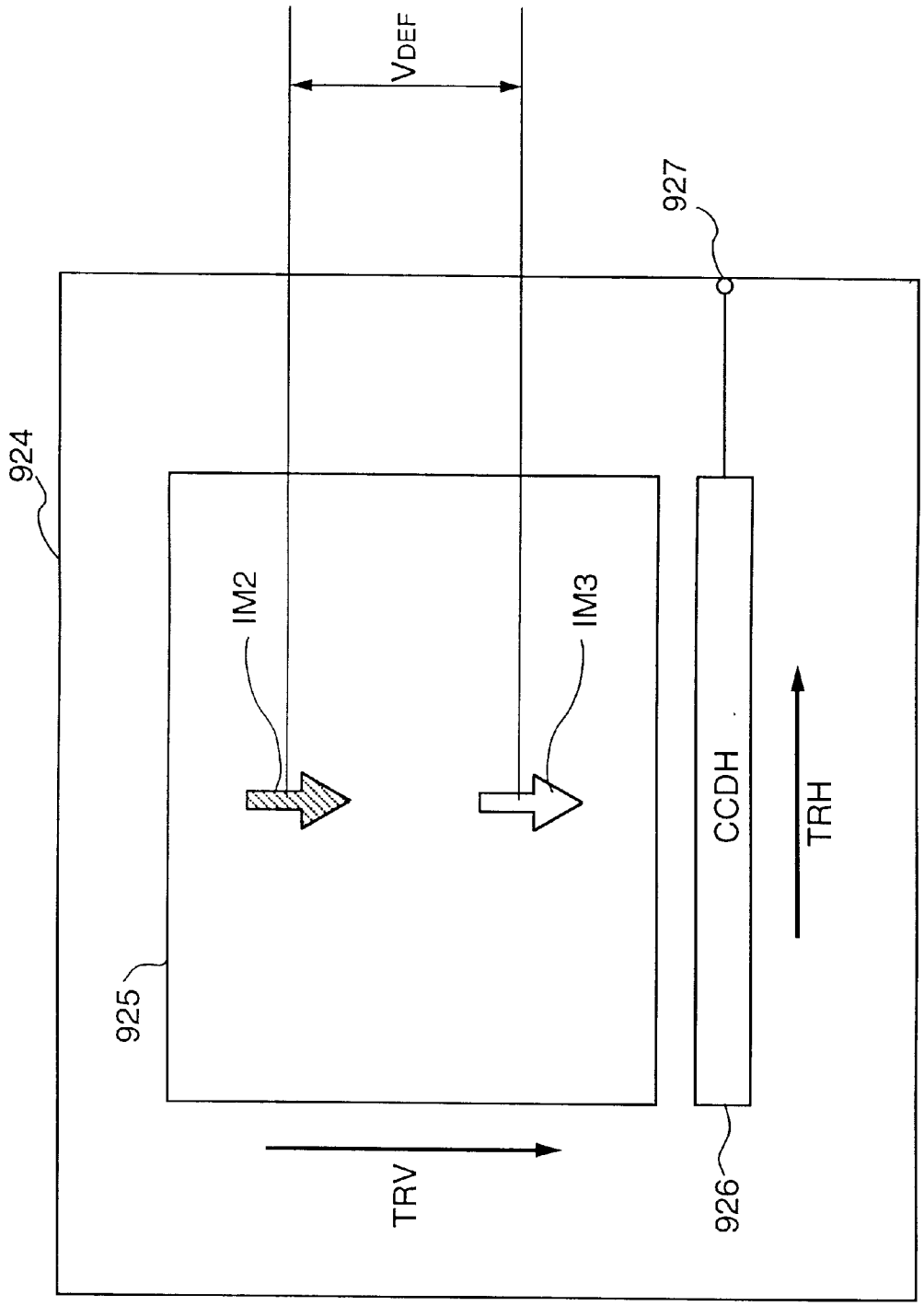
FIG. 37 is a diagram useful in describing the state of image formation when rangefinding is performed according to the ninth embodiment.

FIG. 37 is a diagram showing the subordinate image-sensing device 924 and the disposition of two images formed on the image-sensing device.

A light-receiving portion 925 of the subordinate image-sensing device 924 comprises $m_2 \times n_2$ light-receiving pixels and a charge transfer portion (vertical transfer CCD) for transferring electric charge that has accumulated in these pixels. A horizontal transfer CCD 926 stores electric charge transferred in the direction of arrow TRV by the vertical transfer CCD in the light-receiving portion 925, then transfers the charge in the direction of arrow TRH and outputs an image signal from an signal-output portion 927 to the image sensor driver 134.

The second and third images of the object described in connection with FIG. 36 are shown at IM2 and IM3, respectively, and the spacing $V_{DEF}$ between the two images varies depending upon the object to the distance OBJ.

In accordance with a well-known correlation algorithm, the distance $V_{DEF}$ Of the image IM3 relative from the image IM1 is obtained and distance DST to the object OBJ can be detected based upon the following equation using the focal length f of the light-receiving lens 922 and baselength BL:

$$DST = \frac{f \cdot BL}{(V_{DEF} - BL)} \quad \text{(EQ. 5)}$$

FIG. 38 is a diagram illustrating the form of the display presented on a display unit 904. An image $IM1L_0$ from the main image-sensing device 111 is displayed over the entire display area. A rectangular area AR centered on the display area is a twin-image display area. An image $IM1L_{DEF}$, which is obtained by extracting the central portion of an image which is the copy of the image $IM1L_0$ obtained by the image sensing device 111, is displayed in the area AR in superposition on the image $IM1L_0$. The images $IM1L_0$ and $IM1L_{DEF}$ are displayed in a form offset from each other by an amount DELTA calculated in accordance with the following equation:

$$\text{DELTA}=K \times (V_{DEF}-D_{FOCUS}) \quad \text{(EQ. 6)}$$

where $V_{DEF}$ represents a quantity relating to the distance to the object OBJ, $D_{FOCUS}$ represents a quantity relating to the amount of feed of the focusing lens 152 and K represents a coefficient for improving visibility by enlarging the display offset quantity.

For example, if we assume that the distance to the object OBJ is infinity and that the amount of feed of the focusing lens 152 for focusing the object is zero, then the display image-offset quantity DELTA will be represented by the following equation, which is similar to Equation (EQ.4) of the eighth embodiment:

$$\text{DELTA}=K \times (V_{DEF}-D_{FOCUS})=K \times (0-0)=0 \quad \text{(EQ. 7)}$$

If the distance to the object is finite, then values of $V_{DEF}$ and $D_{FOCUS}$ conforming thereto are used. However, if the object is in focus owing to feed of the focusing lens 152, then DELTA=0 holds at this time as well.

In other words, according to the ninth embodiment, the construction of the rangefinding module 921 and the images superposed on each other in the twin-image display area of the display unit 904 differ from those of the eighth embodiment. However, as in the eighth embodiment, the offset quantity DELTA corresponds to the amount of focal shift of the image-sensing system with respect to the object OBJ, and a finder of twin-image coincidence type similar to that of the eighth embodiment can be implemented.

FIG. 39 is a flowchart illustrating the flow of control by the microcomputer 931 in a case where focus detection, focusing and photography are carried out in the camera body 901 of the ninth embodiment.

The control flow of FIG. 39 will be described while making reference to FIGS. 36 through 38.

When the main switch 120 of the camera body 901 is turned on, the microcomputer 931 is activated from the sleep state and control proceeds from step S801 to step S802, at which the states of the switches 121 - 124 inside the camera body 901 are sensed.

The state of the photography-preparation switch 121 (SW1), which is turned on by pressing the release button through its first stroke length, is sensed at step S803. Control returns to step S802 when the switch 121 is off and proceeds to step S804 when the switch 121 is on.

Next, at step S804, the main image sensing device 111 is activated to acquire an image signal.

Processing of the image-signal acquired at step S804 is executed at step S805. More specifically, processing such as A/D conversion of the image signal, white-balance adjustment, and gamma correction is executed.

This is followed by step S806, at which object-brightness information is calculated from the image signal processed at step S805. Further, in accordance with a predetermined exposure-control program, a control value for stopping down the stop 155 and the exposure time (charge storage time) of the image sensing device 111 are calculated.

Next, the setting of the AF mode switch 123 is discriminated at step S807 to determine if the autofocus (AF) mode is in effect. Control jumps to step S820 if the mode is not the AF mode and proceeds to step S811 if the mode is the AF mode.

The microcomputer 931 senses the state of the focus encoder 163 at step S811 and senses the state of the zoom encoder 165 at step S812 to judge the current optical status of the lens. The subordinate image sensing device 924 is activated at step S813 to obtain image signals for rangefinding purposes.

Next, the image signals acquired at step S813 are subjected to processing such as A/D conversion at step S814. Next, at step S815, the position offset quantity between the digital image signals of the images IM2 and IM3 obtained at step S814 is calculated and so is the distance to the object.

The focusing lens group 152 is driven at step S816 based upon the result of the above-described calculation to bring the first image IM1 into focus.

The offset quantity DELTA between the two images for display purposes shown in FIG. 38 is calculated in accordance with Equation (EQ.6) at step S817.

This is followed by step S818, at which processing for superposing the two images in the manner shown in FIG. 38 is executed.

Next, at step S819, the image signal obtained at step S818, namely the split-image coincidence image signal, is displayed on the display unit 904.

The state of the photography switch 122 (SW2) is discriminated at step S820. If the switch 122 is off, control returns to step S802 so that the processing of steps S802–S819, namely automatic focusing and display of images on the display unit, is executed again. If the photography switch 122 is found to be on at step S820, it is judged that release has been performed and control shifts to step S831.

Steps S831–S836 are for an image-sensing operation identical with that of steps S731–S736 of FIG. 35 according to the eighth embodiment. When the processing of step S836 is completed, control returns to step S702.

The operation of the camera according to the foregoing flowchart will now be summarized.

When the main switch 120 and photography-preparation switch 121 are turned on by the photographer, the camera performs the rangefinding calculation using the image signals obtained from the rangefinding module 921 and carries out automatic focusing by driving the focusing lens 152 based upon the results of rangefinding calculation. On the basis of the results of rangefinding calculation and the results of driving the focusing lens, the state of focal shift of the image on the image sensing device 111 is calculated. The image of the object obtained from the image-sensing device 111 and an image obtained by extracting the central portion of an image, which is a copy of the first-mentioned image, are superposed and displayed on the display unit 904 with an offset between them that depends upon the amount of focal shift. Continuous focusing is performed by repeatedly executing this operation and the photographer is notified of the results of focusing in the form of the amount of offset between the twin images. Next, when the photography switch 122 is turned on, the image of the object projected upon the main image-sensing device is recorded in the image memory and image of the picture taken is displayed on the display unit 904.

The ninth embodiment provides the following advantage in addition to the advantages (AD10)–(AD14) according to the sixth embodiment.

(AD20) The state of focusing is displayed as a coincidence finder image even in an image-sensing apparatus having the conventional rangefinding device and an electronic finder, such as a liquid crystal monitor. As a result, the status of focus of the image of the object is made much more discernible through a simple, inexpensive arrangement.

The rangefinding device in the ninth embodiment uses a passive triangulation rangefinder according to the prior art. However, it is possible to use a conventional active triangulation rangefinding device or a so-called sonar-type rangefinding device, which measures distance based upon the length of time required to receive reflected ultrasonic waves projected toward an object.

As many apparently widely different embodiments of the present invention can be made without departing from the spirit and scope thereof, it is to be understood that the invention is not limited to the specific embodiments thereof except as defined in the appended claims.

What is claimed is:

1. An apparatus comprising:
   a light reception device receiving light from an object and generating light reception signals thereof;
   a phase difference determination device determining a phase difference between two light reception signals, generated by said light reception device, respectively corresponding to two light rays in different directions emitted from a part of the object; and
   a display device selecting one reception signal of the two light reception signals to display an image of the object on the basis of the selected one reception signal.

2. An apparatus according to claim 1, further comprising a focus adjustment device adjusting an image forming optical system on the basis of a determination result of said phase difference determination device.

3. An apparatus according to claim 1, further comprising an optical device guiding the two light rays emitted from the part of the object to respective different light reception positions of said light reception device.

4. An apparatus according to claim 3, wherein when said optical device guides the two light rays emitted from the part of the object to the respective different light reception positions, said display device selects the one light reception signal of the two light reception signals to display the image of the object on the basis of the selected light reception signal, and
   wherein when said optical device does not operate, said display device displays an image of the object on the basis of the light reception signal of said light reception device without performing a selection of the one light reception signal.

5. An apparatus according to claim 4, wherein said display device displays the images of the object so that a magnification factor of the object images are the same for when the selection of the light reception signal is made and when the selection of the light reception signal is not made.

6. An apparatus according to claim 1, wherein said apparatus comprises an optical apparatus.

7. An apparatus according to claim 1, wherein said apparatus comprises a camera.

8. A control method comprising the steps of:
   receiving light from an object by a light reception device and obtaining light reception signals thereof;
   determining a phase difference between two light reception signals, obtained by the light reception device, respectively corresponding to two light rays in different directions emitted from a part of an object; and
   selecting one light reception signal of the two light reception signals to display an image of the object on the basis of the selected one light reception signal.

9. A method according to claim 8, further comprising a step of adjusting a focus of an image forming optical system on the basis of a determination result of said phase difference determining step.

10. A method according to claim 8, further comprising a step of displaying the one light reception signal selected in said selection step, when the two light rays emitted from the part of the object are guided to respective different light reception positions of the light reception device by an optical device, and
    a step of displaying, when the optical device does not operate, an image of the object on the basis of the light reception signal of the light reception device without performing a selection of the one light reception signal.

11. A method according to claim 10, further comprising a step of displaying the images of the object so that magnification factors of the object images are the same for when the selection of the light reception signals is made and when the selection of the light reception signals is not made.

12. A computer readable storage medium containing a computer readable program comprising code for instructing a computer to perform the steps of:
    receiving light from an object by a light reception device and obtaining light reception signals thereof;
    determining a phase difference between two light reception signals, obtained by the light reception device, respectively corresponding to two light rays in different directions emitted from a part of an object; and
    selecting one light reception signal of the two light reception signals to display an image of the object on the basis of the selected one light reception signal.

13. A computer-readable storage medium according to claim 12, said computer-readable program further comprising code for instructing the computer to perform a step of:
    adjusting a focus of an image forming optical system on the basis of a determination result of said phase difference determination step.

14. A computer-readable storage medium according to claim 12, said computer readable program further comprising code for instructing the computer to perform steps of:
    displaying the one light reception signal selected in said selection step, when the two light rays emitted from the part of the object are guided to respective different light reception positions of the light reception device by an optical device, and
    displaying, when the optical device does not operate, an image of the object on the basis of the light reception signal of the light reception device without performing a selection of the one light reception signal.

15. A computer-readable storage medium according to claim 14, said computer readable program further comprising code for instructing the computer to perform a step of:

displaying the images of the object so that magnification factors of the object images are the same for when the selection of the light reception signals is made and when the selection of the light reception signals is not made.

16. An apparatus comprising:

a light reception device receiving light from an object and generating light reception signals thereof;

a phase difference determination device determining a phase difference between two light reception signals, generated by said light reception device, respectively corresponding to two light rays in different directions emitted from a part of the object; and a display device displaying an image of the object on the basis of the light reception signals generated by said light reception device.

17. An apparatus according to claim 16, wherein said display device displays the image that corresponds to one reception signal of the two light reception signals.

18. An apparatus according to claim 16, further comprising a focus adjustment device adjusting an image forming optical system on the basis of a determination result of said phase difference determination device.

19. An apparatus according to claim 16, further comprising an optical device guiding the two light rays emitted from the part of the object to respective different light reception positions of said light reception device.

20. An apparatus according to claim 16, wherein said apparatus comprises an optical apparatus.

21. An apparatus according to claim 16, wherein said apparatus comprises a camera.

22. A control method comprising the steps of:

receiving light from an object by a light reception device and obtaining light reception signals thereof;

determining a phase difference between two light reception signals, obtained by said light reception device, respectively corresponding to two light rays in different directions emitted from a part of the object; and displaying an image of the object on the basis of the light reception signals obtained by said light reception device.

23. A control method according to claim 22, wherein said displaying step displays the image that corresponds to one reception signal of the two light reception signals.

24. A control method according to claim 22, further comprising a step of adjusting an image forming optical system on the basis of a determination result of said determining step.

25. A control method according to claim 22, further comprising a step of guiding the two light rays emitted from the part of the object to respective different light reception position of the light reception device.

26. A computer program product comprising code for instructing a computer to perform the steps comprising:

receiving light from an object by a light reception device and obtaining light reception signals thereof;

determining a phase difference between two light reception signals, obtained by the light reception device, respectively corresponding to two light rays in different directions emitted from a part of the object; and displaying an image of the object on the basis of the light reception signals obtained by the light reception device.

27. A computer program product according to claim 26, wherein said displaying step displays the image that corresponds to one reception signal of the two light reception signals.

28. A computer program product according to claim 26, further comprising adjusting an image forming optical system on the basis of a determination result of said determining step.

29. A computer program product according to claim 26, further comprising guiding the two light rays emitted from the part of the object to respective different light reception positions of the light reception device.

* * * * *

UNITED STATES PATENT AND TRADEMARK OFFICE
CERTIFICATE OF CORRECTION

PATENT NO. : 6,377,305 B2
DATED : April 23, 2002
INVENTOR(S) : Ichiro Onuki

It is certified that error appears in the above-identified patent and that said Letters Patent is hereby corrected as shown below:

<u>Drawings,</u>
Sheet 24, Figure 24, Item S501, "TRUN" should read -- TURN --.

<u>Column 2,</u>
Line 15, "a," should read -- a mechanism, --.

<u>Column 5,</u>
Line 30, change "rangefinding a" to -- rangefinding --.

<u>Column 12,</u>
Line 8, "(CCDH)" should read -- $CCD_H$) --.
Line 10, "CCDV" should read -- $CCD_V$ --.

<u>Column 26,</u>
Line 35, ".optical" should read -- optical --.

<u>Column 32,</u>
Line 28, "$K(V_{DEF}-D_{FOCUS})$" should read -- $K•(V_{DEF}-D_{FOCUS})$ --.

<u>Column 33,</u>
Line 61, "-switch" should read -- switch --.

<u>Column 35,</u>
Line 4, "Of" should read -- of --.

<u>Column 38,</u>
Line 37, "computer readable" should read -- computer-readable --.
Line 38, "computer readable" should read -- computer-readable --.
Line 56, "computer readable" should read -- computer-readable --.

UNITED STATES PATENT AND TRADEMARK OFFICE
CERTIFICATE OF CORRECTION

PATENT NO. : 6,377,305 B2
DATED : April 23, 2002
INVENTOR(S) : Ichiro Onuki

It is certified that error appears in the above-identified patent and that said Letters Patent is hereby corrected as shown below:

<u>Column 39,</u>
Line 2, "computer readable" should read -- computer-readable --.

Signed and Sealed this

Sixth Day of August, 2002

*Attest:*

*Attesting Officer*

JAMES E. ROGAN
*Director of the United States Patent and Trademark Office*